United States Patent [19]
Bennett

[11] 3,715,572
[45] Feb. 6, 1973

[54] VEHICLE LOCATION AND HEADING COMPUTER SYSTEM

[76] Inventor: Dale E. Bennett, 801 No. Mountain View Place, Fullerton, Calif. 92631

[22] Filed: March 5, 1971

[21] Appl. No.: 121,437

[52] U.S. Cl. .................235/150.2, 172/3, 180/79.1, 180/98, 235/150.24, 318/587, 340/52
[51] Int. Cl. .......................G06f 15/50, A01b 69/04
[58] Field of Search........235/150.2, 150.24, 92 V, 92 TC,
235/92 SH; 318/587; 340/24, 52, 268; 250/219 D, 219 DC, 223; 180/79, 79.1, 98; 172/3

[56] References Cited

UNITED STATES PATENTS

| | | | |
|---|---|---|---|
| 2,674,332 | 4/1954 | Ovshinsky | 172/3 |
| 3,245,493 | 4/1966 | Barrett | 235/150.2 X |
| 3,294,178 | 12/1966 | Lawson et al. | 172/3 |
| 3,495,662 | 2/1970 | Welch | 172/3 |
| 3,507,349 | 4/1970 | Comer et al. | 180/98 |
| 3,512,601 | 5/1970 | Wilson | 180/98 |
| 3,529,170 | 9/1970 | Russell | 250/223 |
| 3,563,327 | 2/1971 | Mier | 318/587 |
| 3,461,454 | 8/1969 | Steckenrider | 340/24 |

FOREIGN PATENTS OR APPLICATIONS

| | | | |
|---|---|---|---|
| 1,801,967 | 6/1970 | Germany | 318/587 |

Primary Examiner—Felix D. Gruber
Attorney—Fraser & Bogucki

[57] ABSTRACT

A system is provided in which pulses generated by the rotation of the wheels or tracks of a vehicle are processed to provide representations of the heading and location of the vehicle relative to X and Y coordinate axes. The angle between vehicle heading and the X axis is represented by the binary value stored in an angle register, the angle register being updated by the generated pulses each time the vehicle travels a predetermined distance. An associated quadrant register provides a binary representation of that one of the four quadrants of the coordinate system in which the vehicle heading is located. Binary representations of the vehicle location relative to the X and Y axes are stored in X and Y registers, which registers are updated in accordance with incremental changes in X and Y by computing the sine and cosine of the new angle stored in the angle register upon each updating of the angle register. The stored angle and X, Y representations are converted into analog values to provide a visual display of the vehicle heading and location. The stored representations are also processed by apparatus which provides for operation of the vehicle over a predetermined course without the need for a driver or operator.

53 Claims, 46 Drawing Figures

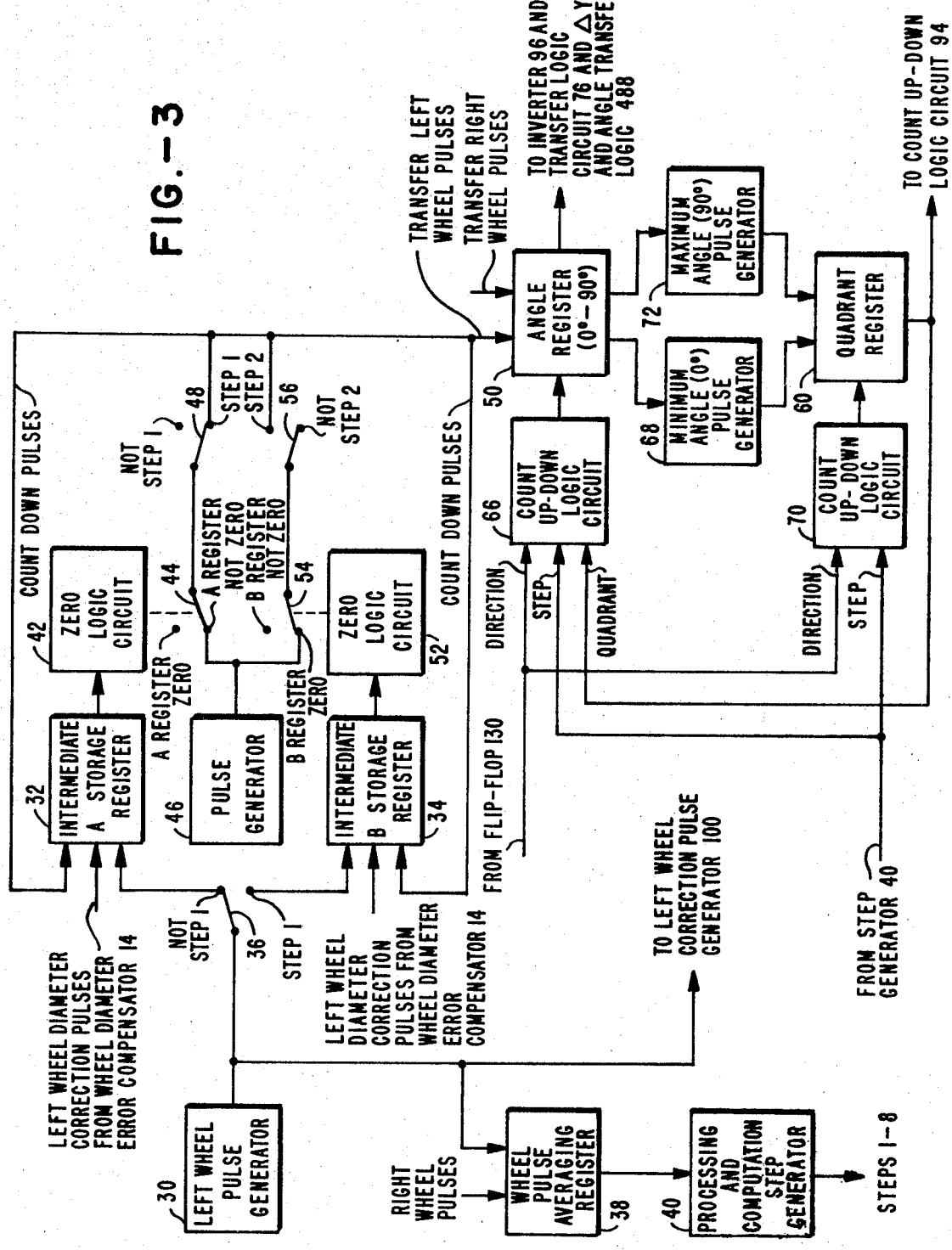

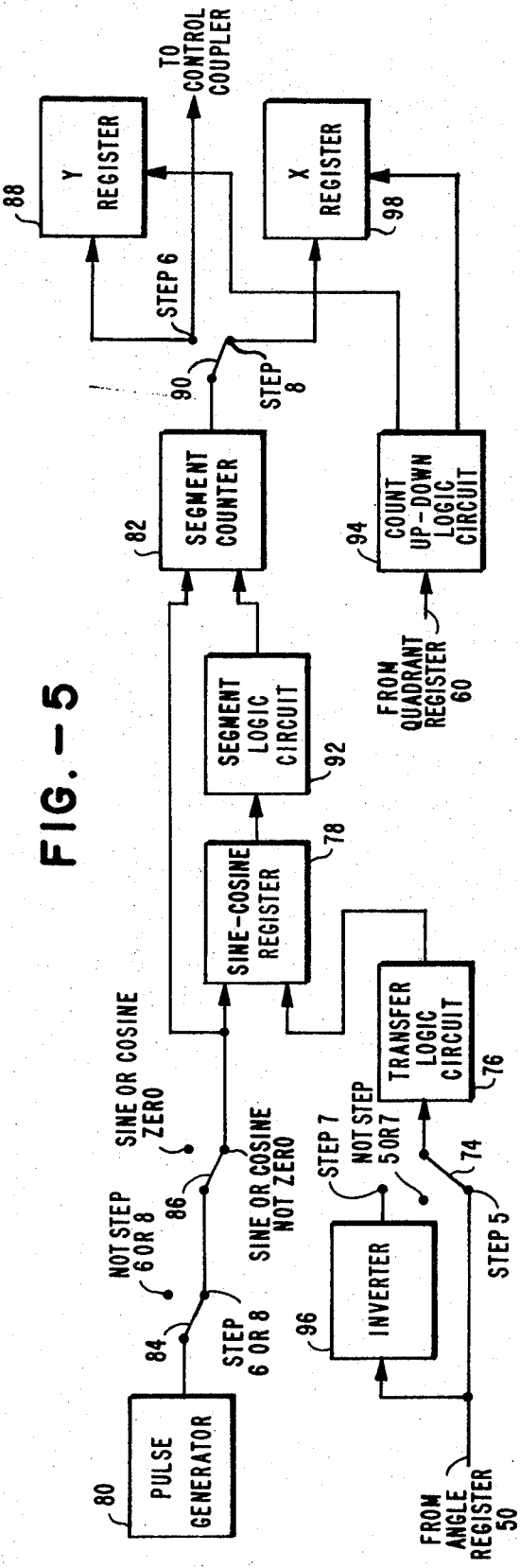
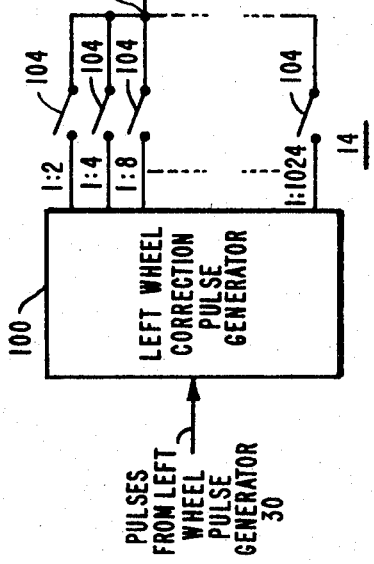

| SEGMENT | BINARY ANGLE | ΔY | PULSE RATIO |
|---|---|---|---|
| 1 | 0000000−0000011 | 0−3.0 | 1:1 |
| 2 | 0000100−0000111 | 3.5−5.0 | 1:2 |
| 3 | 0001000−0001111 | 6.0−13.0 | 1:1 |
| 4 | 0010000−0010011 | 13.5−15.0 | 1:2 |
| 5 | 0010100−0010111 | 16.0−19.0 | 1:1 |
| 6 | 0011000−0011111 | 19.5−23.0 | 1:2 |
| 7 | 0100000−0100111 | 24.0−31.0 | 1:1 |
| 8 | 0101000−0101111 | 31.5−35.0 | 1:2 |
| 9 | 0110000−0110011 | 36.0−39.0 | 1:1 |
| 10 | 0110100−0111111 | 39.5−45.0 | 1:2 |
| 11 | 1000000−1010111 | 45.5−57.0 | 1:2 |
| 12 | 1011000−1011111 | 57.25−59.0 | 1:4 |
| 13 | 1100000−1101111 | 59.25−63.0 | 1:4 |
| 14 | 1110000−1111111 | 63.125−65.0 | 1:8 |

INVENTOR.
DALE E. BENNETT
BY
Fraser and Bogucki
ATTORNEYS

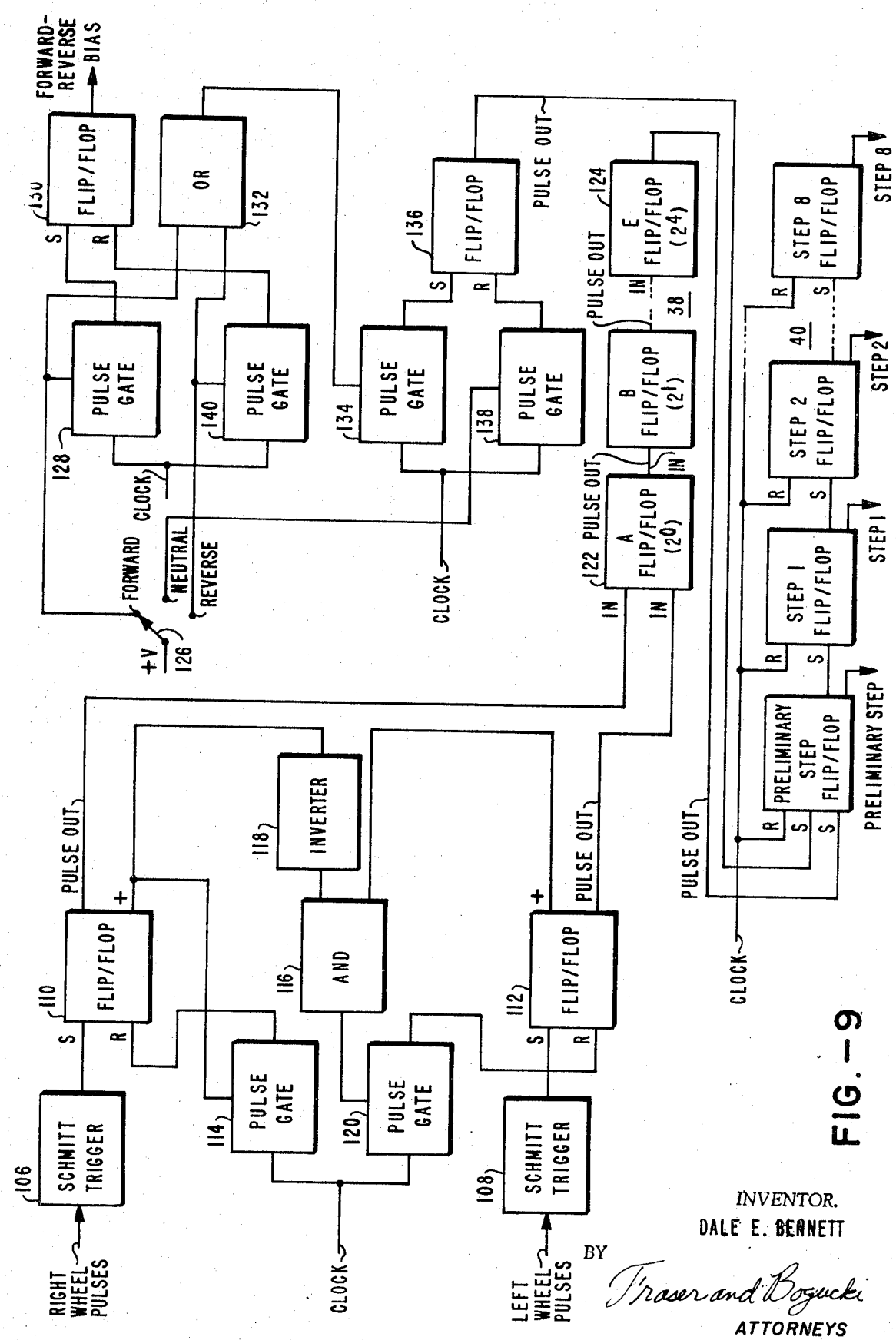

FIG.-10

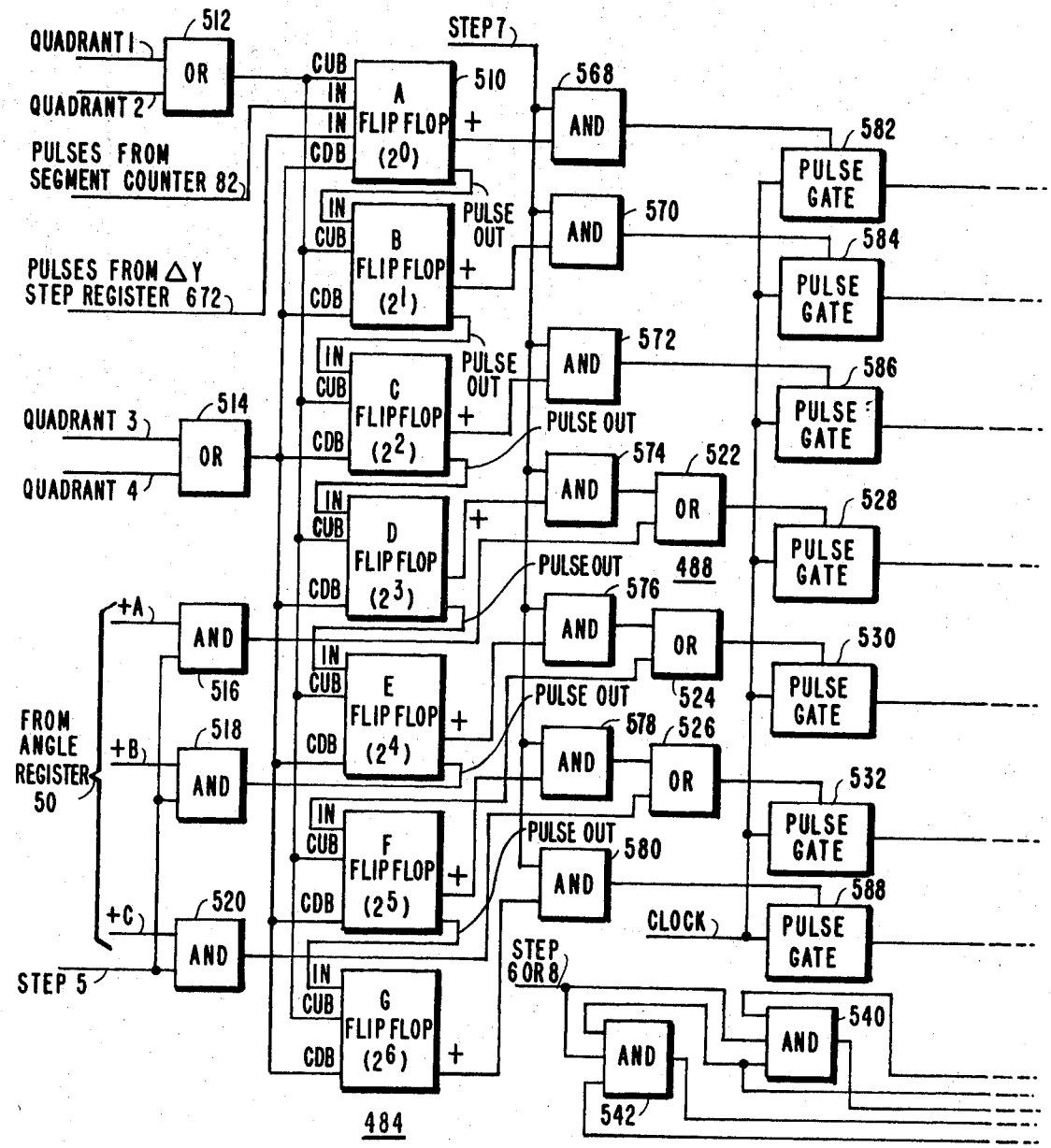
FIG.—20A

| $\eta$ | $\cos\eta$ | $(1-\cos\eta)$ | $512(1-\cos\eta)$ | APPROXIMATELY $512(1-\cos\eta)$ |
|---|---|---|---|---|
| 4 | .99756 | .00244 | 1.25 | 1 |
| 8 | .99027 | .00973 | 4.98 | 5 |
| 12 | .97815 | .02185 | 11.19 | 12 |
| 16 | .96126 | .03874 | 19.83 | 20 |
| 20 | .93969 | .06031 | 30.88 | 32 |
| 24 | .91355 | .08645 | 44.26 | 44 |
| 28 | .88295 | .11705 | 59.93 | 60 |
FIG.-42
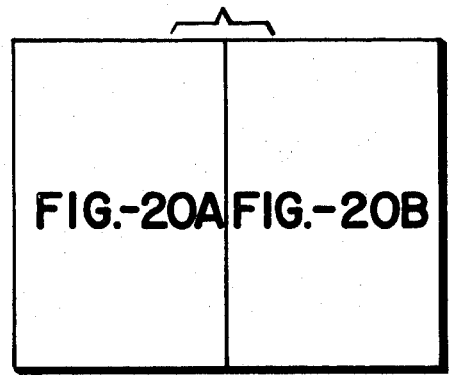
FIG.-20C
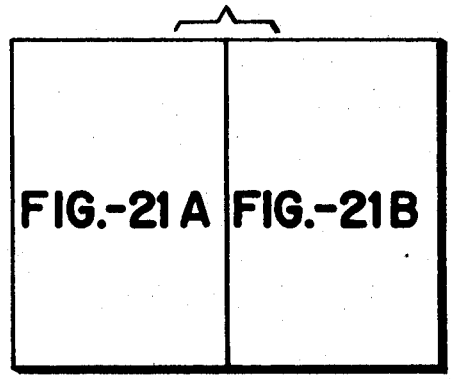
FIG.-21C
INVENTOR.
DALE E. BENNETT
BY
ATTORNEYS

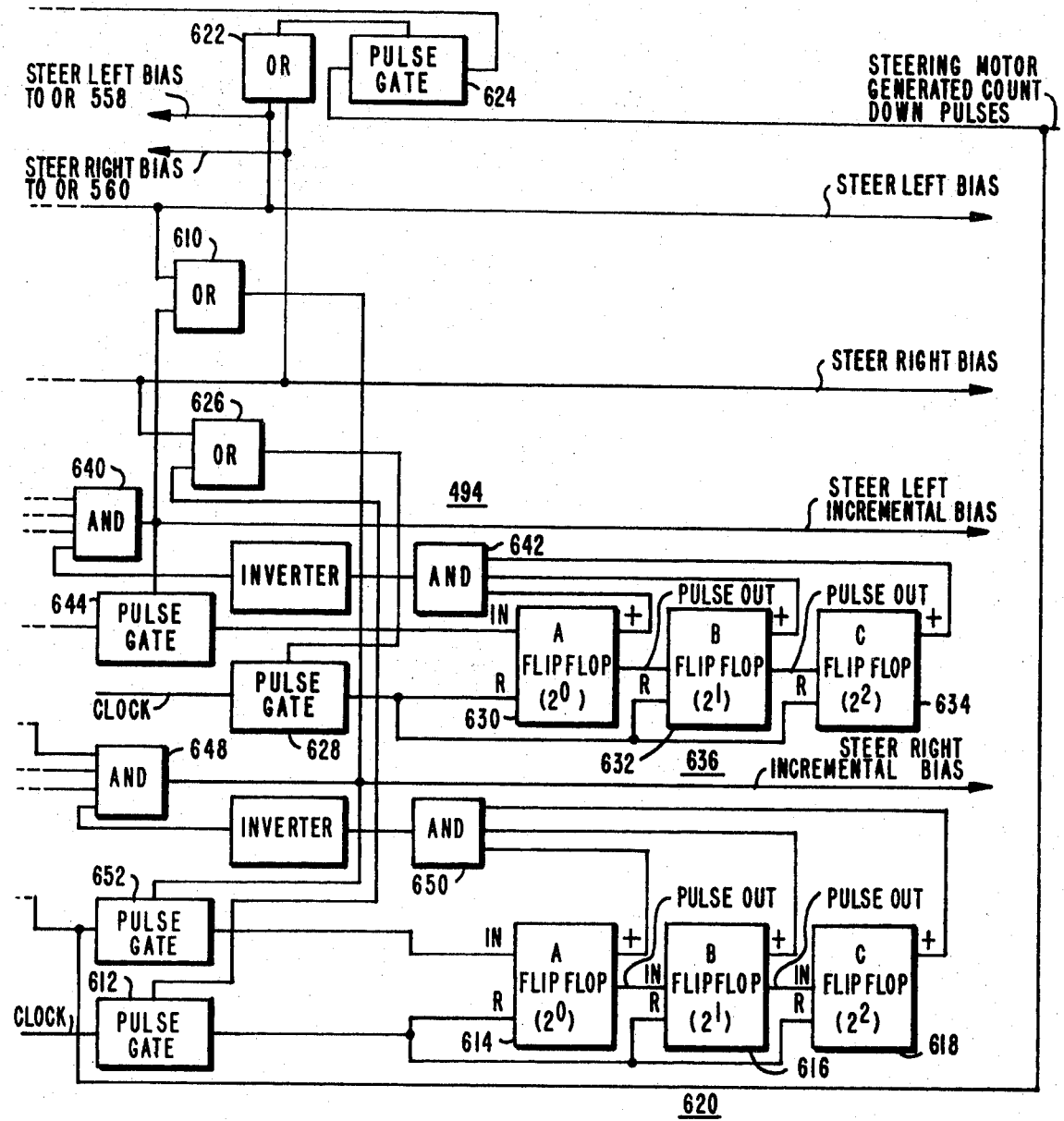
FIG.—21B

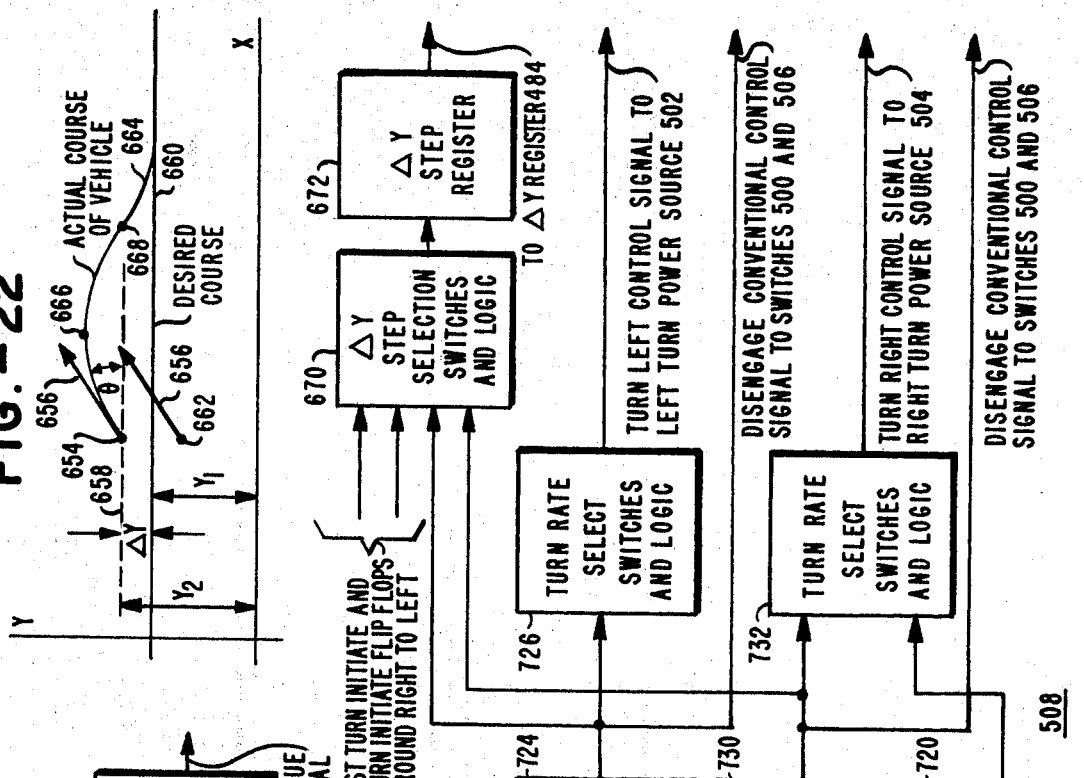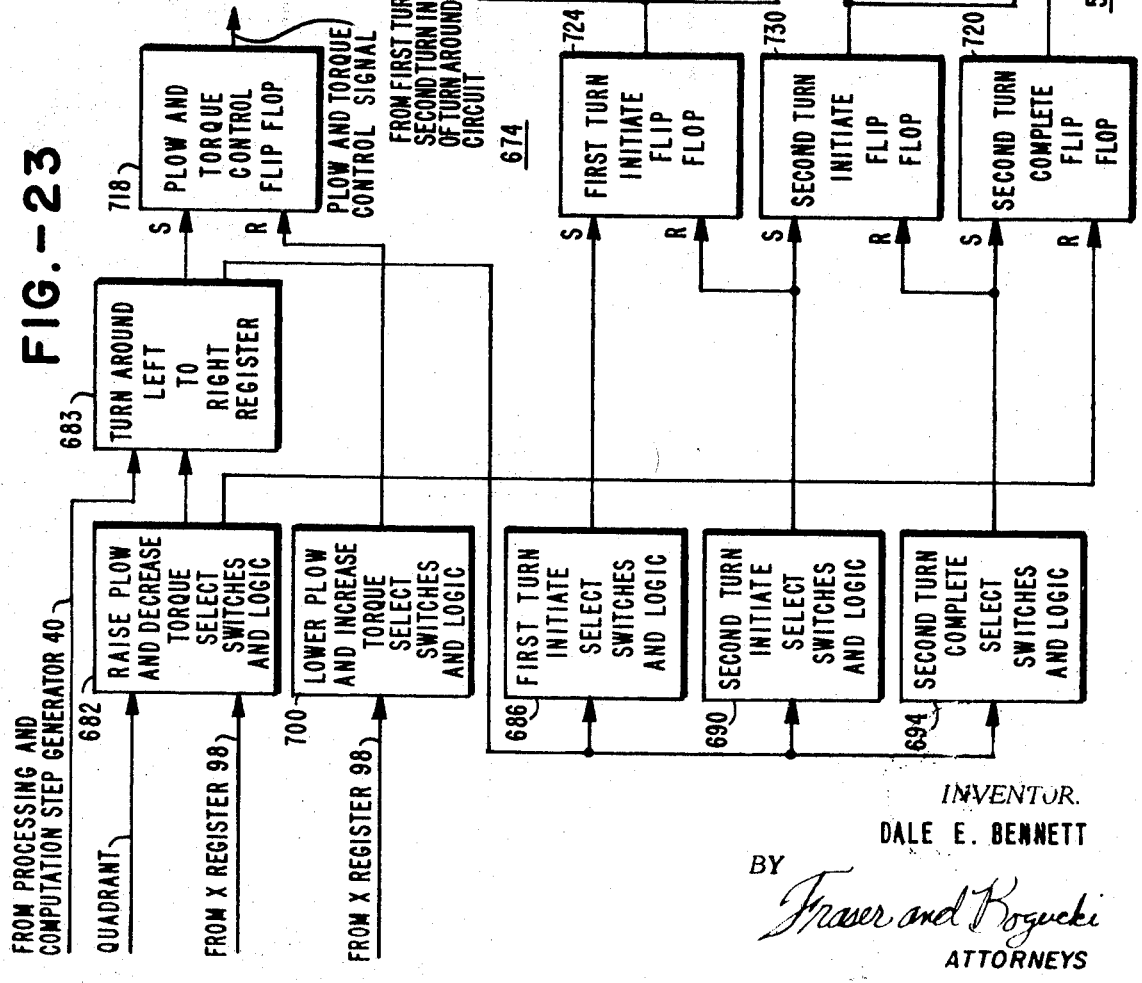

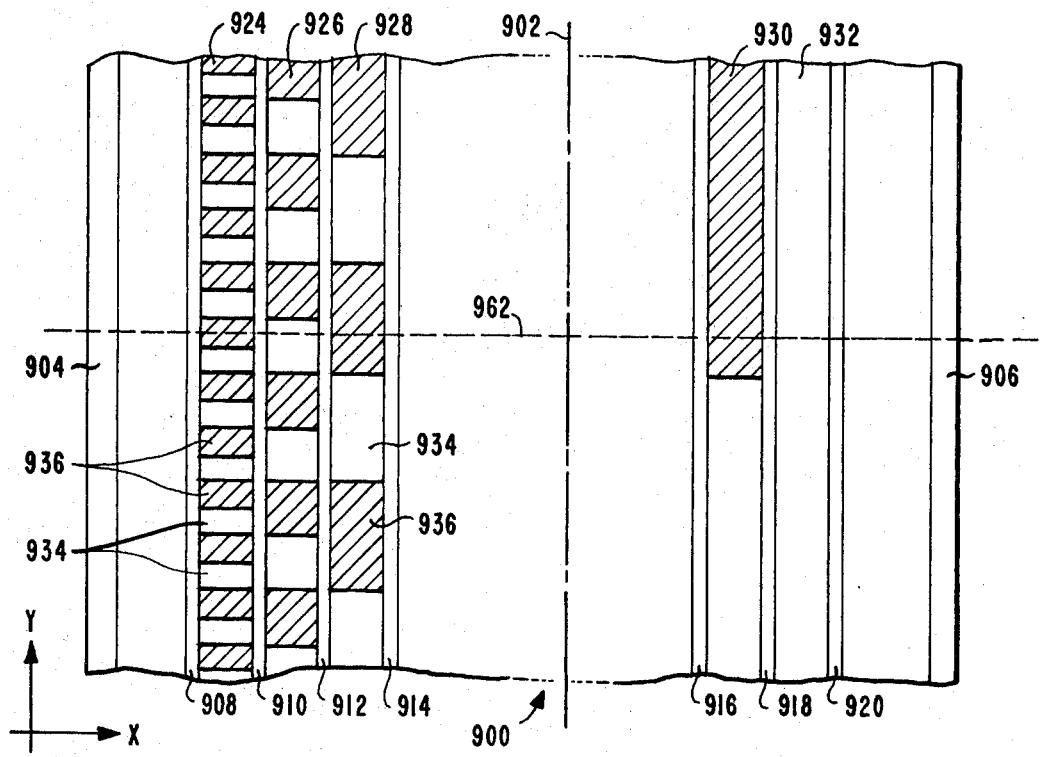
FIG.—29
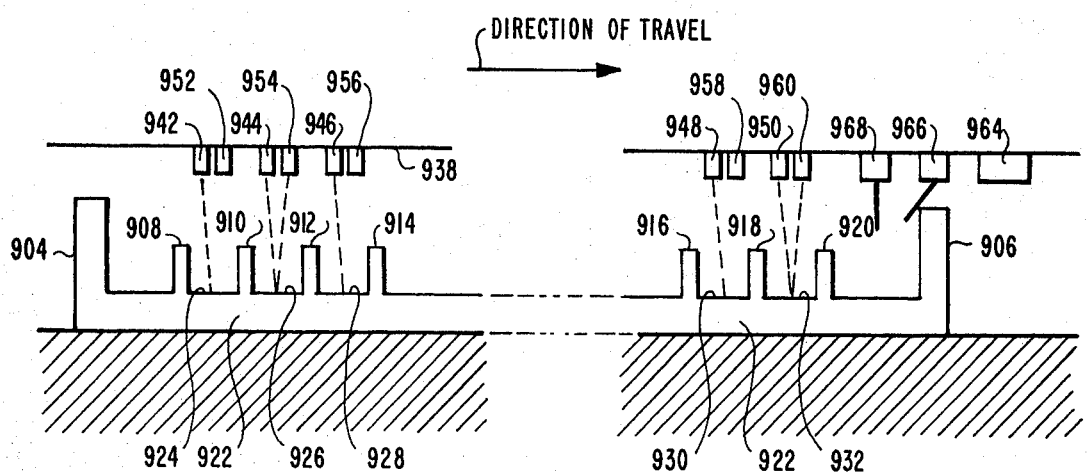
FIG.—30

VEHICLE LOCATION AND HEADING COMPUTER SYSTEM

BACKGROUND OF THE INVENTION

1. Field of the Invention

The present invention relates to systems for computing the location and heading of a ground traveling vehicle, and more particularly to systems of that type in which the computations are performed electronically using digital notations.

2. Description of the Prior Art

It is frequently advantageous to provide a land traveling vehicle with an arrangement for computing representations of the heading and location of the vehicle relative to a convenient reference. The heading and location information thus provided may be used to direct the vehicle over a predetermined course without the need for an operator. Thus, in the case of certain types of farming machinery such as tractors, for example, it would be highly desirable and advantageous to be able to program the tractor for plowing of a large area, thereby freeing the operator to devote his time to other activities.

Heading and location information also finds may useful applications such as in the providing of a visual display of the actual location of the vehicle and the direction in which it is heading. In the case of military vehicles such as tanks, for example, it is frequently necessary that the vehicle be driven over rugged and unfamiliar terrain. Thus the tank driver may be required to drive his tank at night from a command post to an enemy objective, then back again to the command post. Providing the tank driver with a visual display of the location and heading of the tank on a map of the area would enable a periodic determination as to whether the tank is traveling an appropriate route, in which direction the tank is heading, and where the tank is located relative to various points on the map. Such a visual display also finds use in other types of vehicles such as automobiles. The driver of a rented automobile in an area which is unfamiliar to him, for example, would be greatly aided by a display mounted on the dashboard or other convenient location and showing his location and heading on a street map of the area.

Known arrangements for computing the heading and location of a vehicle typically have serious limitations which render them impractical for many applications. Many such arrangements employ inertial type sensing devices which are frequently expensive while at the same time relatively inaccurate. Other arrangements including those designed to guide an operatorless vehicle over a predetermined course often require the use of devices located outside of the vehicle such as signal transmitting or reflecting devices implanted in the actual roadway itself. Such arrangements are expensive and impractical except in situations where most or all of the vehicles are to be similarly equipped.

Ideally then, an arrangement for computing the heading and location of a vehicle and for guiding the vehicle in operatorless fashion if desired should operate in highly accurate fashion and without reliance on inertial or similar types of sensing devices. Such an arrangement should furthermore be capable of being self-contained within the vehicle, if desired, and should be compact so as not to consume excessive amounts of space.

BRIEF SUMMARY OF THE INVENTION

The present invention provides an arrangement which computes and stores representations of the vehicle heading and location relative to a coordinate system in completely electronic fashion using binary notations. A pair of rotatable means such as the wheels or tracks of the vehicle having axes of rotation fixed relative to the vehicle longitudinal axis are utilized to generate pulses as the vehicle undergoes motion. In the case of a vehicle having steerable front wheels and fixed left and right rear wheels, for example, each of the rear wheels is equipped to generate a pulse each time it travels through a fixed increment of rotation. The generated pulses are temporarily stored in registers, then applied to update an angle register representing the angle between vehicle heading and the X axis of an X, Y coordinate system each time the vehicle has traveled a predetermined distance as determined by the total number of pulses generated by both rear wheels.

The angle register represents in binary notation an angle in the range of 0° to 90°, and an associated quadrant register represents in binary notation the particular one of four quadrants of the coordinate system in which the vehicle heading is located. Whenever the stored angle reaches 0° or 90° associated circuitry determines whether a new quadrant is being entered so as to make an appropriate change in the quadrant register. The temporarily stored pulses as generated by each of the rear wheels are added to and subtracted from the angle register each time the vehicle has traveled the predetermined distance, the addition and subtraction being determined by the particular quadrant in which the heading is located.

The location of the vehicle relative to the X and Y axes is represented by X and Y registers which are updated each time the angle register is updated. Since the vehicle travels a known distance between each updating of the angle register, the change in the location of the vehicle relative to the axes may be determined by computing products of the known distance between updates and the sine and cosine of the heading angle as represented by the binary value stored in the angle register. The sine and cosine products are computed in binary fashion, and the results of such computations are added to or subtracted from the respective X and Y registers depending upon the vehicle heading.

A binary value equal to that stored in the updated angle register is temporarily entered into a sine-cosine register to commence computation of the sine of the heading angle. Thereafter the inverse of the binary value in the angle register which represents 90° minus the heading angle is temporarily stored in the sine-cosine register, and the sine of the stored value as computed represents the cosine of the heading angle. The product of the known distance between updates and the sine of the binary value temporarily stored in the sine-cosine register is computed according to a plot of the sine of the heading angle for the different possible values of the angle between 0° and 90°. The plot is divided into a plurality of different segments, each encompassing a different range of possible values of the angle. Associated circuitry determines the various segments through which the binary value in the sine-cosine register passes as it is counted down to zero. As each particular segment is passed through, a selected ratio of pulses used to count down the binary angle value in the sine-cosine register is applied to the X or Y register as appropriate, the particular ratio used being preselected for each of the segments. The ratio establishes the relationship between the angle value and the product of the distance and sine of the angle.

The stored representations in the angle and quadrant registers may be used to provide a visual display of vehicle heading where desired. The binary angle value is added to or subtracted from a selected binary value as determined by the quadrant, and the results are converted into an analog signal to position the pointer of an electromechanical device in the appropriate direction. A visual display of vehicle location may also be provided using a cathode ray tube. The tube which has the X, Y coordinate system superimposed on the face thereof is scanned in raster fashion, and the scanning beam is intensity modulated to produce a spot on the tube face whenever the X and Y positions of the tube scan simultaneously coincide with the binary values stored in the X and Y registers.

Where desired, the periodically updated binary values of X, Y, the heading angle and the quadrant may be used to effect steering of the vehicle over a predetermined course without the need for an operator. In one such arrangement where the vehicle is to travel a substantially straight path parallel to the X axis a binary value $\Delta Y$ representing a position error or the difference between actual and desired Y locations is entered in a $\Delta Y$ register as a position error signal. This signal is converted into a corresponding analog value to drive a steering coupled motor in an appropriate direction. As the Y position of the vehicle changes the resulting binary inputs into the Y register are also entered in the $\Delta Y$ register as a feedback signal. The feedback signal reduces the position error signal represented by the binary value stored in the $\Delta Y$ register to zero as the vehicle reaches the desired Y position. Stability is introduced into the system by also using the binary heading angle value stored in the angle register as an angle error signal. The angle error corresponds to a velocity in the Y direction and therefore functions as a velocity feedback term which is stabilizing. The angle value which is desirably driven to zero so that the vehicle can follow the straightline path parallel to the X axis is also converted into an appropriate analog value and applied to drive the steering coupled motor along with the value in the $\Delta Y$ register. The steering motor and associated componentry accordingly respond to a compromise between the position error $\Delta Y$ and the angle error as represented by the value stored in the angle register to steer the vehicle in a manner which provides for the most efficient and substantially simultaneous reduction of the position and angle errors to zero.

Where the vehicle is to be driven along a plurality of different and mutually parallel paths such as in the case of a tractor plowing a field, additional circuitry may be employed for effecting turn around of the vehicle at opposite ends of the field. Such circuitry responds to predetermined values in the X register as the tractor reaches the opposite ends of the field to raise the tractor's plow, decrease its engine torque and initiate a timed sequence of operations to effect its turn around. As a point is reached at which the first turn of the tractor's turn around is to be initiated, the circuitry provides a drive signal to the steering coupled motor to turn the tractor's steering mechanism in an appropriate direction and by an appropriate amount. As the vehicle reaches the end of the first turn, a second turn is initiated and a signal is provided to the steering motor to turn it in the opposite direction and by an appropriate amount. At the same time a binary value representing the Y distance between the previous path of the tractor and the new straightline path which is to be followed is entered in the $\Delta Y$ register as an error signal. Upon completion of the second turn the updating values provided to the Y register have desirably reduced the position error stored in the $\Delta Y$ register to zero. If not, the arrangement previously described brings the tractor to the desired new straightline path in a rapid and efficient manner. As the tractor reaches an appropriate X position as reflected by the binary value in the X register, the tractor's plow is lowered and the engine torque is increased to resume plowing.

For certain applications of the tractor it may be desirable to update the Y, angle and quadrant registers directly using devices mounted at the opposite ends of the field rather than continuously relying on the wheel generated pulses. In one preferred arrangement for updating the Y register directly in this fashion, sensor strips having coded surfaces corresponding to the different bit positions of the Y register are located at opposite ends of the field. Each time the tractor crosses one of the sensor strips a plurality of photosensors associated with the different bit positions of the Y register respond to the presence or absence of reflected light from the different coded surfaces on the strip to set the correct Y value directly into the Y register. A cumulative total of all changes $\Delta Y$ in the Y position of the tractor is provided to the $\Delta Y$ register together with the binary value of Y stored in the Y register. Any difference therebetween comprises a position error signal, which signal is applied to the steering motor to correct the Y position of the vehicle. In one preferred arrangement for updating the angle and quadrant registers directly from field mounted devices a sensor strip is mounted at each end of the field adjacent the sensor strips used to update the Y value. Each time the tractor passes over one of the sensor strips a current is induced in a conductive bar mounted on the underside of the tractor, the magnitude of the current varying in direct relation to the angular orientation of the bar relative to the sensor strip. The current is processed by appropriate logic circuitry to provide binary representations of the approximate heading angle and quadrant, which representations are entered directly into the angle and quadrant registers.

Where the terrain over which the vehicle travels is relatively rough or irregular a terrain roughness correction system may be employed to periodically make appropriate corrections in the number of pulses generated by the vehicle wheels. The correction system includes a brush and contact set individually associated with each pulse generating vehicle wheel for generating pulses in accordance with vertical wheel motion and circuitry including counters and gates which responds to the generated pulses to generate an appropriate number of correction pulses in accordance with a formula. The correction pulses associated with each pulse generating vehicle wheel are thereafter subtracted from the pulses generated by the wheel to compensate for terrain roughness.

BRIEF DESCRIPTION OF THE DRAWINGS

The foregoing and other objects, features and advantages of the invention will be apparent from the following more particular description of preferred embodiments of the invention, as illustrated in the accompanying drawings, in which:

FIG. 3 is a detailed block diagram of a portion of the arrangement of FIG. 2;

FIG. 5 is a detailed block diagram of a portion of the arrangement of FIG. 2;

FIG. 8 is a block diagram of a part of the wheel diameter error compensator shown in the arrangement of FIG. 1;

Figure 10:
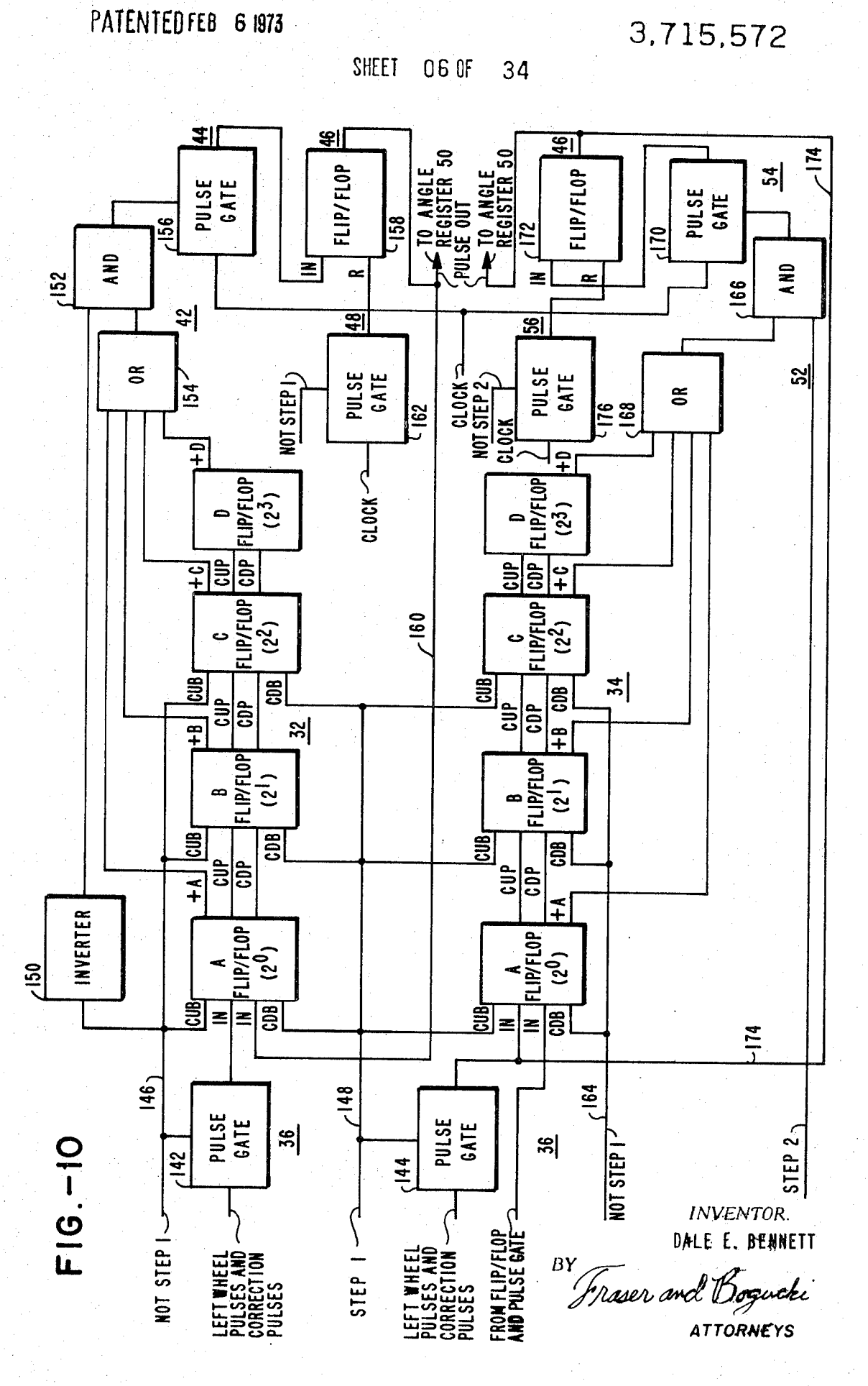

FIGS. 9 through 15 are detailed block diagrams of one preferred embodiment of the computer system of FIG. 1;

FIG. 22 is a diagrammatic plot useful in explaining the manner in which the arrangement of FIG. 19 operates;

FIG. 23 is a block diagram of one arrangement for use in conjunction with the arrangement of FIG. 19 to effect turn around of the vehicle at the opposite ends of a field;

FIG. 29 is a plan view of a field mounted sensor strip for use with the arrangement of FIG. 28;

FIG. 30 is a sectional view of the sensor strip of FIG. 29 which also shows the associated equipment mounted on the underside of the vehicle;

FIG. 42 is a table also useful in explaining the theory of operation of the arrangement of FIG. 39.

DETAILED DESCRIPTION

Figure 1:
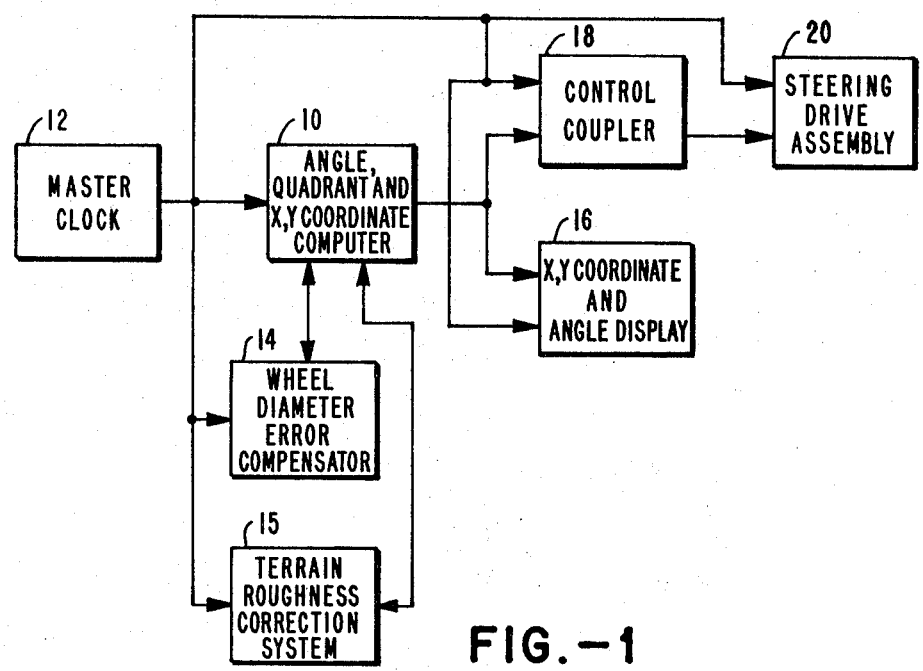
FIG. 1 is a block diagram of a vehicle location and heading computer system in accordance with the invention.

The basic components of a vehicle location and heading computer system according to the invention are illustrated in FIG. 1. An angle, quadrant and X, Y coordinate computer 10 responds to pulses generated by the wheels, tracks or other rotatable means of the vehicle to electronically compute and store representations of the heading and location of the vehicle relative to a coordinate system comprising intersecting X and Y axes. The computer 10 operates under the control of a master clock 12 which provides clocking signals of different frequency to the computer 10 and other components and which periodically initiates timed sequences of operational steps to be described hereafter in detail. A wheel diameter error compensator 14 may be employed to adjust the number of pulses generated by the vehicle wheels or tracks to compensate for errors introduced such as by equal wheel diameters. A terrain roughness correction system 15 may also be employed to adjust the number of pulses generated by the vehicle wheels to compensate for errors introduced by roughness of irregularities in the terrain over which the vehicle is traveling. An X, Y coordinate and angle display 16 responds to the values computed and stored by the computer 10 to provide a visual display of vehicle location and heading relative to the X, Y coordinate system, an area map, or other appropriate reference. A control coupler 18 processes the angle, quadrant and coordinate values stored by the computer 10 prior to their being employed in a steering drive assembly 20 to steer the vehicle over a predetermined course without the need for an operator or driver.

Figure 2:
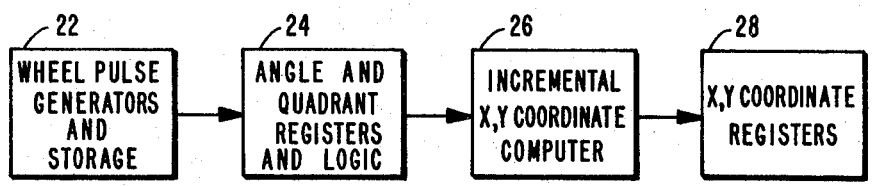
FIG. 2 is a block diagram showing the basic components of the X and Y coordinate, angle and quadrant computer of FIG. 1.

The angle, quadrant and X, Y coordinate computer 10 of FIG. 1 is shown in somewhat greater detail in FIG. 2. The computer 10 includes wheel pulse generators and storage 22, angle and quadrant registers and logic 24, an incremental X, Y coordinate computer 26 and X, Y coordinate registers 28. The wheel pulse generators and storage 22 generate and temporarily store a pulse each time either of the left and right vehicle wheels rotate through a fixed increment. The left and right wheels used for pulse generation must have axes of rotation fixed relative to the vehicle longitudinal axis. In the case of an automobile, for example, the front wheels cannot be used since their axes of rotation vary relative to the vehicle longitudinal axis to effect steering. The left and right rear wheels are therefore used. Although the system is hereafter described in terms of a vehicle having left and right wheels in contact with the surface over which it travels, it will be understood that the invention is also applicable to non-wheeled vehicles such as those which are supported and conveyed by endless tracks disposed about wheels or other circular objects mounted on the vehicle.

The wheel pulse generators and storage 22 store the left and right wheel pulses until the total number of stored pulses equals a predetermined number, indicating that the vehicle has traversed a predetermined fixed distance. When the number of stored pulses reaches the predetermined number, the temporarily stored pulses are transferred out of the storage 22 and into the angle and quadrant registers and logic 24. Those pulses generated by the left wheel are entered into an angle register in one sense, while pulses generated by the the right wheel are entered in an opposite sense, the senses being determined by the particular quadrant of the coordinate system in which the vehicle heading is located as represented by a quadrant register. The binary value stored in the angle register represents the angle between vehicle heading and the X axis of the coordinate system. Each time the temporarily stored left and right wheel pulses are transferred to update the angle and quadrant registers, the incremental X, Y coordinate computer 26 responds by computing the change in vehicle location relative to the X and Y axes, the changes in location relative to the two axes being entered into the X, Y coordinate registers 28 to update the values stored therein. The changes $\Delta X$ and $\Delta Y$ are added to or subtracted from the binary values stored in the X, Y coordinate registers 28 depending on the quadrant in which vehicle heading is located. As will become more fully apparent from the discussion to follow, the updating of the X, Y coordinate registers 28 each time the vehicle has traveled a known distance enables the computation of $\Delta X$ and $\Delta Y$ using the sine and cosine of the updated heading angle as stored in the angle register.

The arrangement of FIG. 2 is shown in considerably more detail in FIGS. 3 and 5. In FIG. 3 the right wheel pulse generator and storage have been eliminated for simplicity. The left wheel pulse generator and storage includes a pulse generator 30 for providing a pulse each time the left wheel undergoes a fixed increment of rotation. The generator 30 may comprise any appropriate arrangement, the specific details being unimportant to the present invention. For example, the generator 30 may comprise brushes and contacts, or an interrupted light source and photocell combination.

The pulses from the generator 30 are passed to intermediate A and B storage registers 32 and 34 via a selection switch 36 and to a wheel pulse averaging register 38. The generator 30 is normally coupled to the A storage register 32 rather than to the B storage register 34, and both registers 32 and 34 are normally biased to count up in binary fashion.

The selection switch 36 and other such switches shown and hereafter described are included for the sake of simplicity. As will become apparent from later discussions most such switches are inherently a part of and the functions thereof are performed by the particular electronic circuitry employed.

The wheel pulse averaging register 38 is coupled to simultaneously count the pulses generated by the left wheel pulse generator 30 and by the right wheel pulse generator (not shown). When the total count in the register 38 reaches a predetermined total, hereafter conveniently described as 16, an eight-step processing and computing sequence is initiated within a processing and computation step generator 40. The eight steps generated thereby occur sequentially and are of substantially equal duration. Prior to initiation of the generator 40, the selection switch 36 couples the left wheel pulse generator 30 to enable the intermediate A storage register 32 to count up the pulses generated thereby. The register 32 also counts up correction pulses which are generated in a manner hereafter described to compensate for variations in the wheel diameters and the like and to compensate for terrain roughness. Upon generation of the first step, STEP 1, by the processing and computation step generator 40, the selection switch 36 is changed to couple the left wheel pulse generator 30 to the intermediate B storage register 34. During STEP 1 the intermediate B storage register 34 is biased to count in an upward direction and to thereby store pulses from the left wheel pulse generator 30 as well as wheel diameter correction pulses.

A zero logic circuit 42 associated with the intermediate A storage register 32 positions a switch 44 so as to couple a pulse generator 46 to a switch 48 whenever the binary value stored in the intermediate A storage register 32 is not zero. When such binary value is zero, the switch 44 is opened. The switch 48 couples the switch 44 to the intermediate A storage register 32 as well as to an angle register 50. The switch 48 is closed during STEP 1 and is opened at all other times. Also associated with the intermediate B storage register 34 is a zero logic circuit 52 for closing an associated switch 54 when the binary value in the intermediate B storage register 34 is not zero and for opening the switch 54 at all other times. A switch 56 couples the switch 54 to the intermediate B storage register 34 and to the angle register 50 when closed, the switch 56 being closed during the second step, STEP 2, of the eight step computation and processing sequence and being opened at all other times.

Thus, each time the predetermined pulse count is reached in the wheel pulse averaging register 38, an eight step processing and computation sequence is initiated. During STEP 1 the wheel pulse generator 30 is coupled to count up the intermediate B storage register 34 and the switch 44 is coupled to the A storage register 32 and to the angle register 50 by the switch 48. If the pulse count stored in the intermediate A storage register 32 is other than zero, the switch 44 is closed coupling the pulse generator to the intermediate A storage register 32. During STEP 1 the A storage register 32 is biased to count in a downward direction, and pulses from the generator 46 count the A storage register 32 down to zero while at the same time being fed to the angle register 50. When the A storage register 32 reaches zero, the associated zero logic circuit 42 responds by opening the switch 44 to terminate the countdown process. Upon commencement of STEP 2 the selection switch 36 is repositioned to couple the wheel pulse generator 30 to the intermediate A storage register 32 and the switch 56 couples the switch 54 to the intermediate B storage register 34 and to the angle register 50. If any pulses were generated and stored in the B register 34 during STEP 1, the switch 54 is closed and pulses from the pulse generator 46 count the intermediate B storage register 34 down to zero while being fed to the angle register 50. When the register 34 reaches zero, the associated zero logic circuit 52 opens the switch 54. During the remaining STEPS 3–8 of the sequence and at all other times except during STEP 1 the switch 36 couples the A storage register 32 to count the generated wheel pulses. The intermediate B storage register 34 and the circuitry associated therewith greatly enhance the accuracy of the system by insuring that wheel pulses will not be lost during STEP 1 when the A register 32 is being counted down to zero.

The circuitry associated with the right wheel pulses is identical to that shown in FIG. 3. During STEPS 3 and 4 of the eight step processing and computing sequence, the intermediate A and B storage registers associated with the right wheel are counted down and the values stored therein entered in the angle register 50.

Figure 4:
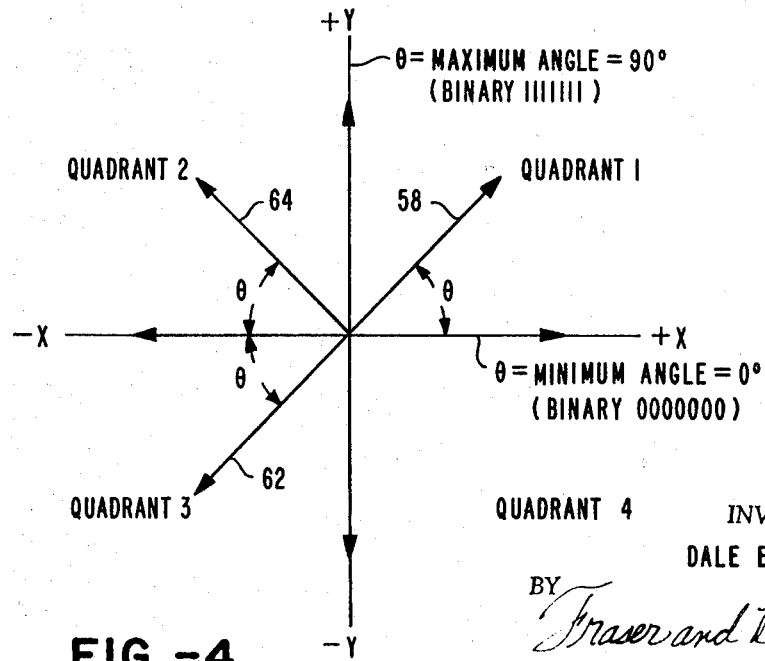
FIG. 4 is a diagrammatic illustration of the X, Y coordinate system as used in the invention.

The X, Y coordinate system with which the computer system is used is illustrated in FIG. 4, and comprises mutually perpendicular and intersecting X and Y axes. The axes divide the coordinate system into four quadrants which, together with the heading or pointing angle $\theta$, define the vehicle heading. The vehicle location is also computed with reference to the X and Y axes. The angle $\theta$ as stored in the angle register 50, shown in FIG. 3, varies between 0° and 90° and is the angle between the vehicle heading and the X axis. Thus if the vehicle heading relative to the coordinate system is as shown by an arrow 58 in FIG. 4, the heading is denoted by the angle $\theta$ between the arrow 58 and the X axis as stored in the angle register 50 and by an associated quadrant register 60 (FIG. 3), which in this instance would indicate that the heading lies in QUADRANT 1. If the heading is as shown by an arrow 62 in FIG. 4, the angle $\theta$ as stored by the angle register 50 is again the angle between the arrow 62 and the −X axis. In this instance, however, the quadrant register 60 indicates that the heading lies in QUADRANT 3. The angle $\theta$ as stored in the register 50 comprises for purposes of the present example a seven digit binary number ranging from 0000000 for 0° to 1111111 for 90°.

The left and right wheel pulses are added to or subtracted from the angle register 50 in conventional binary fashion. Whether the pulses from a particular wheel are added or subtracted, however, is determined by the particular quadrant in which the vehicle heading lies. As viewed in FIG. 4 left wheel pulses represent a turning of the vehicle in a clockwise direction while right wheel pulses indicate a turning in the counterclockwise direction. If the heading lies in QUADRANT 1, a counterclockwise turning of the vehicle as provided by right wheel pulses will increase the angle $\theta$, while a clockwise turning of the vehicle as provided by left wheel pulses will decrease the angle $\theta$. On the other hand if the heading lies within QUADRANT 2 as represented by an arrow 64 shown in FIG. 4, right wheel pulses will tend to decrease the angle $\theta$ while left wheel pulses will tend to increase the angle. When the vehicle is traveling in reverse rather than forward, the same considerations apply but in an opposite sense.

As shown in FIG. 3 a count up-down logic circuit 66 coupled between the angle register 50 and the quadrant register 60 determines whether the wheel pulses should be added to or subtracted from the binary value stored in the angle register 50. The logic circuit 66 responds to the quadrant as represented by the register 60 and to the particular steps of the eight step processing and computing sequence. Pulses generated during STEPS 1 and 2 are identified as left wheel pulses, while pulses generated during STEPS 3 and 4 are identified as right wheel pulses. During STEPS 1 and 2 the logic circuit 66 biases the angle register 50 to count down if the heading is within QUADRANT 1 or 3 and to count up if the heading is within QUADRANT 2 or 4. During STEPS 3 and 4, when right wheel pulses are present, the logic circuit 66 biases the angle register 50 to count up if the heading is within QUADRANT 1 or 3 and to count down if the heading is within QUADRANT 2 or 4. The count up-down logic circuit 66 has a third input representing the direction of the vehicle. The above discussion assumes that the vehicle is traveling forward. However, if the vehicle is traveling in reverse the logic circuit 66 so responds by reversing the directions of biasing mentioned above.

Whenever the angle $\theta$ decreases to 0° as represented by the binary value 0000000 in the angle register 50, an associated minimum angle pulse generator 68 provides a pulse to the quadrant register 60 to change the quadrant representation stored therein. The register 60 responds by counting up or down as determined by an associated count up-down logic circuit 70. The logic circuit 70 makes a decision based on whether the system is sequencing through STEPS 1 and 2 or STEPS 3 and 4. During STEPS 1 and 2 when only left wheel pulses may be received to denote a turning of the vehicle in a clockwise direction, the reduction of the angle $\theta$ to 0° indicates that the next lower numbered quadrant is being entered. Thus if the heading was previously located in QUADRANT 3, the reduction of the angle $\theta$ to 0° indicates that the heading is about to enter QUADRANT 2. Similarly if the heading is located in QUADRANT 1, the reduction of $\theta$ to 0° indicates that QUADRANT 4 is about to be entered. During STEPS 3 and 4 when right wheel pulses are received, a reduction of the angle $\theta$ to 0° indicates that the next higher numbered quadrant is about to be entered. Thus if the heading is presently in QUADRANT 4, a reduction of the angle $\theta$ to 0° during STEPS 3 and 4 indicates that QUADRANT 1 is about to be entered. Similarly a reduction of $\theta$ to 0° when the heading has been in QUADRANT 2 indicates that QUADRANT 3 is about to be entered. As in the case of the count up-down logic circuit 66, the logic circuit 70 also responds to a direction signal, with the sense of the above mentioned biasing being reversed in the event the vehicle is traveling in reverse rather than forward.

The quadrant register 60 and associated count up-down logic circuit 70 operate in a similar fashion in response to a pulse generated by a maximum angle pulse generator 72 whenever the angle stored in the angle register 50 reaches 90° as represented by the binary number 1111111. During STEPS 1 and 2 when received pulses denote a clockwise turning, the representation in the quadrant register 60 will be changed from QUADRANT 2 to QUADRANT 1 or from QUADRANT 4 to QUADRANT 3. During STEPS 3 and 4 the quadrant representation will change from QUADRANT 1 to QUADRANT 2 or from QUADRANT 3 to QUADRANT 4.

It will be seen that upon initiation of each eight step sequence in response to travel of the vehicle through the predetermined fixed distance, the angle register 50 is updated during the first four steps of the sequence to represent the new vehicle heading, with the quadrant register 60 being changed as appropriate. During the remaining STEPS 5-8 of the processing and computing sequence the updated value of the angle $\theta$ stored in the register 50 is used to update the X and Y position coordinates of the vehicle by computing the sine and cosine of the angle $\theta$ as hereafter described using apparatus which is generally shown in FIG. 5.

If $\Delta R$ is assumed to represent the change in vehicle location between successive updatings of the angle register 50, then the expressions may be written:

$$\Delta X = \Delta R \sin \theta$$

$$\Delta Y = \Delta R \cos \theta$$

But as previously discussed each location change of the vehicle involves a predetermined fixed distance, and therefore $\Delta R$ is equal to a constant, $K$. Thus:

$$\Delta X = K \sin \theta$$

$$\Delta Y = K \cos \theta$$

If the parameters of the system are such that the constant $K$ representing $\Delta R$ equals unity, then:

$$\Delta X = \sin \theta$$

$$\Delta Y = \cos \theta$$

Also, since cosine $\theta$ equals sine $(90° - \theta)$, then:

$$\Delta Y = \sin (90° - \theta)$$

It will therefore be seen that $\Delta X$ may be computed by determining the sine of the heading angle $\theta$, and $\Delta Y$ may be computed by determining the sine of 90° minus the heading angle $\theta$, or the inverse of the binary representation of this angle.

Referring to FIG. 5 computation of the sine of the angle $\theta$ is begun during STEP 5 by positioning a selection switch 74 to couple the angle register 50 through a transfer logic circuit 76 to a sine-cosine register 78. The sine-cosine register 78 is similar in arrangement to the angle register 50. The transfer logic circuit 76 couples the various register stages of the registers 50 and 78 in parallel so as to non-destructively transfer the binary value stored in the angle register 50 into the sine-cosine register 78 for temporary storage therein. During the following STEP 6 the switch 74 uncouples the transfer logic circuit 76 and associated sine-cosine register 78 from the angle register 50, and the binary value stored in the sine-cosine register 78 is counted down to zero by a pulse generator 80 coupled to the register 78 and to a segment counter 82 via switches 84 and 86. The selection switch 86 couples the switch 84 to the register 78 and the counter 82 so long as the binary value stored in the register 78 is not zero. The switch 84 couples the switch 86 to the pulse generator 80 during STEPS 6 and 8. The binary values stored in the sine-cosine register 78 are used for establishing the logic for the destructive transfer of values stored in the sine-cosine register 78 to the segment counter 82 during STEP 6.

The segment counter 82 passes a selected portion or ratio of the pulses generated by the generator 80 to a Y register 88 via a switch 90, the ratio being determined by a segment logic circuit 92 coupled between the segment counter 82 and the sine-cosine register 78. A count up-down logic circuit 94 coupled between the Y register 88 and the quadrant register 60 determines whether the pulses from the segment counter 82 representing $\Delta Y$ are added to or subtracted from the binary value in the Y register 88. Thus, if the heading lies in QUADRANT 1 or 2 the $\Delta Y$ pulses are added to the Y register 88, whereas if the heading lies in QUADRANT 3 or 4 the $\Delta Y$ pulses are subtracted from the Y register 88.

During STEP 7 the selection switch 74 is repositioned to couple the sine-cosine register 78 to the angle register 50 via the transfer logic circuit 76 and an inverter 96. The inverter 96 and transfer logic circuit 76 non-destructively transfer the inverse of the binary value stored in the angle register 50 into the sine-cosine register 78 by transferring "ones" as "zeros" and "zeros" as "ones." The resulting binary value as temporarily stored in the sine-cosine register 78 represents 90° minus the angle $\theta$. As previously shown the computation of the sine of such angle provides the cosine of $\theta$. During STEP 8 the pulse generator 80 is again coupled to count down the sine-cosine register 78 and at the same time provide pulses to the segment counter 82. The selection switch 90 is repositioned to couple the segment counter 82 to an X register 98, the up and down counting of which is also controlled by the count up-down logic circuit 94. As in the case of $\Delta Y$, $\Delta X$ is determined by the segment counter 82 and associated logic circuit 92, the counter 82 passing a selected portion or ratio of the pulses from the pulse generator 80 to the X register 98 under the control of the segment logic circuit 92.

Figures 6, 7:
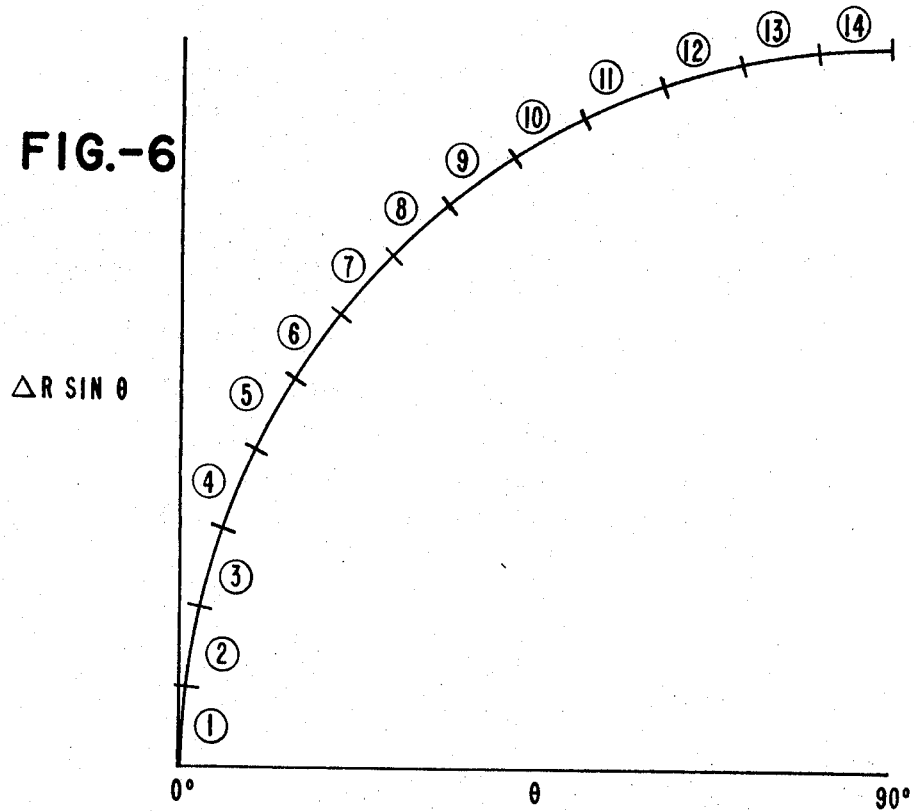
FIG. 6 is a diagrammatic plot useful in explaining the manner in which the ΔR sine and ΔR cosine of the heading angle are computed.
FIG. 7 is a table also useful in explaining the manner in which the ΔR sine and ΔR cosine of the heading angle are computed.

The manner in which the segment counter 82 and segment logic circuit 92 function to compute the sine of the angles $\theta$ and $90° - \theta$ may be better understood with reference to FIGS. 6 and 7. FIG. 6 is a plot of $\Delta R$ sine $\theta$ as a function of $\theta$. The resulting curve which covers the range 0° to 90° for the angle $\theta$ is arbitrarily divided into fourteen different segments as shown. The binary value, initially transferred into the sine-cosine register 78 during STEP 5 or 7 and before count down, is identified by the segment logic circuit 92 as falling within a particular one of the fourteen segments. As the stored binary value is thereafter counted down to zero, the binary value decreases so as to advance along the curve through the successively lower numbered segments, until the first segment is reached and the angle $\theta$ decreases to 0°. As the binary value in the sine-cosine register 78 is counted down to zero, the associated segment logic circuit 92 senses when the binary value is within each segment to provide the predetermined pulse ratio for that particular segment to the segment counter 82. The segment counter 82, as previously mentioned, passes a selected portion or ratio of the pulses from the pulse generator 80 as determined by the segment logic circuit 92.

The table of FIG. 7 shows the angle binary value range, the range of $\Delta Y$ or $\Delta R$ sine $\theta$, and the pulse ratio, for each of the fourteen segments. It will be noted that the segments are of unequal length and have slopes which vary depending upon which particular portion of the curve or plot they represent. $\Delta Y$ is arbitrarily defined as having a maximum value of 65.0 at 90°. The pulse ratios which depend in part upon the slope and length of the associated segments range from 1:1 to 1:8, with even whole numbers being chosen to facilitate the dividing of pulses. The computation of the cosine of the angle $\theta$ is performed in the same manner except that the binary angle represents $90° - \theta$ and the $\Delta Y$ values as shown in FIG. 7 become those of $\Delta X$.

The computation of the sine and cosine of the heading angle $\theta$ may be better understood by considering one practical example. If at the beginning of STEP 5 of an eight-step processing and computing sequence the angle register 50 as updated has a relatively small angle $\theta$ of binary value 0010010, the transfer logic circuit 76 during STEP 5 transfers the binary value 0010010 in parallel to the sine-cosine register 78. At the beginning of STEP 6 the pulse generator 80 begins passing pulses to the sine-cosine register 78 and the segment counter 82. The segment logic circuit 92 initially responds to the stored binary valve 0010010 to determine that the angle $\theta$ lies in segment four. A 1:2 pulse ratio is thereby effected by the segment counter 82 to pass one pulse to the Y register 88 for each pair of pulses received from the pulse generator 80 while the angle remains in the fourth segment. When the angle as stored in the sine-cosine register 78 has been counted down to binary value 0001111, the segment logic circuit 92 determines that the angle has entered the third segment, and the segment counter 82 effects a 1:1 ratio to pass each pulse from the pulse generator 80 to the Y register 88. As the binary value is counted down to 0000111, the segment logic circuit 92 identifies the second segment, and the segment counter 82 again effects a 1:2 ratio to pass one of each pair of pulses from the generator 80 to the Y register 88. Finally as the binary value is counted down to 0000011, the first segment is identified and a 1:1 ratio is again effected to pass each pulse from the generator 80 to the Y register 88 until the sine-cosine register 78 has been counted to binary 0000000 and the selection switch 86 opened. The pulses as passed by the segment counter 82 are added to or subtracted from the binary value in the Y register 88 as determined by the count up-down logic circuit 94.

During STEP 7 the binary value 0010010 as stored in the angle register 50 is inverted by the inverter 96 and entered in the sine-cosine register 78 as binary value 1101101. At the beginning of STEP 8 the initial binary value 1101101 is determined to fall within the 13th segment so as to effect a pulse transfer ratio of 1:4. The sine-cosine register 78 is thereafter counted down to zero value during the remainder of STEP 8 to provide $\Delta X$ to the X register 98.

As described in connection with FIG. 1, a wheel diameter error compensator 14 provides correction pulses to the angle, quadrant and X, Y coordinate computer 10. The left wheel error compensator is illustrated in FIG. 8 and operates in conjunction with the left wheel pulse generator and storage shown in FIG. 3. Pulses generated by the left wheel pulse generator 30 (FIG. 3) are applied to the intermediate A and B storage registers 32 and 34 as previously described and to a left wheel correction pulse generator 100 shown in FIG. 8. The generator 100 may comprise a multiple divider or other appropriate circuitry for providing a variety of different portions or ratios of the left wheel pulses to an output terminal 102. Any one or more of the different ratios may be provided the output terminal 102 by closure of an appropriate one or ones of selection switches 104. The ratio are conveniently made available in a range from 1:2 through 1:1024. The pulses are provided at the output terminal 102 are entered in the intermediate A and B store registers 32 and 34 along with the pulses from the left wheel pulse generator 30 as shown in FIG. 3.

The correction pulses may be used to compensate for the differences in the diameters of the left and right wheels. Thus, if the left wheel is larger in diameter than the right wheel and the vehicle is traveling straight ahead, the left wheel will turn more slowly than the right wheel and will accordingly generate fewer pulses. The situation may be compensated for by adjusting the error compensator associated with the left wheel to provide a selected ratio of correction pulses in addition to those generated by the left wheel pulse generator. The error compensators may also find use in situations where the wheel diameters are virtually identical but the numbers of pulses generated by the left and right wheels for straight-ahead travel are unequal due to circuit differences such as in the pulse generators themselves. In such instances the pulses generated by each wheel for straightahead travel may be measured, and one or both error compensators employed as required.

Figure 11:
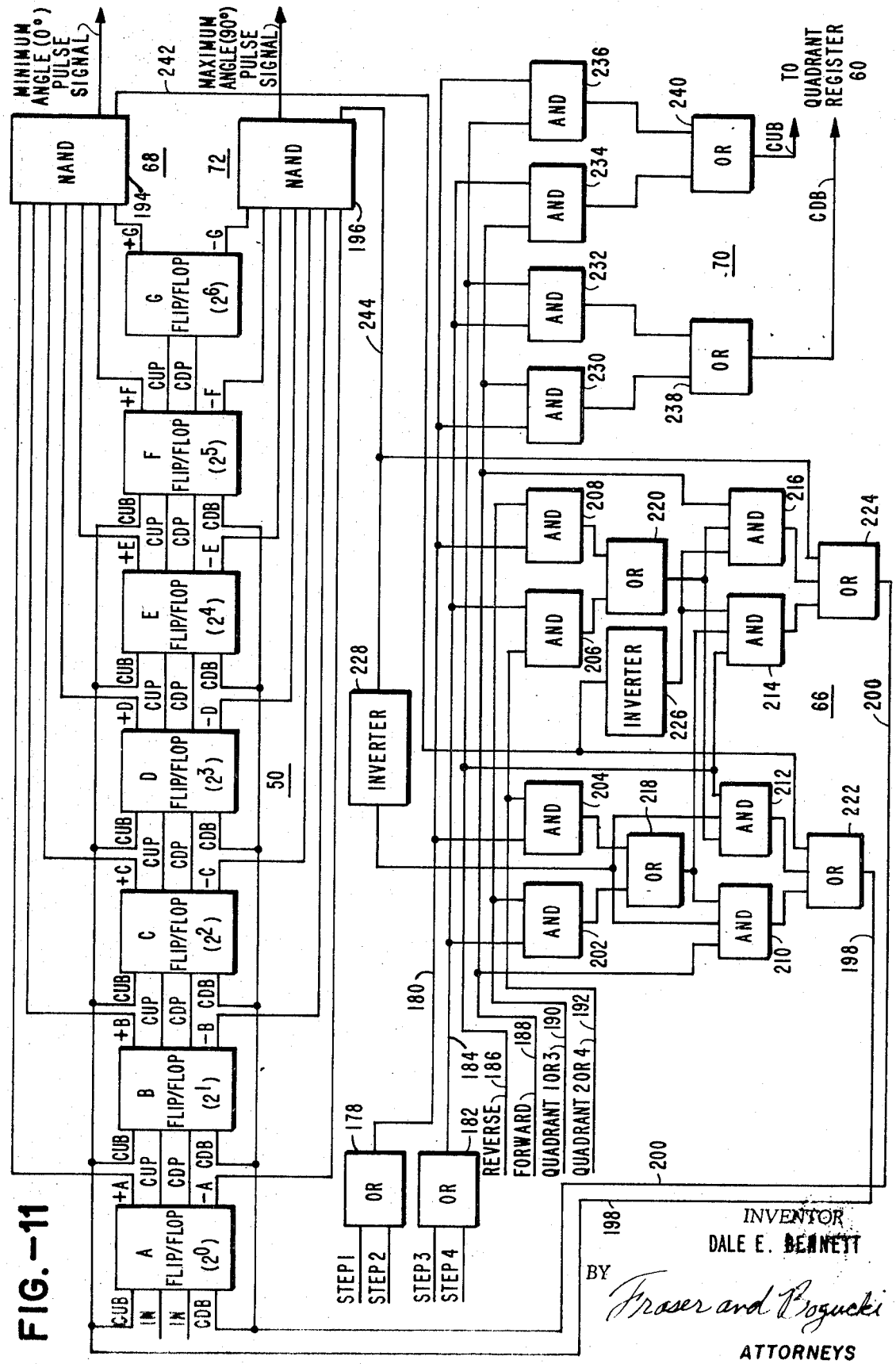
Figure 12:
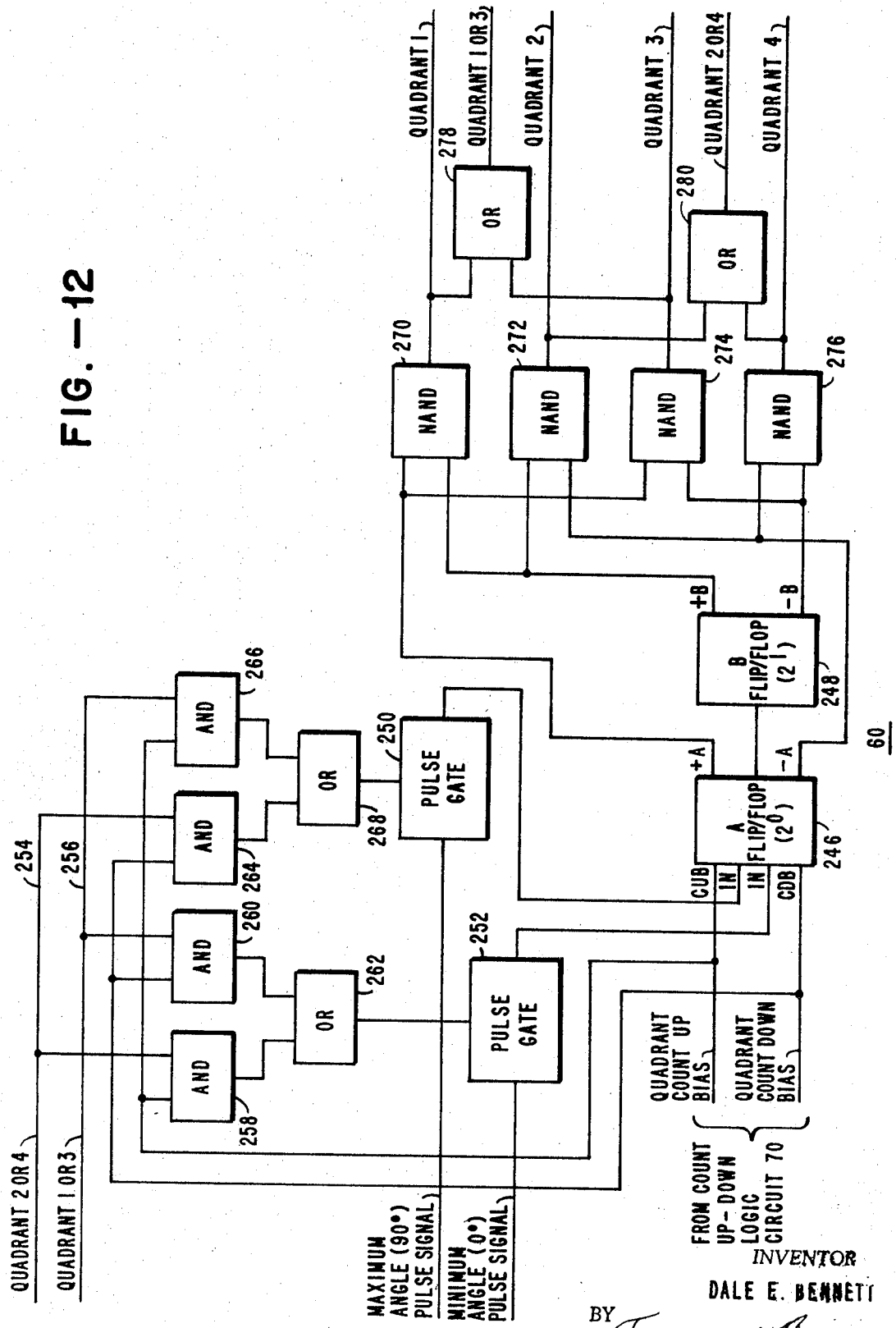
Figure 13:
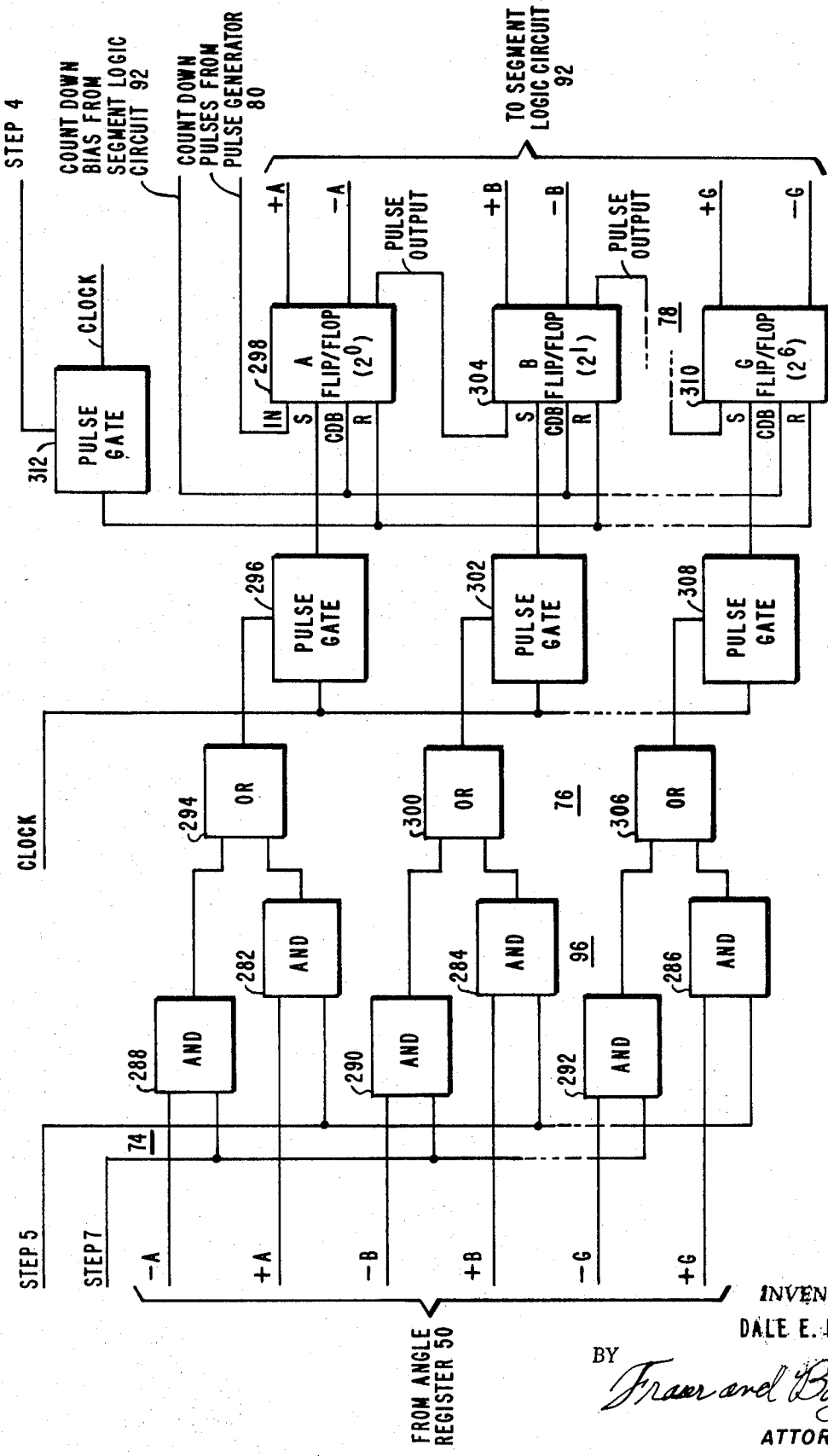
Figure 14:
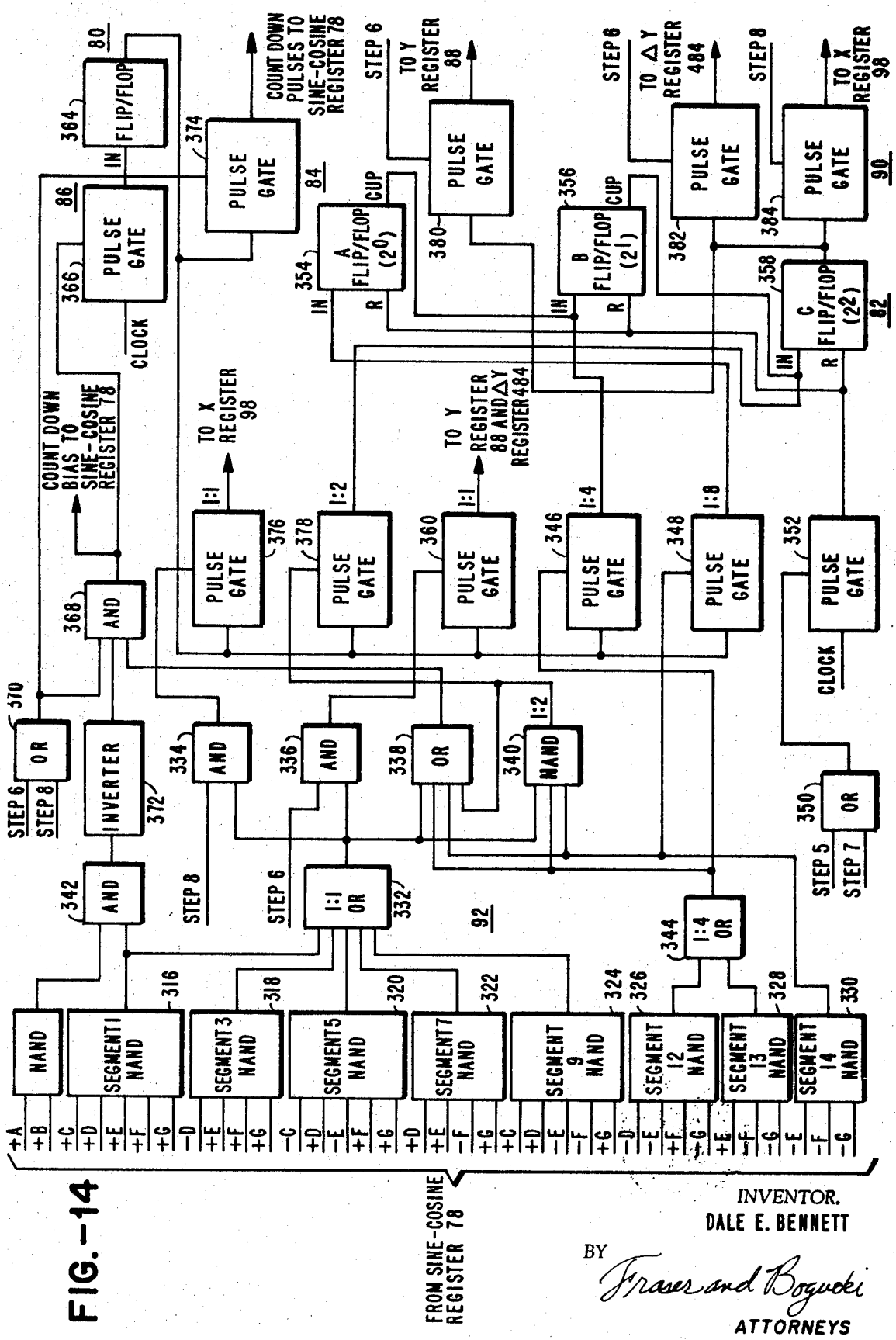
Figure 15:
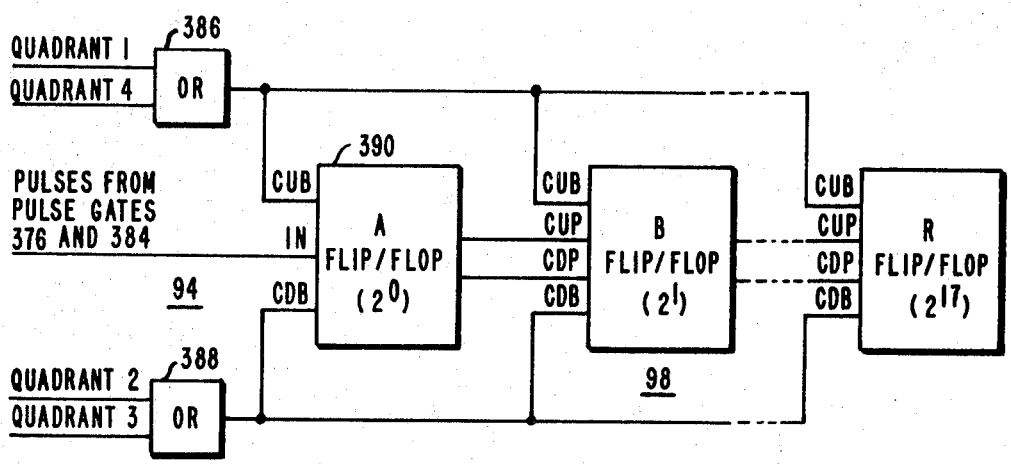
Figure 16:
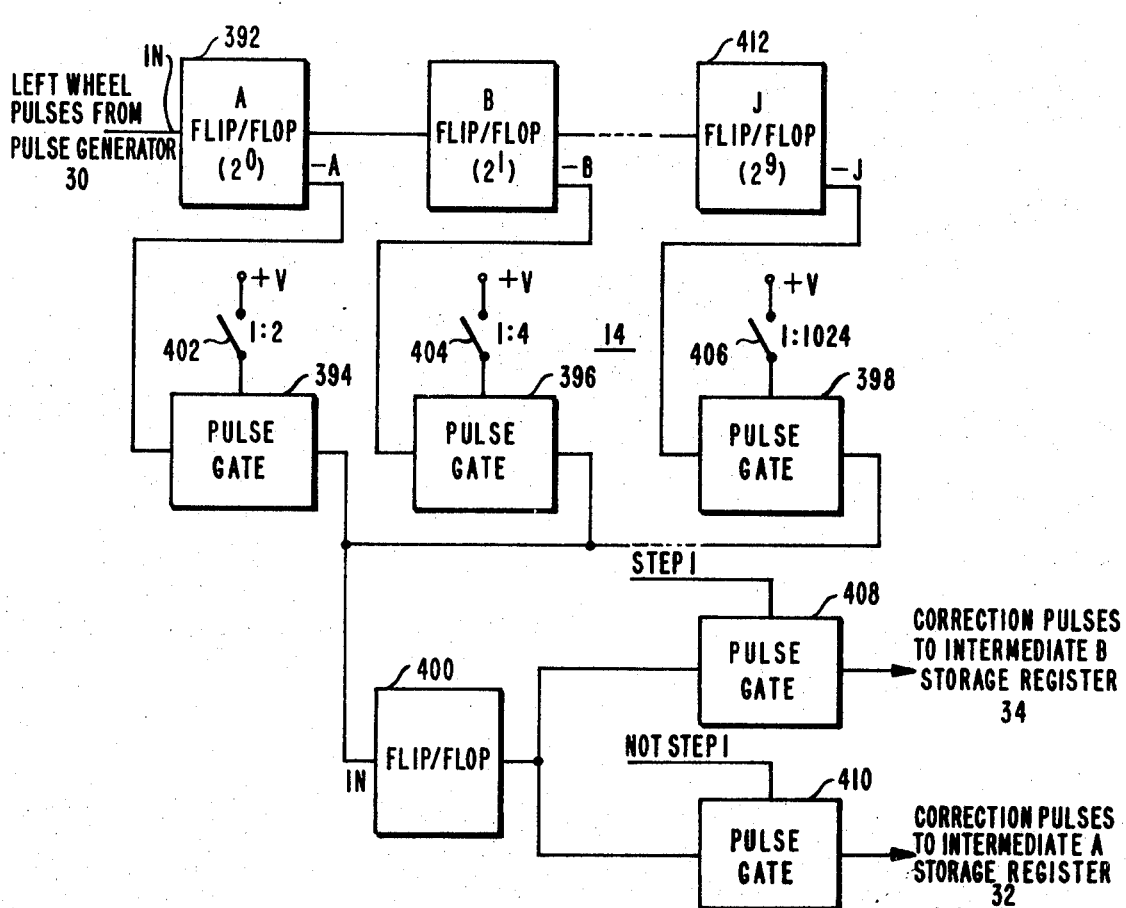
FIG. 16 is a detailed block diagram of one preferred embodiment of the wheel diameter error compensator shown in FIG. 8.

One preferred arrangement of the system described thus far is illustrated in considerable detail in FIGS. 9 through 16. FIG. 9 is a block diagram of a portion of such arrangement including the wheel pulse averaging register 38 and the processing and computation step generator 40 shown in FIG. 3. FIG. 10 is a block diagram of a portion of such arrangement including the switch 36, the intermediate A and B storage registers 32 and 34, the zero logic circuits 42 and 52, the pulse generator 46, and the switches 44, 48, 54 and 56 shown in FIG. 3. FIG. 11 shows a portion of such arrangement including the angle register 50, the count up-down logic circuit 66, the minimum angle pulse generator 68, the count up-down logic circuit 70 and the maximum angle pulse generator 72, shown in FIG. 3. FIG. 12 comprises the quadrant register 60 shown in FIG. 3. FIG. 13 shows a portion of such arrangement including the switch 74, the transfer logic circuit 76, the sine-cosine register 78 and the inverter 96, illustrated in FIG. 5. FIG. 14 shows a portion of such arrangement including the pulse generator 80, the segment counter 82, the switches 84, 86 and 90, and the segment logic circuit 92, illustrated in FIG. 5. FIG. 15 illustrates a portion of such arrangement including the count up-down logic circuit 94 and the X register 98, illustrated in FIG. 5. FIG. 16 illustrates a portion of such arrangement including the wheel diameter error compensator 14 illustrated in FIG. 8.

Referring to FIG. 9 pulses from the right and left wheel pulse generators are respectively "squared up" by Schmitt triggers 106 and 108 prior to being applied to SET flip flops 110 and 112 respectively. When the flip flop 110 is SET, a voltage at the output closes a pulse gate 114 passing a clock pulse to RESET the flip flop 110. At the same time that the flip flop 110 is SET and AND gate 116 may have one of its inputs enabled by the output of the flip flop 112 but cannot have the other input enabled due to the presence of an inverter 118. Accordingly a pulse gate 120 is open and the flip flop 112 cannot be RESET until after the flip flop 110 is RESET. Since input pulses to the A flip flop 122 of the wheel pulse averaging register 38 are generated only upon RESET of the flip flops 110 and 112, this circuitry insures that right and left wheel pulses are not simultaneously applied to the input of the A flip flop 122 so as to count as a single pulse instead of two separate pulses.

The wheel pulse averaging register 38 which comprises five register stages A through E, only three of these stages being shown in FIG. 9 for simplicity, counts up the right and left wheel pulses in conventional fashion.

At this point it should be understood that the particular flip flops used in the wheel pulse averaging register 38 and as register stages in the various registers shown and described hereafter may comprise any appropriate conventional circuitry. In one practical embodiment constructed and tested according to the invention the register flip flops include two transistors interconnected with resistors, capacitors and diodes, the two transistors alternately conducting to represent the SET and RESET or "one" and "zero" states. Such circuits also include a lamp driver for a visual indicator of the state of the flip flop where desired, and two transistors respectively employed to generate count up pulses (CUP) and count down pulses (CDP) for changing the state of the next adjacent flip flop. SET (S) and RESET (R) inputs to each flip flop are assumed to be capable of setting and resetting the flip flop only. Pulses applied to a flip flop input (IN) are assumed to alternately change the state of the flip flop. A count up bias (CUB) when applied to the flip flops of a register is assumed to bias the register to count up with "ones" being transferred from each bit position to the next more significant bit position in conventional fashion. Likewise a count down bias (CDB) is assumed to bias the flip flops so that the register counts down with "ones" being transferred from each bit position to the next bit position in conventional fashion. A flip flop is assumed to have a positive output (for example +A for an A flip flop) when it is in the "one" or SET state. Likewise a flip flop is assumed to have a negative output (for example −A in the case of the A flip flop) when the flip flop is in the "zero" or RESET state. Changes in the state of a flip flop produce pulses at an output (PULSE OUT) of a flip flop.

The various clock pulse signals (CLOCK) shown and described throughout are derived within the master clock 12 (FIG. 1) from a master oscillator and circuitry for stepping the oscillator down to provide appropriate frequencies. In the previously referred to example of the invention constructed and tested, the master oscillator operates at a frequency slightly lower than 100 KC.

Referring again to FIG. 9 the right and left wheel pulses are counted by the wheel pulse averaging register 38 until a predetermined total, in the present example sixteen, is reached, at which point an output from the last or E flip flop 124 is provided to the SET input of the first or preliminary step flip flop of the processing and computation step generator 40. The various flip flop stages of the register 40 are coupled to operate as a conventional ring counter with each succeeding flip flop being SET by the preceding flip flop and RESET by a clock pulse. During the time that each flip flop is SET, an output signal therefrom signifies that the particular step which the flip flop represents is occurring. The frequency of operation of the ring counter comprising the processing and computation step generator 40 is determined by the clock frequency and it is generally chosen so as to prevent the eight step sequences from overlapping at the maximum speed of the vehicle. In the previously referred to example of the present invention a ring counter operating at 400 cycles per second was found to provide satisfactory results.

A selection switch 126 is arranged to couple a positive voltage to FORWARD, NEUTRAL or REVERSE terminals thereof when the gear shift lever of the vehicle is in forward, neutral or reverse respectively. When the vehicle is traveling forward, the voltage is applied to close a pulse gate 128 thereby setting a flip flop 130 and via an OR gate 132 to close a pulse gate 134 and SET a flip flop 136. The flip flop 136 provides a pulse output only when it is switched from SET to RESET. The pulse output from flip flop 136 is used to SET the preliminary step flip flop of the step generator 40. When the flip flop 130 is SET, however, it provides an output signal or FORWARD bias, which bias is employed in circuitry such as the various count up-down logic circuits to indicate that the vehicle is traveling forward. If the vehicle is shifted into reverse, the switch 126 makes contact with the NEUTRAL terminal as it moves from the FORWARD to the REVERSE terminals. Upon contact with the NEUTRAL terminal the positive voltage is applied to close a pulse gate 138, thereby resetting the flip flop 136 and providing an output signal therefrom to SET the preliminary step flip flop of the step generator 40. This insures that any wheel pulses which have been stored in intermediate A storage register 32 during forward motion will be transferred as forward pulses prior to the generation of reverse motion pulses. As the switch 126 comes into contact with the REVERSE terminal, a pulse gate 140 is closed resetting the flip flop 130 to provide a REVERSE bias signal. At the same time the voltage is passed via the OR circuit 132 to close the pulse gate 134 and again SET the flip flop 136.

Referring to FIG. 10 the left wheel pulses from the pulse generator 30 (FIG. 3) are applied to the selection switch 36 (FIG. 3) in the form of a pair of pulse gates 142 and 144 at the inputs of the intermediate A and B storage registers 32 and 34 respectively. At all times except during STEP 1 the absence of an output signal from the STEP 1 flip flop in the processing and computation step generator 40 is inverted to provide a NOT STEP 1 signal via a lead 146 to close the pulse gate 142 and to apply a count up bias to the intermediate A storage register 32. Left wheel pulses and correction pulses are thereby passed to the input of the A flip flop of the register 32, the four flip flops A, B, C and D of the register being counted up in conventional binary fashion. At the same time that the register 32 is being counted up, the pulse gate 144 is open and the intermediate B storage register 34 is inactive.

During STEP 1 a STEP 1 signal from the STEP 1 flip flop of the processing and computation step generator 40 is passed via a lead 148 to close the pulse gate 144 and apply a count up bias to the register 34. The STEP 1 signal also applies a count down bias to the intermediate A storage register 32. With the pulse gate 144 closed during STEP 1, left wheel pulses and correction pulses are passed to the input of the A flip flop of the intermediate B storage register 34 where they are counted up in conventional binary fashion. At the same time the absence of a signal on the lead 146 is inverted by an inverter 150 to enable one of the two inputs of an AND gate 152. The other input of the AND gate 152 which is coupled to the positive or "one" state outputs of the four flip flops of the intermediate A storage register 32 is enabled so long as at least one of the four flip flops is in the "one" state. The resulting output from the AND gate 152 closes a pulse gate 156 to pass clock pulses to the input of a flip flop 158. The flip flop 158 alternately changes state providing output pulses to the angle register 50 and count down pulses via a lead 160 to the input of the A flip flop of the register 32. The register 32 counts down in response to the pulses from the flip flop 158 until all four flip flops are "zero," at which point the output from the OR gate 154 disappears and the pulse gate 156 opens.

Upon initiation of STEP 2 the signal on the lead 148 disappears and a signal appears on the lead 146 to again apply a count up bias to the intermediate A storage register 32. The NOT STEP 1 signal is also applied to close a pulse gate 162 and apply a clock pulse to RESET the flip flop 158. At the same time a signal from the output of the STEP 2 flip flop of the processing and computation step generator 40 is applied via a lead 164 to bias the intermediate B storage register 34 for count down and to enable one of the inputs of an AND gate 166. If any one of the four flip flops of the register 34 is in the "one" state a signal appears at the output of an OR gate 168 to enable the other input of the AND gate 166 and close a pulse gate 170. Clock pulses are thereby applied to the input of a flip flop 172, and the resulting alternate changes in state of the flip flop provide output pulses to the angle register 50 as well as count down pulses via a lead 174 to the input of the A flip flop of the intermediate B storage register 34. The register 34 counts down until all four flip flops are "zero," at which point the output signal from the OR gate 168 disappears and the pulse gate 170 opens. At the beginning of STEP 3 a NOT STEP 2 signal is applied to close a pulse gate 176 and RESET the flip flop 172.

The corresponding circuitry for the right wheel pulses is substantially identical to that shown for the left wheel pulses in FIG. 10, and has accordingly been eliminated for simplicity of illustration.

The angle register 50 is illustrated in FIG. 11 together with the count up-down logic circuits 66 and 70 and the minimum and maximum angle pulse generators 68 and 72. The outputs of the STEP 1 and STEP 2 flip flops in the processing and computation step generator 40 are coupled through an OR gate 178 to provide a STEP 1 or 2 signal on a lead 180. Similarly the outputs of the STEP 3 and STEP 4 flip flops of the generator 40 are coupled through an OR gate 182 to provide a STEP 3 or 4 signal on a lead 184. The flip flop 130 shown in FIG. 9 provides a signal on a lead 186 when the vehicle is traveling in reverse and a signal on a lead 188 when the vehicle is traveling forward. The quadrant register 60 and associated circuitry to be described in detail hereafter provide a signal on a lead 190 when the vehicle heading lies in QUADRANT 1 or 3 and a signal on a lead 192 when the heading lies in QUADRANT 2 or 4.

The minimum angle pulse generator 68 comprises a NAND gate 194 the various inputs of which are coupled to the positive or "one" of the various flip flops of the angle register 50. The register 50 comprises seven flip flops labeled A through G. The maximum angle pulse generator 72 comprises a NAND gate 916 having its inputs coupled to the negative or "zero" outputs of the various flip flops of the angle register 50. The angle register 50 may be biased to count up or down in conventional binary fashion between 0° or 0000000 and 90° or 1111111, the count up bias being provided via a lead 198 and the count down bias being provided via a lead 200. The choice of seven stages for the angle register 50 is related to the extent of wheel rotation required for the generation of each pulse as well as to the desired accuracy of the system so that the number of pulses from a given wheel necessary to advance the register from 0000000 to 1111111 corresponds to a 90° change in heading. In the present example wheel pulses are generated in response to relatively small increments of wheel rotation with a relatively large number of pulses being generated by each complete rotation of a wheel.

Logic circuitry including a plurality of AND gates 202, 204, 206, 208, 210, 212, 214 and 216, a plurality of NOR gates 218, 220, 222 and 224, and a pair of inverters 226 and 228 is coupled between the leads 198, 200 and the various leads 180, 184, 186, 188, 190 and 192 and the NAND gates 194 and 196 to provide count up or count down bias to the angle register 50 in accordance with the vehicle direction, the quadrant and the step. A plurality of AND gates 230, 232, 234 and 236, and a pair of OR gates 238 and 240 are coupled between the leads 180, 184, 186 and 188 and the quadrant register 60 to provide count up or count down bias to the quadrant register in accordance with the vehicle direction and the step as hereafter described.

When the angle register 50 is counted down to the extent that all seven flip flops are "zero," all of the inputs of the NAND gate 194 are disabled and an output pulse signal is provided to the quadrant register 60 via pulse gate 252 as well as an enable signal via a lead 242 to the OR gate 222 and the inverter 226. The inverter 226 insures that all of the inputs of the AND gates 214 and 216 cannot be enabled so as to provide a count down bias while the angle register is at 0°. At the same time the signal on the lead 242 is passed by the OR gate 222 to provide a count up bias to the angle register 50, thereby insuring that the angle register will begin counting up from 0° as wheel pulses are received. When all seven of the angle register flip flops are in the "one" state representing 90°, all of the inputs of the NAND gate 196 are enabled and a pulse signal is provided to the quadrant register 60 via pulse gate 250 as well as an enable signal via a lead 244 to the inverter 228 and the OR gate 224. The inverter 228 insures that all of the inputs of the AND gates 210 and 212 cannot be enabled so as to provide a count up bias. At the same time the signal on the lead 244 is passed via the OR gate 224 to provide count down bias to the angle register 50. Thereafter as pulses are received the angle register begins to count down from 90°. Although the signals generated at the outputs of the NAND gates 194 and 196 exist so long as all of the NAND gate inputs are disabled, such signals are conveniently referred to as short discretes since they are of relatively short duration and disappear as soon as the next wheel pulse is received.

The manner in which the count up-down logic circuits 66 and 70 function may be better understood by considering one practical example in which it is assumed that the vehicle is traveling forward, the vehicle heading lies within QUADRANT 1 and STEP 1 is in progress. It will be recalled that during STEP 1 the intermediate A storage register 32 shown in FIG. 10 is counted down to zero with the count down pulses being provided by the flip flop 158 to the angle register 50. Such pulses are entered in the A flip flop of the register 50. Signals appear on the leads 180, 188 and 190. The signals on the leads 180 and 190 enable both inputs of the AND gate 208 to in turn enable one of the three inputs of each of the AND gates 212 and 216 via the OR gate 220. The second input of the AND gate 216 is enabled by the signal on the lead 188, and the third input is enabled via the inverter 226 due to the absence of an output signal from the NAND gate 194. The output from the AND gate 216 is passed via the OR gate 224 to bias the angle register 50 to count down. The correctness of this decision is substantiated by the fact that left wheel pulses are being generated to represent a clockwise turning of the vehicle relative to the X, Y coordinate system. Since the vehicle heading is within QUADRANT 1 the angle $\theta$ is decreasing, and accordingly the angle register 50 is biased to count down. The signals on the leads 180 and 188 also enable the AND gate 230 to provide a count down bias via the OR gate 238 to the quadrant register 60. The correctness of this decision is shown by the fact that the vehicle is turning in a clockwise direction and is therefore headed toward the next lower numbered quadrant.

If it is again assumed that vehicle heading lies within QUADRANT 1 and the vehicle is traveling forward but the step is instead assumed to be STEP 3 rather than STEP 1 a different conclusion is reached. In this instance signals appear on the leads 184, 188 and 190. Both inputs of the AND gate 202 are enabled to provide a signal via the OR gate 218 to one of the three inputs of the AND gates 210 and 214. The second input of the AND gate 210 is enabled directly by the signal from the lead 188 and the third input is enabled by a signal from the inverter 228 in the absence of a signal at the output of the NAND gate 196. The resulting signal at the output of the AND gate 210 is passed via the OR gate 222 to provide a count up bias to the angle register 50. The correctness of this decision is shown by the fact that right wheel pulses are being generated during STEP 3, and such pulses tend to turn the vehicle in a counterclockwise direction. Since the heading is within QUADRANT 1 the angle $\theta$ will increase, and the register 50 is accordingly biased to count up. At the same time the signals on the leads 184 and 188 enable both inputs of the AND gate 234 within the logic circuit 70 to provide a count up bias to the quadrant register 60 via the OR gate 240. Since the angle $\theta$ is increasing and the heading is within QUADRANT 1, the heading is moving in a direction such that it will eventually enter the next higher numbered quadrant.

The quadrant register 60 and the remainder of the logic circuitry for controlling the operation thereof are illustrated in FIG. 12. The quadrant register 60 comprises an A flip flop 246 and a B flip flop 248. The outputs of the OR gates 238 and 240 shown in FIG. 11 are coupled to provide count down bias and count up bias respectively to the flip flop 246. The NAND gates 194 and 196 shown in FIG. 11 are coupled as inputs to the A flip flop 246 via pulse gates 250 and 252 respectively. To complete the control logic for the quadrant register 60 some means must be provided for indicating the quadrant that the register 60 is presently in. This is accomplished by the presence or absence of signals on a pair of leads 254 and 256 respectively representing that the register 60 is in QUADRANT 2 or 4 or in QUADRANT 1 or 3. A pair of AND gates 258 and 260 are coupled to control the pulse gate 252 via an OR gate 262 in response to the quadrant information and the input bias to the register 60. Similarly, a pair of AND GATES 264 and 266 control the pulse gate 250 via an OR gate 268 in accordance with the quadrant and the input bias.

If it is again assumed that the vehicle is traveling forward, the vehicle heading lies within QUADRANT 1 and STEP 1 is in progress, then a count down bias will be provided the quadrant register 60 via the OR gate 238 (FIG. 11) as previously described. At the same time the count down bias and the information that the register 60 is in QUADRANT 1 act to enable both inputs of the AND gate 260 so as to close the pulse gate 252 via the OR gate 262. If the angle reaches 0° the resulting pulse is passed via the pulse gate 252 to the A flip flop 246 of the quadrant register 60, thereby changing the quadrant register to the next lower binary number, in this case QUADRANT 4. If the step is assumed to be STEP 3 instead of STEP 1 a count up bias will be provided the quadrant register 60 via the OR gate 240 (FIG. 11) as previously described. With the quadrant register 60 in QUADRANT 1 both inputs of the AND gate 266 are enabled to close the pulse gate 250 via the OR gate 268. If the angle reaches 90°, the resulting pulse is passed via the gate 250 to the input of the A flip flop 246, and the quadrant register 60 advances to the next higher binary number under the control of the count up bias, in this case QUADRANT 2.

Information as to the quadrant is provided to the leads 254 and 256 as well as to other portions of the system by a plurality of NAND gates 270, 272, 274 and 276 and a pair of OR gates 278 and 280. If the outputs of both flip flops 246 and 248 are negative indicating "-zero" state or QUADRANT 1, the resulting signals enable both inputs of the NAND gate 270 to provide signals at the output thereof and at the output of the OR gate 278. Similarly, the NAND gate 272 is satisfied when the states of the flip flops 246 and 248 are respectively "one" and "zero" designating QUADRANT 2, and NAND gate 274 is satisfied when the states of the flip flops 246 and 248 are respectively "zero" and "one" designating QUADRANT 3, and the NAND gate 276 is satisfied when the states of the flip flops 246 and 248 are "one" and "one" designating QUADRANT 4.

As previously mentioned in connection with the discussion of FIG. 5 the binary stored in the angle register 50 is non-destructively transferred via the transfer logic circuit 76 to the sine-cosine register 78 during STEP 5. The value in the register 78 is then counted down to zero during STEP 6 to compute sine $\theta$. During STEP 7 the binary value in the angle register 50 is inverted by the inverter 96 and entered in the sine-cosine register 78 via the transfer logic circuit 76. During STEP 8 the register 78 is counted down to zero to compute cosine $\theta$.

The switch 74, transfer logic circuit 76, sine-cosine register 78 and inverter 96 are shown in detail in FIG. 13. For reasons of simplicity only the first and second binary stages A and B and the last binary stage G are shown. A plurality of AND gates 282, 284 and 286 each have a first input coupled to be enabled during STEP 5 and a second input coupled to be enabled when a different one of the flip flops of the angle register 50 assumes the "one" state. Each one of a second plurality of AND gates 288, 290 and 292 has one input coupled to be enabled during STEP 7 and another input coupled to be enabled when a different flip flop of the angle register 50 assumes the "zero" state. An output at either of the AND gates 282 and 288 is passed via an OR gate 294 to close a pulse gate 296 and apply a clock pulse to the SET input of the A flip flop 298 of the sine-cosine register 78. Similarly, an OR gate 300 and pulse gate 302 couple the AND gates 284 and 290 to the SET input of a B flip flop 304 within the sine-cosine register 78, and an OR gate 306 and pulse gate 308 couple the AND gates 286 and 292 to the SET input of a G flip flop 310 within the sine-cosine register 78. Count down bias is provided each of the flip flops 298, 304 and 310 by the segment logic circuit 92. Count down pulses from the pulse generator 80 described in FIG. 5 are applied as an input to the A flip flop 298. The flip flops 298, 304 and 310 are coupled to be RESET via a pulse gate 312 during STEP 4. This insures that all of the flip flops are in the "zero" state prior to computation of sine $\theta$ and cosine $\theta$ during STEPS 5–8.

During STEP 5 a first input of each of the AND gates 282, 284 and 286 is enabled. If the output of the associated angle register flip flop is negative indicating "-zero" the other input of the AND gate is not enabled, and the associated one of the pulse gates 296, 302 and 308 remains open leaving the associated flip flop within the sine-cosine register 78 in its RESET or "zero" state. If any of the outputs of the flip flops within the angle register 50 are positive indicating "one" however, the corresponding ones of the AND gates 282, 284 and 286 have both inputs enabled so as to close the associated ones of the pulse gates 296, 302 and 308 and SET the associated ones of the sine-cosine register 78 flip flops 298, 304 and 310. In this manner the binary value stored in the angle register 50 is non-destructively transferred directly into the sine-cosine register 78 during STEP 5. During STEP 6 count down pulses from the pulse generator 80 are applied to the input of the A flip flop 298 to count the register 78 down to zero.

During STEP 7 at least one input of each of the AND gates 288, 290 and 292 is enabled. The other input of each AND gate is enabled if the output of the associated flip flop in the angle register 50 is negative indicating "zero" state. Those of the AND gates 288, 290 and 292 having both inputs enabled close the associated ones of the pulse gates 296, 302 and 308 to SET the corresponding flip flops of the sine-cosine register 78. Similarly, the second input of those AND gates coupled to angle register flip flops which are positive or in the "one" state are not enabled and the associated flip flops within the sine-cosine register 78 remain RESET. In this manner "ones" within the angle register 50 are transferred into the sine-cosine register 78 as "zeros" and vice versa, during STEP 7. During STEP 8 count down pulses from the pulse generator 80 are applied to the input of the A flip flop 298 to count the register 78 down to zero.

The details of the segment counter 82 ad segment logic circuit 92 of FIG. 5 are shown in FIG. 14 together with the pulse generator 80 and the switches 84 and 86. As mentioned in connection with the discussion of FIG. 5 the segment logic circuit 92 determines which of the fourteen segments shown in FIG. 6 the sine-cosine register 78 is in as the register 78 is counted down to zero. The segment counter 82 responds to each segment as determined by the logic circuit 92 to transfer a selected ratio of the count down pulses into the Y register 88 during STEP 6 and into the X register 98 during STEP 8, the desired ratios being set forth in FIG. 7.

Referring to FIG. 14 the segment logic circuit 92 includes a NAND gate 314, and a plurality of NAND gates 316, 318, 320, 322, 324, 326, 328 and 330 respectively representing segments 1, 3, 5, 7, 9, 12, 13 and 14. When in segments 1, 3, 5, 7 and 9 a pulse ratio of 1:1 is effected with one pulse being entered in the Y or X registers 88, 98 for each count down pulse generated. The outputs of the NAND gates 316, 318, 320, 322 and 324 are passed via a 1:1 OR gate 332 to one input of a pair of AND gates 334 and 336, to an OR gate 338, and to a NAND gate 340. The output of the segment 1 NAND gate 316 is also coupled to one of the inputs of an AND gate 342, a second input of which is coupled to the output of the AND gate 314. Segments 12 and 13 both require a 1:4 pulse ratio, or one pulse to the Y or X registers 88 and 98 for each four count down pulses, and the outputs of the corresponding NAND gates 326 and 328 are coupled through a 1:4 OR gate 344 to an input of the OR gate 338, to an input of the NAND gate 340 and to control the operation of a pulse gate 346. Segment 14 is the only segment employing a 1:8 ratio, and the output of the corresponding NAND gate 330 is coupled to an input of the OR gate 338, to the NAND gate 340, and to control a pulse gate 348.

It will be noted that each of the NAND gates 316, 318, 320, 322, 324, 326, 328 and 330 has from three to five inputs, each of which comes from a different flip flop of the sine-cosine register 78 and is enabled by a predetermined output polarity. Each such NAND gate has a sufficient number of inputs so as to be able to determine when the angle in the sine-cosine register 78 is in a particular segment and not in any other segment. For example, referring to FIG. 7 it will be noted that for segment 1, and only for segment 1, the first five digits of the angle as represented by the G, F, E, D and C flip flops of the sine-cosine register 78 are always "zero." Thus, if the outputs of the C, D, E, F and G flip flops of the sine-cosine register 78 are all negative, the NAND gate 316 provides an output signal indicating that the angle is within segment 1. As another example, it will be noted from FIG. 7 that in segment 9, and only in segment 9, the first five digits corresponding to the G, F, E, D and C flip flops of the sine-cosine register 78 are always 01100. Thus, whenever the outputs of the G, D and C flip flops of the register 78 are negative and the outputs of the F and E flip flops are positive, the NAND gate 324 has an output signal indicating that the angle is in segment 9. The NAND gate 314 has both inputs coupled to be enabled whenever the A and B flip flops of the sine-cosine register 78 are both negative.

During STEP 5 when the binary value in the angle register 50 is being transferred into the sine-cosine register 78, a signal is applied via an OR gate 350 to close a pulse gate 352 and pass a clock pulse to RESET each of the A, B and C flip flops 354, 356 and 358 comprising the segment counter 82. If the angle is initially in segment 1, 3, 5, 7 or 9, then an output appears at the OR gate 332 to enable the one input of the AND gate 336. During the following STEP 6 the other input of the AND gate 336 is enabled, and the resulting output closes a pulse gate 360 to pass count down pulses directly to the Y register 88 and to a ΔY register to be described in detail hereafter. The count down pulses are generated by a flip flop 364, the input of which is coupled to receive clock pulses when a pulse gate 366 is closed. The gate 366 is closed and a count down bias is provided to the sine-cosine register 78 by an AND gate 368 when all three inputs thereof are enabled. A first input thereof is enabled by an OR gate 370 during both STEPS 6 and 8. A second input thereof is enabled by the output of an inverter 372 so long as the seven flip flops of the sine-cosine register 78 are not all "zero." If all seven stages are "zero" signals appear at the outputs of the NAND gates 314 and 316 to enable both inputs of the AND gate 342 and provide an output signal to the inverter 372. The third input of the AND gate 368 is enabled by an output from the OR gate 338. The OR gate 338 has an output if one of the five NAND gates 316, 318, 320, 322 or 324 has an output, if one of the two NAND gates 326 and 328 has an output, if the NAND gate 330 has an output, or if none of the NAND gates 316, 318, 320, 322, 324, 326, 328 and 330 has an output in which case a signal appears at the output of the NAND gate 340 and is passed via the OR gate 338. The NAND gate 340 eliminates considerable logic circuitry by determining that the angle is in segment 2, 4, 6, 8, 10 or 11 whenever the NAND GATES 316, 318, 320, 322, 324, 326, 328 and 330 are all absent outputs. These segments require a 1:2 ration.

Thus if STEP 6 or STEP 8 is occurring, the seven flip flops of the sine-cosine register 78 are not all "zero," and there is an output from the OR gate 338, all three inputs of the AND gate 368 are enabled and count down pulses are provided to the sine-cosine register 78 via a pulse gate 374. In the event a 1:1 ratio is required, both inputs of the AND gate 336 are enabled during STEP 6 and the pulse gate 360 is closed to pass the pulses from the flip flop 364 directly to the Y register 88 and ΔY register. During STEP 8 both inputs of the AND gate 334 are enabled to close a pulse gate 376 and pass pulses from the flip flop 364 directly to the X register 98. If a signal appears at the output of the NAND gate 340 indicating that a 1:2 ratio is required, a pulse gate 378 is closed and pulses from the flip flop 364 are passed to the input of the C flip flop 358 within the segment counter 82. The flip flop 358 provides one pulse at its output for each two input pulses, thereby effecting the 1:2 ratio. The output pulses from the flip flop 358 are passed to the Y and ΔY registers via pulse gates 380 and 382 during STEP 6 and to the X register 98 via a pulse gate 384 during STEP 8. If a 1:4 ratio is to be used the resulting output signal from the OR gate 344 closes the pulse gate 346 to pass pulses from the flip flop 364 to the input of the B flip flop 356 of the segment counter 82. One pulse appears at the output of the C flip flop 358 for every four pulses to the input of the B flip flop 356, thereby effecting the 1:4 ratio. When the angle is in segment 14, the 1:8 pulse ratio is effected by providing the output signal from the NAND gate 330 to close the pulse gate 348 and pass pulses from the flip flop 364 to the input of the A flip flop 354 of the segment counter 82. A single pulse is provided at the output of the C flip flop 358 for each group of eight input pulses at the A flip flop 354.

The count up-down logic circuit 94 and X register 98 are shown in detail in FIG. 15, with only the first, second and last register stages of the X register being shown for simplicity. The Y register 88 is identical in configuration to the X register 98, and accordingly has not been shown in detail. The count up-down logic circuit 94 includes a pair of OR gates 386 and 388 for respectively providing count up and count down bias to the various flip flops of the X register 98. Count up bias is provided by the OR gate 386 when the vehicle heading lies in QUADRANT 1 or 4. Count down bias is provided by the OR gate 388 when the heading lies in QUADRANT 2 or 3. The input of the A flip flop 390 of the X register 98 is coupled to receive input pulses from the pulse gates 376 and 384 shown in FIG. 14. The X register 98 is biased to count up when the heading lies in QUADRANT 1 or 4 since X will always be increasing. In QUADRANT 2 or 3, X will always be decreasing and the register 98 is accordingly biased to count down.

The X register 98 is illustrated as comprising eighteen flip flops or stages, with the last stage thereof being designated "R." In actual practice any appropriate number of stages can be used for the X and Y registers, the number being determined by factors such as the range over which the vehicle computer is to be operated and the extent of wheel rotation required for the generation of each wheel pulse.

One particular arrangement for the wheel diameter error compensator 14 of FIG. 8 is illustrated in FIG. 16 in simplified fashion, only the first, second and last register stages thereof being shown together with the associated circuitry. In the arrangement of FIG. 16 the left wheel pulses are applied to the input of the A flip flop 392 of a ten-stage register. The negative or "zero" output of each flip flop in the register is coupled through a different pulse gate 394, 396 and 398 to the input of a flip flop 400. Each of the pulse gates 394, 396 and 398 is coupled to be energized by the closing of an associated switch 402, 404, and 406. Changes in the state of the flip flop 400 in response to input pulses provide correction pulses to the intermediate B storage register 34 via a pulse gate 408 during STEP 1 and to the intermediate A storage register 32 via a pulse gate 410 at all other times. Closure of one or more of the switches 402, 404 and 406 provides for the generation of a desired ratio of correction pulses to actual wheel pulses. Closure of the switch 402 associated with the first register stage or A flip flop 392, for example, provides a correction pulse for each pair of generated wheel pulses. At the other extreme, closure of the switch 406 associated with the last or J flip flop 412 provides one correction pulse for 1024 generated wheel pulses. The correction pulse circuitry for the right wheel pulses is substantially identical to that shown in FIG. 16, and has been omitted for simplicity.

Figure 17:
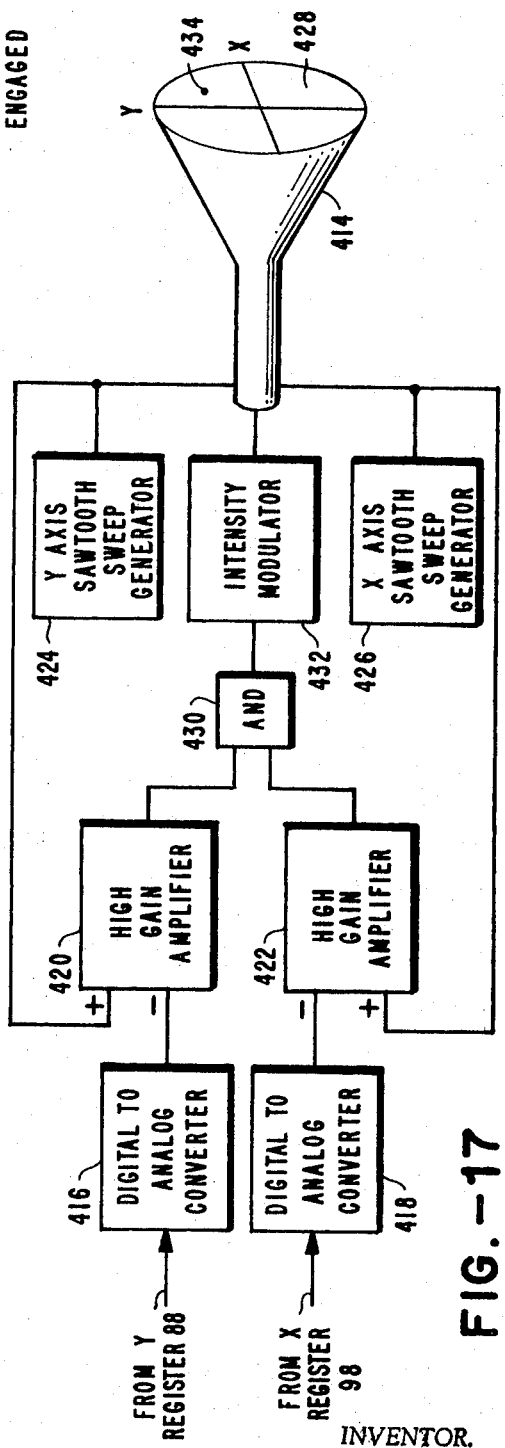
FIG. 17 is a block diagram of an arrangement for providing a visual indication of vehicle location in accordance with the invention.

As mentioned in connection with the discussion of FIG. 1 the stored representations of the X and Y coordinates and the angle $\theta$ may be utilized within the display 16 to provide a visual indication thereof. One preferred arrangement of a portion of such a display for providing a visual indication of X, Y coordinate location is illustrated in FIG. 17. The arrangement so illustrated converts the binary values stored in the Y and X registers 88 and 98 into a visual display of vehicle location by means of a cathode ray tube 414. The binary values in the Y and X registers 88 and 98 are converted to analog values by a pair of digital-to-analog converters 416 and 418 respectively, the resulting analog values being coupled to a pair of high gain amplifiers 420 and 422 together with feedback signals from Y axis and X axis sawtooth sweep generators 424 and 426. The cathode ray tube 414 is of the conventional type having an electron beam and apparatus including the sweep generators 424 and 426 for scanning the beam across the face 428 of the tube in raster fashion. The outputs of the high gain amplifiers 420 and 422 are negative until a point is reached at which the sawtooth voltages from the generators 424 and 426 exceed the analog voltages from the digital to analog converters 416 and 418. At that point the high gain amplifier voltages switch the positive outputs. The high gain amplifiers 420 and 422 are coupled through an AND gate 430 to an intensity modulator 432, the modulator 432 intensifying the electron scanning beam to produce a visible spot on the face 428 of the tube as at the point 434 whenever positive outputs are present at both of the high gain amplifiers 420 and 422. Whenever the Y position of the scanning electron beam is equal to the Y position of the vehicle as determined by the high gain amplifier 420 and the corresponding X position of the scanning electron beam is substantially simultaneously equal to the X position of the vehicle as determined by the high gain amplifier 422, coincidence occurs at the inputs of the AND gate 430 to activate the intensity modulator 432 and produce the spot on the tube face 428.

The tube face 428 has the X, Y coordinate system conveniently superimposed thereon. Any convenient reference may be used, however, such as a road map in instances where the vehicle comprises an automobile. In such instances the road map is superimposed upon the tube face 428 with an appropriate orientation. Thus the north-south direction may parallel the Y axis shown in FIG. 17 with the east-west direction paralleling the X axis as similarly shown.

Figure 18:
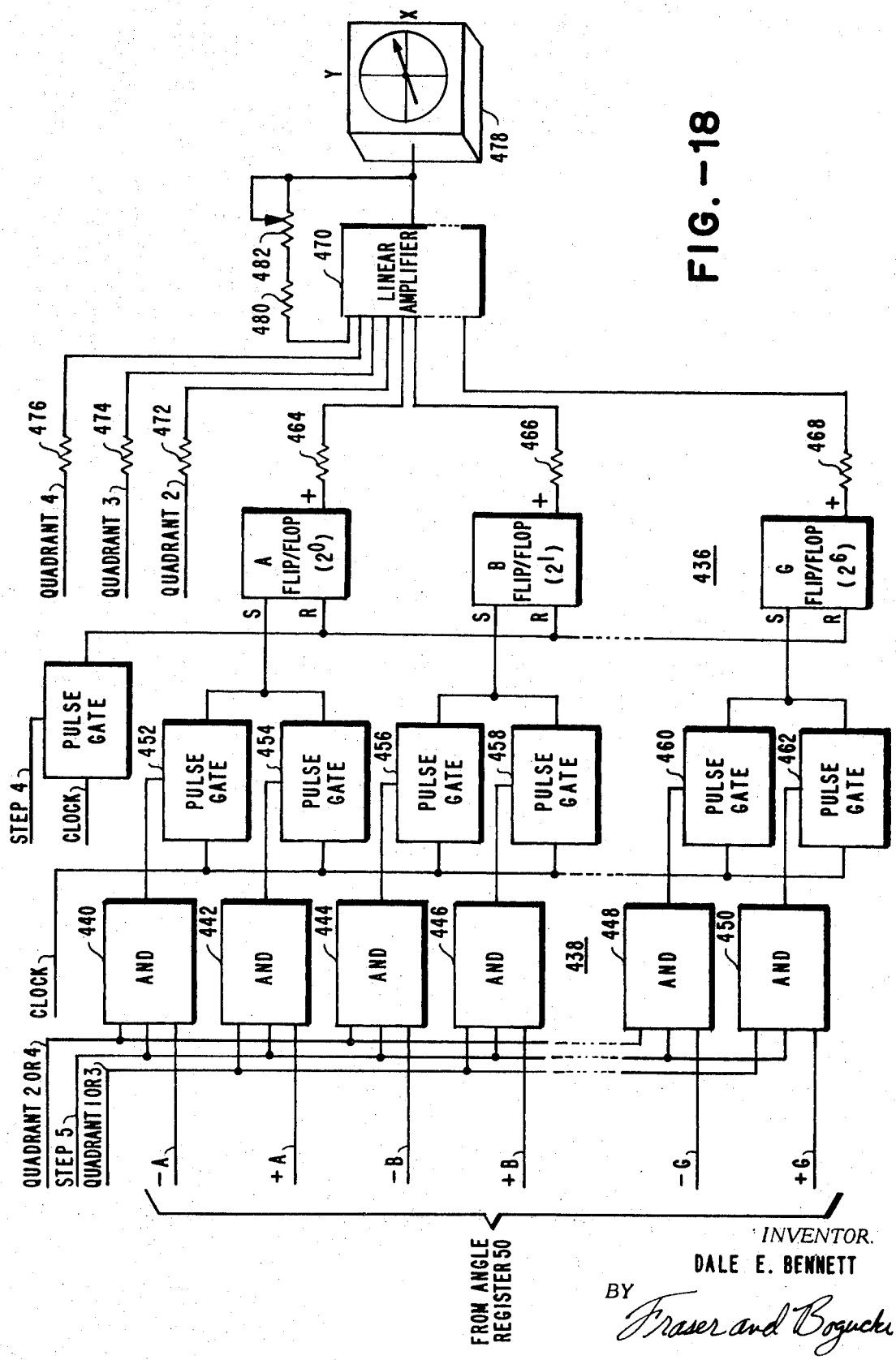
FIG. 18 is a detailed block diagram of an arrangement for providing a visual indication of vehicle heading in accordance with the invention.

FIG. 18 illustrates one preferred arrangement for converting the binary angle values stored in the angle register 50 into a visual display of vehicle heading as part of the X, Y coordinate and angle display 16 shown in FIG. 1. The particular arrangement so illustrated includes an angle display storage register 436 and transfer logic circuitry 438 coupled between the register 436 and the angle register 50. The logic circuitry 438 non-destructively transfers the binary values stored in the angle register 50 directly into the angle display storage register 436 for QUADRANTS 1 and 3. For QUADRANTS 2 and 4 however, the inverse of the angle binary value is transferred into the register 436. The reason for this is that the angle is assumed to begin at 0° at the start of each quadrant and to terminate at 90° at the end of each quadrant when traveling in a counterclockwise direction about the X, Y coordinate system for purposes of the display of FIG. 18. Thus whereas the pointing angle $\theta$ as shown in FIG. 4 is assumed to decrease from 90° to 0° when moving from the +Y axis within QUADRANT 2, the angle for purposes of the arrangement of FIG. 18 is assumed to be 0° at the +Y axis and 90° at the −X axis. Likewise, in QUADRANT 4 the angle for purposes of the arrangement of FIG. 18 is assumed to be 0° at the −Y axis and 90° at the +X axis.

The transfer logic circuitry 438 accordingly transfers the binary angle values directly for QUADRANTS 1 and 3 and inversely for QUADRANTS 2 and 4. Each of a plurality of AND gates 440, 442, 444, 446, 448 and 450 has three different inputs, one of which is coupled to be enabled during STEP 5. A second input of each of the AND gates is coupled to be enabled either by a QUADRANT 2 or 4 signal or by a QUADRANT 1 or 3 signal. The third input of each AND gate is coupled either to the plus output or the minus output of one of the flip flops of the angle register 50. Each of the AND gates 440, 442, 444, 446, 448 and 450 is coupled to close an associated pulse gate 452, 454, 456, 458, 460 and 462 to apply a clock pulse to SET an associated flip flop of the angle display storage register 436.

When the heading lies in QUADRANT 1 or 3 the second inputs of the AND gates 442, 446 and 450 are enabled. If the output of the associated flip flop in the angle register 50 is positive indicating a "one" state, all three inputs of the AND gate are enabled and the associated pulse gate 454, 458 and 462 is closed to SET the associated flip flop of the register 436 providing a direct transfer of "ones." When the heading is in QUADRANT 2 or 4 the second input of the AND gates 440, 444 and 448 are enabled. A negative output from the associated flip flop of the angle register 50 indicating the "zero" state enables the third input of the AND gates 440, 444 and 448 to close the associated pulse gate 452, 456 and 460 and SET the associated flip flop of the register 436. In this way "ones" are transferred from the angle register 50 into the angle display storage register 436 as "zeros" and vice versa for headings in QUADRANT 2 or 4.

As previously mentioned the binary value stored in the angle display storage register 436 represents the value of the angle within each particular quadrant from the start of that quadrant when traveling in a counter-clockwise direction. Thus, if the heading lies in QUADRANT 1 the binary value stored in the register 436 represents the angle between the heading and the +X axis. When in QUADRANT 2 the binary value in register 436 represents the angle between the heading and the +Y axis. In QUADRANT 3 the binary value in register 436 represents the angle between the heading and the −X axis. Finally, in QUADRANT 4, the binary value in the register 436 represents the angle between the heading and the −Y axis. To provide a visual display of the heading the binary value stored in the register 436 is converted into an equivalent analog value by a plurality of resistors 464, 466 and 468 coupled between the flip flops of the register 436 and a linear amplifier 470. A plurality of resistors 472, 474 and 476 is also employed to add an analog signal to the linear amplifier 470 equal to the angle between the +X axis and the beginning of the quadrant in which the heading lies. Thus if the heading lies in QUADRANT 2, for example, the resistor 472 responds to a QUADRANT 2 signal to provide a signal to the linear amplifier 470 equal to 90°. Similarly the resistors 474 and 476 respond to QUADRANT 3 and QUADRANT 4 signals to add to the linear amplifier 470 signals equal to 180° and 270° respectively. The signals from the resistors 464, 466, 468, 472, 474 and 476 are summed in the linear amplifier 470 before being applied to a visual display meter 478. The resistor values are chosen to provide the proper meter deflection which is calibrated in degrees from 0° to 360° A resistor 480 and variable resistor 482 are serially coupled in a feedback loop across the linear amplifier 470 to provide a gain adjustment.

It will be appreciated from the discussion thus far that systems according to the invention compute and store representations of vehicle heading and location in accurate, rapid and efficient fashion. As seen in connection with the discussion of FIGS. 17 and 18 one use for such information is to provide a visual display of vehicle heading and location for use by the vehicle operator or others as appropriate. According to the invention such information may also be utilized to drive the vehicle over a predetermined course without the need for a driver or operator.

Figure 19:
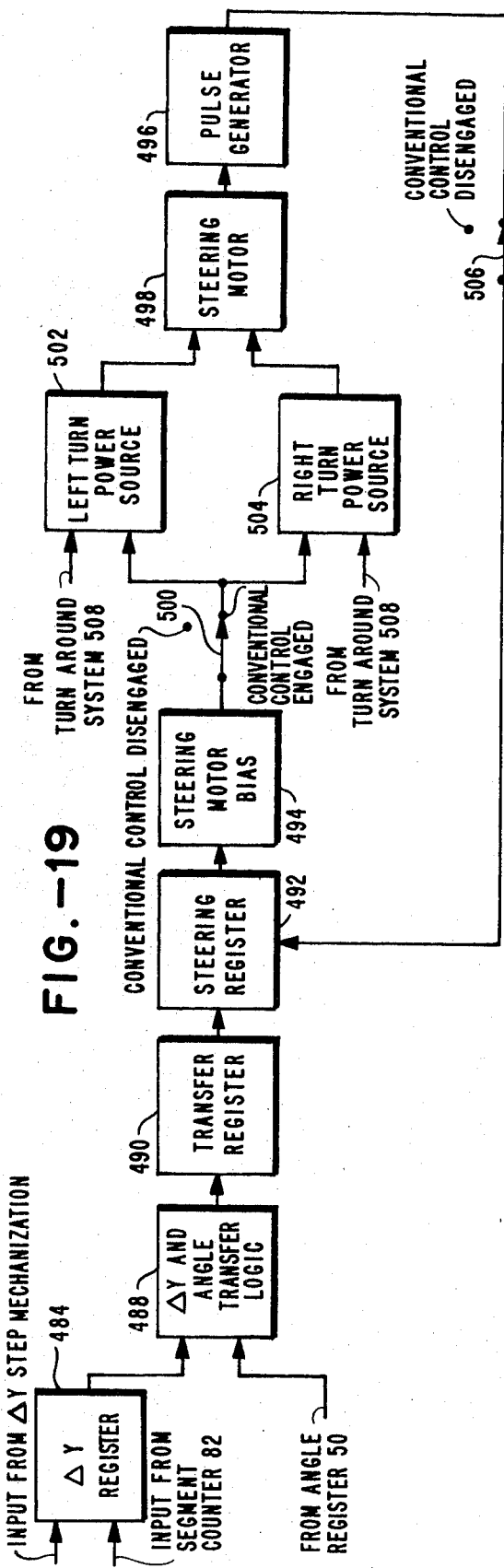
FIG. 19 is a detailed block diagram of the control coupler and steering drive assembly shown in FIG. 1 for driving the vehicle over a predetermined course without the need for an operator in accordance with the invention.

One preferred arrangement for driving the vehicle in operatorless fashion is illustrated generally in FIG. 19. It will be apparent to those skilled in the art, however, that other control techniques differing from the basic technique of the FIG. 19 arrangement can be used in conjunction with the vehicle heading and location computer of the invention.

The FIG. 19 arrangement makes use of the constantly changing binary angle value in the angle register 50 and the change in the binary value of the Y computed during STEP 6 of each eight step sequence. As shown in FIG. 19 each change in Y as provided by the segment counter 82 (FIG. 5) is applied to a $\Delta Y$ register 484 together with a Y command signal, in this case an input from a $\Delta Y$ step mechanization 486 described in detail hereafter. The outputs of the $\Delta Y$ register 484 and the angle register 50 are coupled through $\Delta Y$ and angle transfer logic 488 to a transfer register 490. The transfer register 490 is coupled to a steering register 492 which provides a steering motor bias 494 which is removed in response to pulses from a generator 496 mechanically coupled to a steering motor 498. A selection switch 500 couples the steering motor bias 494 to left or right turn power sources 502 and 504 for appropriate energization of the steering motor 498 so long as conventional control is to be maintained.

The binary value $\Delta Y$ stored in the register 484 represents a position error signal which is sought to be reduced to and maintained at zero. Also an angle value other than 0° represents an angle error. Each time a value $\Delta Y$ is placed in the register 484, whether it be by way of the $\Delta Y$ step mechanization 486 or by other appropriate means, the arrangement of FIG. 19 seeks to steer the vehicle in such a manner that the value $\Delta Y$ is reduced to zero. During STEP 5 of each eight step processing and computing sequence the binary value from the angle register 50 is non-destructively transferred by the $\Delta Y$ and angle transfer logic 488 into the transfer register 490. As described in detail hereafter only the three least significant bits of the angle binary value are transferred, and these bits are upgraded by 3 bit positions as they are entered in the transfer register 490 to provide a weighing factor. During the following STEP 6 the angle value stored in the transfer register 490 is destructively transferred into the steering register 492. During STEP 7 the binary value stored in the $\Delta y$ register 484 is non-destructively transferred by the $\Delta Y$ and angle transfer logic 488 into the transfer register 490. During the following STEP 8 the binary value is transferred from the register 490 into the steering register 492. At the end of STEP 8 the binary value stored in the steering register 492 is converted into an appropriate bias by the steering motor bias 494 for application to one or the other of the left and right turn power sources 502 and 504. The appropriate one of the power sources 502 and 504 drives the steering motor 498 to turn the vehicle steering and effect a turning movement. As the steering motor 498 is turned the associated pulse generator 496 provides count down pulses via a switch 506 to count down the binary value stored in the steering register 492 to zero. As the vehicle turns the Y position changes resulting in the generation of a binary value by the segment counter 82 (FIG. 5) during each eight step sequence. This binary value along with being applied to update the value stored in the Y register 88 (FIG. 5) is also applied as a feedback input to the $\Delta Y$ register 484. If the Y feedback is great enough to reduce $\Delta Y$ to zero than the system need do nothing further until $\Delta Y$ changes to some value other than zero such as upon receipt of a new input from the $\Delta Y$ step mechanization 486. As described hereafter the steering motor bias 494 responds when $\Delta Y$ is zero by providing a small incremental bias to the steering motor 498 via the left or right turn power source 502 or 504. Such incremental bias is equivalent to a very small amount of error or a small value of $\Delta Y$ and causes the system to oscillate about a null balance. In the absence of such oscillation the vehicle may gradually drift or otherwise deviate from a predetermined straightline path without any corresponding value being entered in the $\Delta Y$ register 484.

The arrangement of FIG. 19 as described thus far results in the driving of the vehicle along an axis generally parallel to and located a predetermined distance from the X axis. The vehicle can also be made to travel a line diagonally disposed relative to the X and Y axes by entering an appropriate value in the $\Delta Y$ register 484 each time the vehicle undergoes a selected change in the X position. Moreover, as described in detail hereafter the vehicle as it travels an axis parallel to the X axis may be caused to turn around so as to reverse direction and travel a new axis parallel to the X axis and having a different Y position from the previous axis of travel. When such turning movements are to take place the conventional control exercised by the arrangement of FIG. 19 is disengaged, opening the switches 500 and 506, and input signals from a turnaround system 508 to be described hereafter are applied directly to the left and right turn power source 502 and 504 to drive the steering motor 498.

Figure 20B:
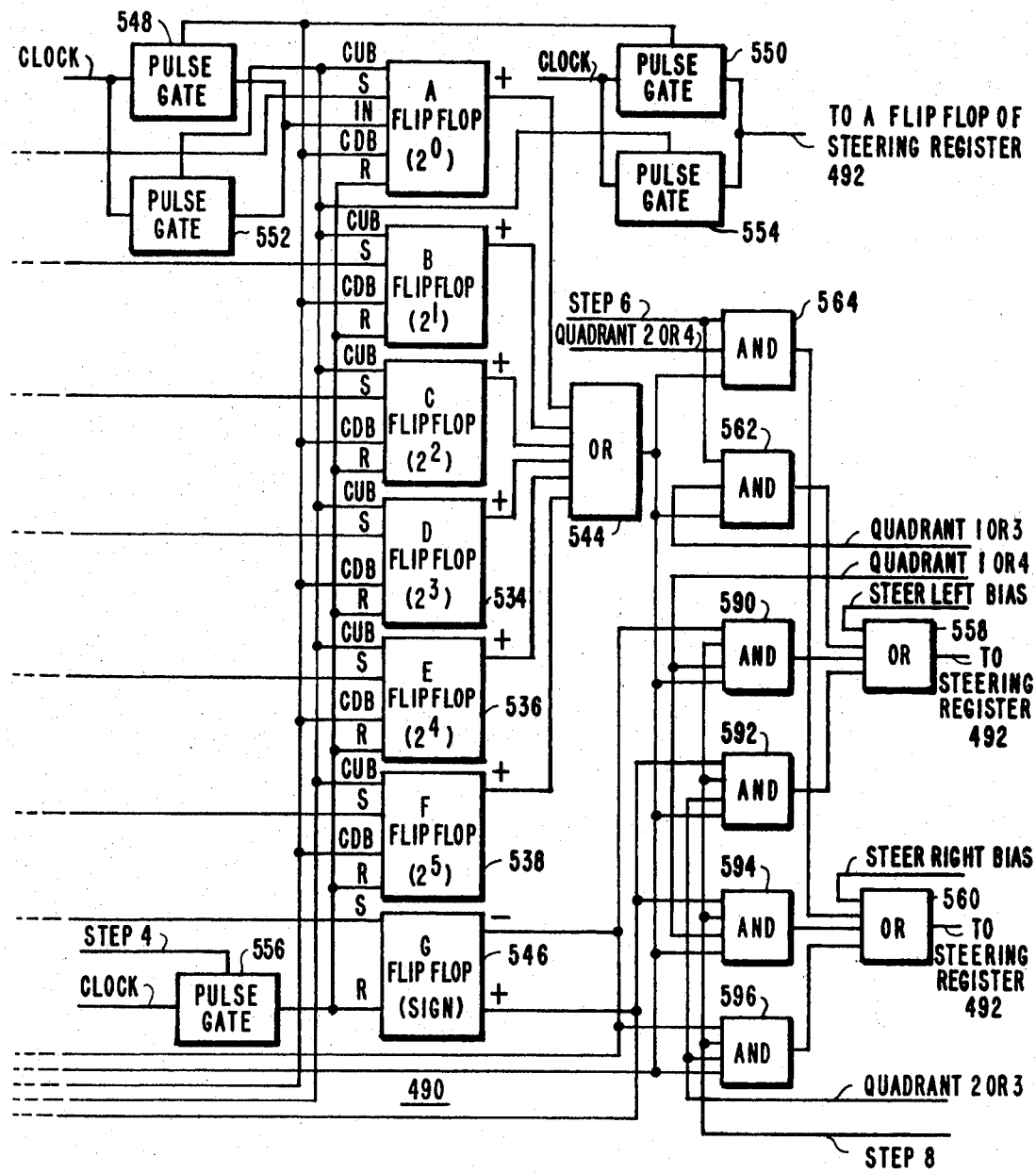
FIG. 20 (comprising FIGS. 20A and 20B joined together as shown in FIG. 20C) and FIG. 21 (comprising FIGS. 21A and 21B joined together as shown in FIG. 21C) are detailed block diagrams of one preferred embodiment of the arrangement of FIG. 19.
Figure 21A:
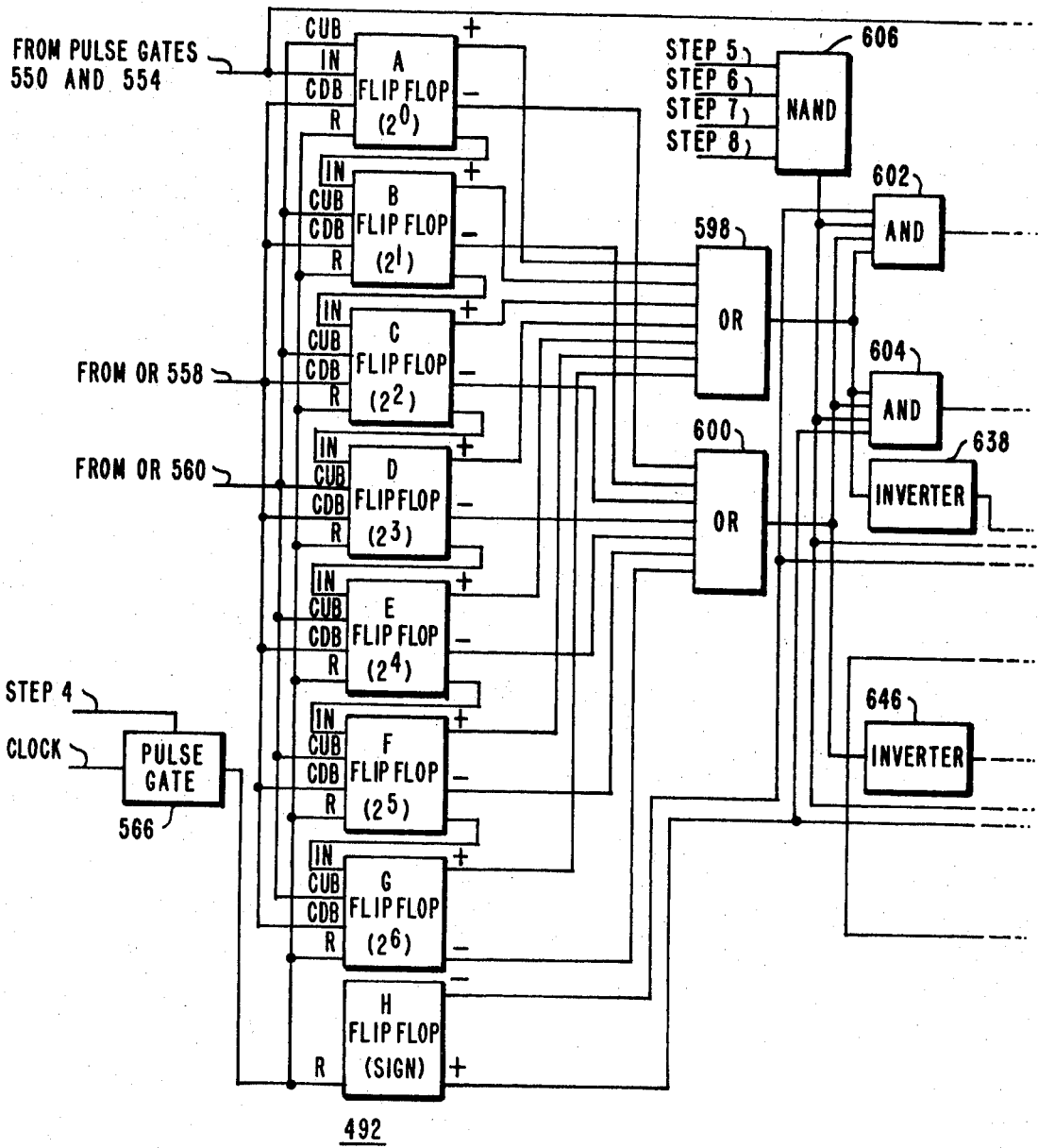

One preferred embodiment of the arrangement of FIG. 19 is partially shown in detail in FIGS. 20 and 21. FIG. 20 depicts the $\Delta Y$ register 484, the $\Delta Y$ and angle transfer logic 488 and the transfer register 490, while FIG. 21 depicts the steering register 492 and steering motor bias 494.

Referring to FIG. 20 the $\Delta Y$ register 484 comprises seven flip flops designated A through G, the first or A flip flop 510 of which has inputs coupled to receive pulses from the pulse gates 360 and 382 of the segment counter 82 as shown in FIG. 14 and from the $\Delta Y$ step register 672. As mentioned in connection with FIG. 19 the pulses from the $\Delta Y$ step register 672 determine the value of the position error signal, $\Delta Y$, and the pulses from the segment counter 82 comprise feedback pulses to be algebraically combined with the stored value of $\Delta Y$. If the vehicle heading lies in QUADRANT 1 or 2 the Y position is increasing and the $\Delta Y$ register 484 is biased so as to count up in response to such pulses. This is accomplished by an OR gate 512 which responds to a QUADRANT 1 or 2 signal by biasing the register 484 to count up. Likewise an OR gate 514 biases the register 484 to count down whenever the heading is in QUADRANT 3 or 4 and the Y position is accordingly decreasing.

At the beginning of STEP 5 the 3 least significant bits of the angle register 50 are transferred into the transfer register 490 while being increased 3 bit positions in significance. One input of each of three AND gates 516, 518 and 520 is enabled by the occurrence of STEP 5. The other input of each AND gate 516, 518 and 520 is coupled to be enabled by a different one of the A, B and C flip flops of the angle register 50 whenever the positive or "one" output is present thereat. The AND gates 516, 518 and 520 are coupled through OR gates 522, 524 and 526 to close an associated pulse gate 528, 530 or 532 whenever a positive output is present at the associated flip flop of the angle register 50. Closure of the pulse gates 528, 530 and 532 operates to SET the D, E or F flip flops 534, 536 and 538 respectively of the transfer register 490. The A, B and C bits of the angle register 50 are thereby transferred into the D, E and F register stages respectively of the transfer register 490 during STEP 5.

At the beginning of STEP 6 one of the three inputs of each of a pair of AND gates 540 and 542 is enabled. The second input of each AND gate 540 and 542 is enabled by the output signal from an OR gate 544, which signal is present unless the A through F flip flops of the transfer register 490 are all "zero." The third input of the AND gate 540 is coupled to be enabled when the output of the G flip flop 546 of the transfer register 490 is negative. When the output of the flip flop 546 is positive the third input of the AND gate 542 is instead enabled. The G flip flop 546 is a SIGN flip flop which determines whether the transfer register 490 should be counted up or down. If the G flip flop 546 is in the "zero" state, all three inputs of the AND gate 540 are enabled and count down bias is applied to the register 490. If the flip flop 546 is in the "one" state, all three inputs of the AND gate 542 are enabled and count up bias is applied to the register 490. The AND gate 540 also closes a pair of pulse gates 548 and 550 to respectively apply input pulses to the A flip flop of the transfer register 490 and to apply pulses to the A flip flop of the steering register 492 shown in FIG. 21. Similarly the AND gate 542 applies input pulses to the A flip flop of the transfer register 490 and to the A flip flop of the steering register 492 by closing a pair of pulse gates 552 and 554 respectively. Prior to STEP 5 all flip flops of the transfer register 490 are RESET by a pulse gate 556.

The G flip flop 546 representing the SIGN is not used until STEP 7 when the value in the $\Delta Y$ register 484 is transferred into the steering register 492. During STEPS 5 and 6 when the angle is being transferred into the steering register the G flip flop 546 remains in its "zero" state as RESET by the pulse gate 556. This results in all three inputs of the AND gate 540 being enabled to apply count down bias to the transfer register 490 and to close the pulse gates 548 and 550 to apply input pulses to the A flip flop of the transfer register 490 and the steering register 492 during STEP 6. As the transfer register 490 is counted down during STEP 6 the steering register 492 shown in FIG. 21 responds to the pulses from the pulse gate 550 to count down or up as determined by an output signal from one or the other of a pair of OR gates 558 and 560. Count down bias to the steering register 492 may be provided via the OR gate 558 by an AND gate 562 having a first input coupled to be enabled during STEP 6, a second input coupled to be enabled by the OR gate 544 so long as the A through F flip flops of the transfer register 490 are not all "zero," and a third input coupled to be enabled if the heading lies in QUADRANT 1 or 3. Thus, if the heading lies in QUADRANT 1 or 3 the steering register 492 is counted down during STEP 6 so as to effectively subtract the angle temporarily stored in the transfer register 490 therefrom. In the event that the heading lies in QUADRANT 2 or 4 instead of QUADRANT 1 or 3, the three inputs of an AND gate 564 are enabled and a signal is passed via the OR gate 560 to bias the steering register 492 to count up. Thus, if the heading lies in QUADRANT 2 or 4, the angle temporarily stored in the transfer register 490 is effectively added to the steering register 492 during STEP 6.

The steering register 492 which is RESET via a pulse gate 566 during STEP 4 counts up or down in conventional binary fashion in response to pulses from the pulse gate 550 or 554.

During STEP 7 a first input of each of a plurality of AND gates 568, 570, 572, 574, 576, 578 and 580 is enabled. The second input of each such AND gate is coupled to be enabled when a positive or "one" output appears at a different one of the flip flops of the $\Delta Y$ register 484. The AND gates 574, 576 and 578 are coupled through the OR gates 522, 524 and 526 to close the pulse gates 528, 530 and 532, thereby setting the associated flip flop and the transfer register 490 whenever the corresponding flip flop in the $\Delta Y$ register 484 assumes the "one" state during STEP 7. The AND gates 568, 570, 572 and 580 are likewise coupled to close pulse gates 582, 584, 586 and 588 and SET the A, B, C or G flip flop of the transfer register 490 when both inputs of each AND gate are enabled.

During STEP 8 one of the inputs of each of the AND gates 540 and 542 is enabled. A second input is enabled by the OR gate 544 so long as the A through F flip flops of the transfer register 490 are not all "zero." Depending upon the state of the G flip flop 546 within the transfer register 490, one or the other of the AND gates 540 and 542 have all inputs enabled so as to apply input pulses to the A flip flop of the transfer register 490 and the steering register 492 via the pulse gates 548 and 550 or the pulse gates 552 and 554. The AND gates 540 and 542 also determine whether the transfer register 490 is biased to be counted up or counted down. The biasing of the steering register 492 is again determined by an output signal from one or the other of the OR gates 558 and 560. This time, however, four different AND gates 590, 592, 594 and 596 are employed. Each of such AND gates has four different inputs, one of which is enabled during STEP 8. A second input of the AND gates 592 and 596 is enabled if the heading lies in QUADRANT 2 or 3, while a second input of the AND gates 590 and 594 is enabled if the heading lies in QUADRANT 1 or 4. A third input of all four AND gates is enabled by the OR gate 544 so long as the A through F flip flops of the transfer register 490 are not all "zero." A fourth input of the AND gates 590 and 596 is enabled if the G flip flop 546 is "zero." Likewise a fourth input of the AND gates 592 and 594 is enabled if the G flip flop 546 is in the "one" state. The AND gates 590 and 592 are coupled through the OR gate 558 to bias the steering register 492 to count down, while the AND gates 594 and 596 are coupled through the OR gate 560 to bias the steering register 492 to count up. Accordingly, if the G flip flop 546 is in the "one" state and the heading lies in QUADRANT 1 or 4, the AND gate 594 is satisfied and $\Delta Y$ is effectively added to the steering register 492. Likewise if the G flip flop 546 is "zero" and the heading lies in QUADRANT 2 or 3, the AND gate 596 is satisfied and $\Delta Y$ is added to the steering register 492. In the event the G flip flop 546 is "zero" and the heading is in QUADRANT 1 or 4, or the G flip flop 546 is "one" and the heading is in QUADRANT 2 or 3, then the AND gate 590 or the AND gate 592 respectively is satisfied and $\Delta Y$ is subtracted from the steering register 492. As in the case of the count down of the angle value during STEP 6, count down of the transfer register 490 during STEP 8 is terminated when the A through F flip flops all become "zero" and the output signal accordingly disappears from the OR gate 544.

The binary value of $\Delta Y$ is therefore algebraically combined in the steering register 492 with the binary value of eight times the angle $\theta$ during STEP 8. The factor of eight which is provided by entry of the three least significant angle bits into the D, E and F flip flops of the transfer register 490 is a stability factor, the usefulness of which is discussed hereafter.

As seen in FIG. 21 the positive or "one" outputs of the A through G flip flops of the steering register 492 are coupled to an OR gate 598, and the negative or "zero" outputs of the A through G flip flops are coupled to an OR gate 600. A signal appears at the output of the OR gate 598 so long as the A through G flip flops are not all "zero," and a signal appears at the output of the OR gate 600 so long as the A through G flip flops are not all "one." The OR gates 598 and 600 are coupled as inputs to a pair of AND gates 602 and 604. A third input of each of the AND gates 602 and 604 is coupled to be enabled via a NAND gate 606 during the absence of STEPS 5–8. A fourth input of the AND gate 602 is enabled when the H or SIGN flip flop 608 of the steering register 492 is "zero," and a fourth input of the AND gate 604 is coupled to be enabled when the SIGN flip flop 608 is "one." Accordingly, during the absence of STEPS 5–8 if the A through G flip flops of the steering register 492 are not all "zero" or "one," the AND gate 602 is satisfied if the H flip flop 608 is "zero," and the AND gate 604 is satisfied if the H flip flop 609 is "one." Satisfaction of the AND gate 602 provides a STEER LEFT bias in the form of a signal to the left turn power source 502 of FIG. 19 to drive the steering motor 498 to the left. The STEER LEFT bias is also applied to the OR gate 558 shown in FIG. 20 to bias the steering register 492 to count down, and through an OR gate 610 to close a pulse gate 612 and RESET A, B and C flip flops 614, 616 and 618 in a STEER RIGHT incremental bias circuit 620. Finally, the STEER LEFT bias is applied through an OR gate 622 to close a pulse gate 624. Closure of the pulse gate 624 passes count down pulses from the pulse generator 496 (FIG. 19) to the input of the A flip flop of the steering register 492.

If the AND gate 604 is satisfied instead of the AND gate 602 a STEER RIGHT bias is provided to the right turn power supply 504 shown in FIG. 19 to drive the steering motor 498 to the right. The STEER RIGHT bias is provided to the right turn power supply 504 shown in FIG. 19 to drive the steering motor 498 to the right. The STEER RIGHT bias is also applied to the OR gate 560 shown in FIG. 20 to bias the steering register 492 for count up, and through an OR gate 626 to close a pulse gate 628 and RESET an A, B and C flip flop 630, 632 and 634 in a STEER LEFT incremental bias circuit 636. Finally, the STEER RIGHT bias is passed through the OR gate 622 to close the pulse gate 624 and provide count down pulses from the motor coupled generator to the input of the A flip flop of the steering register 492.

The STEER RIGHT or STEER LEFT bias is generated so long as the A through G flip flops of the steering register 492 are not all "zero" or "one." In the event the steering register 492 is counted down to zero so that the A through G flip flops are all in the "zero"

state, the output signal disappears from the OR gate 598. An inverter 638 responds to this condition by enabling one of the four inputs of an AND gate 640. The second input of the AND gate 640 is enabled by the signal at the output of the NAND gate 606, and a third input is enabled if the H flip flop 608 is "zero." A fourth input of the AND gate 640 is coupled through an AND gate 642 and inverter to the "one" outputs of the A, B and C flip flops 630, 632 and 634. This input of the AND gate 640 is therefore enabled unless the register comprising the flip flops 630, 632 and 634 has been counted up to eight. The resulting output from the AND gate 640 comprises a STEER LEFT incremental bias which is applied to the left turn power source 502 shown in FIG. 19 to drive the steering motor 498 left. The STEER LEFT incremental bias is also applied through the OR gate 610 to close the pulse gate 612 and RESET the A, B and C flip flops 614, 616 and 618. Finally, the STEER LEFT incremental bias is applied to close a pulse gate 644 thereby passing the steering motor generated count down pulses to the input of the A flip flop 630. As previously mentioned the incremental biasing improves the accuracy of the system and prevents drift and other undesirable behavior by causing the system to oscillate about a null balance when $\Delta Y$ has been driven to zero. Thus, as the A through G flip flops of the steering register 492 all reach "zero," the four inputs of the AND gate 640 are enabled to provide the STEER LEFT incremental bias. At the same time the steering motor generated count down pulses appear at the input of the A flip flop 630 and are counted up by the flip flops 630, 632 and 634 in conventional binary fashion. Upon reaching a count of eight the output signal disappears from the AND gate 642 and inverter to disable the associated input to the AND gate 640 and remove the STEER LEFT incremental bias. The incremental change in steering angle causes the vehicle to change pointing angle sightly so that the register 492 turns over and the A through G flip flops all assume the "one" state. When this occurs the output signal disappears from the OR gate 600 and an inverter 646 responds by enabling one of the four inputs of an AND gate 648. A second input thereof is enabled by the output of the NAND gate 606 during the absence of STEPS 5–8, and a third input thereof is enabled when the H flip flop 608 is in the "one" state. A fourth input thereof is coupled through an AND gate 650 and inverter to the "one" outputs of the A, B and C flip flops 614, 616 and 618. Assuming that the A, B and C flip flops 614, 616 and 618 are not all "one," all four inputs of the AND gate 648 are satisfied and a STEER RIGHT incremental bias is provided to the right turn power source 504 as shown in FIG. 19 to drive the steering motor 498 right. The STEER RIGHT incremental bias is also passed through the OR gate 626 to close the pulse gate 628 and RESET the A, B and C flip flops 630, 632 and 634. Finally, the STEER RIGHT incremental bias is applied to close a pulse gate 652 and pass the motor generated count down pulses to the input of the A flip flop 614. As in the case of the STEER LEFT incremental bias circuit 636 the A, B and C flip flops 614, 616 and 618 count up in conventional binary fashion in response to the steering motor generated count down pulses until a count of eight is reached, at which point the output disappears from the AND gate 650 and inverter and the AND gate 648 is no longer satisfied.

Thereafter, the system continues to oscillate between a STEER LEFT incremental bias and a STEER RIGHT incremental bias until such time as a binary value becomes stored in the steering register 492 so as to enable one of the AND gates 602 and 604 and provide a STEER LEFT or STEER RIGHT bias.

A better understanding may be had of the arrangements shown in FIGS. 19, 20 and 21 by referring to one practical example illustrated in FIG. 22. The vehicle location is initially assumed to be at a point 654 at a distance $Y_2$ from the X axis. The heading is assumed to lie in QUADRANT 1 as represented by the vector 656 at an angle $\theta$ relative to the horizontal as represented by a dashed line 658. The desired course of vehicle travel is represented by a horizontal line 660 parallel to the X axis and lying a distance $Y_1$ therefrom. Ideally then, the vehicle location should reside on the line 660 and the vehicle heading should be pointing to the right as seen in FIG. 22 with $\theta$ equal to 0°.

The position error of the vehicle is therefore equal to $Y_2 - Y_1$ or $\Delta Y$. With the desired Y value or $Y_1$ having been initially entered in the $\Delta Y$ register 484 shown in FIG. 19 and with a number of Y feedback pulses equal to $Y_2$ having also been entered in the $\Delta Y$ register 484, the difference or $\Delta Y$ is stored in the $\Delta Y$ register 484 as an error signal. The difference between the actual heading angle and 0° or $\theta$ is stored in the angle register 50 and represents the heading or angle error.

Use of the heading angle $\theta$ in the arrangement of FIG. 19 is provided for by the fact that a direct linear relationship exist between the position error $\Delta Y$ and the angle $\theta$. In counting down sine $\theta$ to zero in the arrangement shown in FIG. 5 the value $\Delta Y$ is obtained because of the direct linear relationship to the angle. The value of the angle $\theta$ thus determines the number of feedback pulses or Y input pulses which are fed into the $\Delta Y$ register 484 to change $\Delta Y$. The actual number of pulses is determined by the ratios 1:1, 1:2, 1:4 and 1:8 as effected by the segment counter 82 shown in FIG. 5 and in detail in FIG. 14.

As mentioned in connection with the discussion of FIG. 20 the various AND gates 562, 564, 590, 592, 594 and 596 determine whether the steering register 492 is to be counted up or down in accordance with information including the quadrant in which the heading is located. Thus, if the heading lies in QUADRANT 1 or 3, the angle $\theta$ is entered as a minus value or subtracted from the steering register 492 so as to tend to steer the vehicle to the right. Conversely if the heading lies in QUADRANT 2 or 4 the angle $\theta$ is added to the steering register 492 to tend to steer the vehicle to the left. The AND gates 590, 592, 594 and 596 shown in FIG. 20 determine whether the transferred value $\Delta Y$ will be added to or subtracted from the steering register 492 by considering both the quadrant of the heading and the sense of the position error $\Delta Y$. A positive $\Delta Y$ value as represented by the H or SIGN flip flop 608 of the steering register 492 means that the value stored in the $\Delta Y$ register 484 is effectively negative and a right turn is desired. Similarly a negative Y value as represented by the flip flop 608 represents that $\Delta Y$ is effectively positive and a left turn is desired.

Referring again to FIG. 22 when the vehicle is at the initial location 654 the angle $\theta$ is stored in the angle register 50 and the quadrant register 60 reflects that the heading as represented by the vector 656 lies in QUADRANT 1. The position error value $\Delta Y$ is stored as a positive value in the $\Delta Y$ register 484. Since the heading 656 lies in QUADRANT 1 the angle $\theta$ is thereafter transferred into the steering register 492 as a negative value so as to steer the vehicle to the right, thereby tending to reduce $\theta$ to the desired value of 0°. At the same time $\Delta Y$ is transferred into the steering register 492 as a negative Y value to tend to steer the vehicle to the right and thereby tend to reduce the total Y component of vehicle location to $Y_1$. The binary values of the angle $\theta$ and the position error $\Delta Y$ are algebraically combined in the steering register 492, and the result effects the vehicle steering accordingly. From this standpoint the effects of the angle $\theta$ and the position error $\Delta Y$ are completely independent of one another. The reason for this may be understood if the initial vehicle location is assumed to reside at a point 662 below the desired course 660 rather than at the point 654 with the vehicle heading again being represented by the vector 656. In this particular example the vehicle should again be steered to the right to reduce the angle $\theta$ to 0°. However the position error $\Delta Y$ will be corrected not by steering to the right as in the case of the initial location 654, but rather by steering to the left. A compromise must therefore be reached so that the vehicle location is moved to the desired course 660 and the angle $\theta$ is reduced to 0° as quickly as possible.

As previously mentioned the angle $\theta$ is increased by a stability factor of eight during transfer into the steering register 492. The reason for this is that the closed loop system requires rate feedback for dynamic stability, and the angle $\theta$ corresponds to rate of change of Y by considering $Y = K \int \theta dt$ for small angles and $(dY)/(dt) \approx K\theta$. Since $K\theta$ correspond to rate of change of Y with respect to time it is useful as a dynamic stabilization feedback term. The value K was selected to be 8 in order to provide adequate stabilization. In the example of FIG. 22 the steering arrangement of FIG. 19 will cause the vehicle at the initial location 654 to follow an actual course as shown by the curve 664. As previously mentioned the position error $\Delta Y$ and the heading vector 656 will both cause the vehicle to steer to the right. When the vehicle location reaches the point 666 the angle $\theta$ will have been reduced to 0° but the position error $\Delta Y$ will be greater than $Y_2 - Y_1$. The relatively large value $\Delta Y$ will accordingly cause the vehicle to continue to STEER RIGHT until a point 668 is reached. At the point 668 the vehicle will again have a substantial angle error $\theta$ as well as a position error approximately equal to $Y_2 - Y_1$. The tendency of the position error $\Delta Y$ to continue steering the vehicle to the right will therefore be overcome by the effects of the angle $\theta$ which will tend to steer the vehicle left as the heading now lies in QUADRANT 4. The resulting compromise between $\Delta Y$ and $\theta$ causes the vehicle location and heading errors to be smoothly and gradually reduced to zero as the vehicle enters the desired course 660 pointing to the right as seen in FIG. 22. Thereafter, $\Delta Y$ and $\theta$ remain at zero value and the STEER LEFT and STEER RIGHT incremental biases as shown in FIG. 21 are alternately employed to cause oscillation about the null balance. In the absence of the incremental biases the vehicle may in some cases actually drift gradually away from the desired course 660, with the resulting changes being so gradual as to not result in an angle and position error being entered in the steering register 492 so as to correct the vehicle behavior.

One example of the turnaround system 508 which may be used in conjunction with the arrangement shown in FIG. 19 to steer the vehicle over a predetermined course without the need for an operator is partially illustrated in FIG. 23. The arrangement of FIG. 23 which is shown in detail in FIGS. 25, 26 and 27 will be described in connection with a particular example shown in FIG. 24 in which the vehicle comprises a tractor programmed to plow a field in operatorless fashion. It will be understood by those skilled in the art, however, that other appropriate arrangements can be employed with other types of vehicles as well as tractors to drive such vehicles over a predetermined course without the need for an operator.

Figure 24:
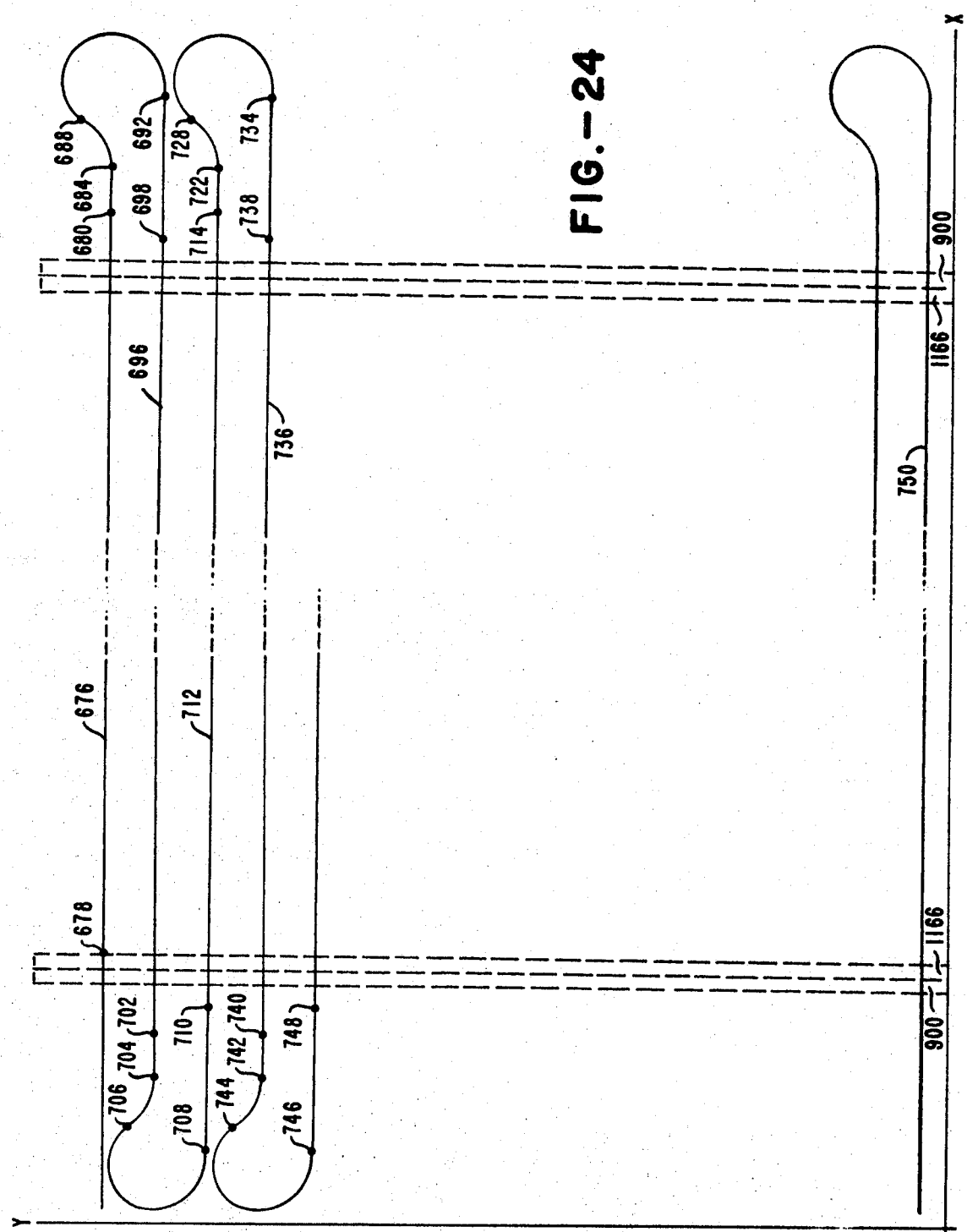
FIG. 24 is a diagrammatic plot useful in explaining the manner in which the arrangement of FIG. 23 operates.

The particular arrangement shown in FIG. 23 relies upon the fact that, as shown in FIG. 24, the vehicle is to travel a plurality of straightline paths parallel to one another as well as to the X axis of the X, Y coordinate system. Since a turnaround of the vehicle is to be accomplished at the same general X locations at the opposite ends of the straightline paths, such turnarounds may be executed by programming the arrangement of FIG. 23 to respond to two different X values. The distances between adjacent ones of the straightline paths are substantially equal and may be entered into the $\Delta Y$ register 484 (FIG. 19) as a position error signal upon each turnaround of the vehicle, the resulting update pulses being applied to the $\Delta Y$ register 484 as feedback pulses during turnaround to drive the binary value stored in the $\Delta Y$ register 484 to zero upon completion of the turn if the vehicle is then located at the desired new Y position.

The particular turnaround system 508 illustrated in FIG. 23 includes $\Delta Y$ step selection switches and logic 670, the outputs of which are coupled through a $\Delta Y$ step register 672 to the $\Delta Y$ register 484 and some of the inputs of which are coupled to a turnaround left to right circuit 674. The remaining inputs of the $\Delta Y$ step selection switches and logic 670 are coupled to a turnaround right to left circuit identical in configuration to the turnaround left to right circuit 674 and accordingly not illustrated for the sake of simplicity.

Referring to FIGS. 23 and 24, the operator sets up operation of the tractor by driving it along a first straightline path 676. The operator stops at a convenient point 678 a short distance along the path 676 and initializes the system by setting the X register 98 (FIG. 5) at some value larger than the X binary value would be if the beginning of the field to be plowed was at X = 0. The X selection is made by positioning a plurality of switches (not shown), each of which is coupled to SET or RESET a different one of the X register flip flops shown in FIG. 15. With the X register 98 so set, this register will never go to zero. The $\Delta Y$ register 484 (FIG. 19) is manually set to zero indicating that no position error is present. The Y distance which is to exist between each adjacent pair of the straightline paths is selected based on two different measurements and stored in the ΔY step selection switches 670. The first measurement is made from the center of the tractor's plow to the outermost furrow being dug by the plow on one side thereof. The second measurement is made from the center of the plow to the approximate location where the next furrow is to be made adjacent the plow upon the return travel of the tractor. The two measurements are added together, and the sum is located in a chart to determine the appropriate binary number to be entered in the ΔY step selection switches 670.

The operator then continues driving the tractor along the straightline path 676 to a point 680 representing a desired X position where the plow should be raised and the tractor's engine torque decreased in preparation for turning the tractor around. At the point 680 the operator determines the binary value stored in the X register 98 (FIG. 5) and positions a plurality of selection switches to store the same binary number in raise plow and decrease torque select switches and logic 682 shown in FIG. 23. The binary value stored in the X register 98 may be determined such as by providing a visual display including a different lamp coupled in circuit with each flip flop of the X register, each lamp being illuminated when the associated flip flop is SET and not illuminated when the flip flop is RESET. As the operator continues driving the tractor along the straightline path 676 from the point 680, a turn-around left to right register 683 begins counting up in response to the generation of a pulse each time the tractor has traveled the predetermined fixed distance necessary to initiate a new eight step processing and computing sequence. When a point 684 is reached at which the first turn of the tractor's turnaround is to be initiated, the binary value stored in the turnaround left to right register 683 is entered by positioning the select switches of first turn initiate select switches and logic 686. The first turn, which in this instance is a left turn, is undergone until a point 688 is reached at which the second turn is to be initiated, in this instance a right turn. At the point 688 the operator enters the binary value stored in the turnaround left to right register 683 into second turn initiate select switches and logic 690 by positioning the switches thereof. The second turn is negotiated until a point 692 is reached at which the second turn is to be terminated. The operator then positions select switches of second turn complete select switches and logic 694 to enter the binary value stored in the turnaround left to right register 683 therein. The operator then drives the tractor from the point 692 along a straightline path 696 parallel to and spaced the desired distance ΔY from the first straightline path 676 until a point 698 is reached at which the plow is to be lowered and the tractor's engine torque increased to commence plowing. The binary value stored in the X register 98 is entered in lower plow and increase torque select switches and logic 700 by the appropriate positioning of the select switches thereof. It will be noted that the point 698 is at a different X position relative to the point 680 at which the plow is raised and the torque decreased. The reason for this is that the turnaround system 508 responds to the X position or location of the tractor and not the plow. As the tractor traverses the first straightline path 676 the trailing plow is to the left of the tractor as seen in FIG. 24. However, as the tractor travels the second straightline path 696 the trailing plow is to the right of the tractor as seen in FIG. 24.

As previously mentioned circuitry virtually identical to the turnaround left to right circuit 674 shown in FIG. 23 is coupled to provide part of the inputs of the ΔY step selection switches and logic 670 in order to execute vehicle turnaround at the opposite end of the field shown in FIG. 24. Thus as the tractor is driven by the operator along the straightline path 696, points 702, 704, 706, 708 and 710 are reached at which the same operations are performed as in the case of the circuit 674 except that the binary values are entered in the turnaround left to right circuit (not shown). The point 702 represents the location at which the plow is to be raised and the tractor's engine torque decreased, the point 704 represents the initiation of the first turn, in this instance a right turn, the point 706 represents the initiation of the second turn, in this instance a left turn, the point 708 represents the completion of the second turn, and the point 710 represents the location at which the plow is to be lowered and the tractor's engine torque increased.

At this point the programming of the tractor for self operation is complete except for one remaining step. In the event it is desired that the tractor be turned off automatically upon completion of the plowing operation, it is necessary that an appropriate binary Y value be entered in an engine turnoff mechanization. The correct Y binary value can be selected by knowing the Y dimension of the field and by using an appropriate conversion chart. The engine turnoff mechanization which has not been shown for the sake of simplicity comprises a plurality of selection switches coupled through an AND gate to close a pulse gate whenever all of the inputs of the AND gate are satisfied. The switches as appropriately positioned to reflect the Y position at which the tractor engine is to be turned off couple the inputs of the AND gate to the different flip flops of the Y register 88 (FIG. 5). When the appropriate Y position is reached, all inputs of the AND gate are satisfied by the selection switches, and the pulse gate is closed to pass a pulse which SETS a flip flop to thereby open the ignition switch of the tractor and turn the engine off. The flip flop is then manually RESET in preparation for the next automatic turnoff of the tractor engine.

With the engine turnoff mechanization having been properly programmed, the operator may leave the tractor at the point 710, and the tractor will thereafter plow the field automatically and without the need for the operator's presence. The tractor proceeds along a straightline path 712 until it reaches a point 714 at the same X position as the point 680. At that point the positions of the raise plow and decrease torque select switches 682 correspond to the states of the various flip flops in the X register 98, and the associated logic determines from the fact that the vehicle heading lies in QUADRANT 1 or 4 that the plow should be raised and the vehicle's engine torque decreased. This information is passed via the turnaround left to right register 683 to SET a plow and torque control flip flop 718, thereby raising the plow and decreasing the engine torque. At the same time a second turn complete flip flop 702 is RESET. The turnaround left to right register 683 beings counting up in response to input pulses, a new input pulse being provided each time a new eight step processing and computing sequence is initiated. As a point 722 is reached, the positions of the switches in the first turn initiate select switches and logic 686 correspond to the states of the various flip flops within the register 683 and a first turn initiate flip flop 724 is SET. The resulting output from the flip flop 724 is passed to the ΔY step selection switches and logic 670 causing the transfer of the binary ΔY value previously entered by the operator into the ΔY step register 672. The output signal from the flip flop 724 also opens the switches 500 and 506 shown in FIG. 19 to disengage conventional control whereby turn left and turn right control signals from the turnaround system 508 may be entered directly in the left turn and right turn power sources 502 and 504 shown in FIG. 19. The output from the flip flop 724 is also applied to turn rate select switches and logic 726, the various switches of which have been preset by the operator to provide a left turn at a desired rate. The resulting output signal from the switches and logic 726 comprises a turn left control signal, and is applied to the left turn power source 502 shown in FIG. 19 to effect the left turn of the vehicle.

As the vehicle reaches a point 728 at which the first turn is to be terminated and the second turn begun, the states of the various flip flops in the turnaround left to right register 683 correspond to the positions of the switches in the second turn initiate select switches and logic 690 providing an output signal to RESET the first turn initiate flip flop 724 and SET a second turn initiate flip flop 730. The resulting output signal from the flip flop 730 is passed via the ΔY step selection switches and logic 670 to the ΔY step register 672 to begin count down of the register 672. The same pulses used to count down the register 672 are entered in the ΔY register 484 as the position error signal ΔY. When the ΔY step register 672 reaches zero, the count down process stops and the complete value ΔY is stored in the ΔY register 484. The output from the flip flop 730 is also passed to switches 500 and 506 shown in FIG. 19 to maintain disengagement of conventional control during negotiation of the second turn by the vehicle. In addition, the output signal from the flip flop 730 is passed through turn rate select switches and logic 732 to provide a turn right control signal to the right turn power source 504 shown in FIG. 19. The select switches 732 as preset by the operator determines the rate at which the vehicle executes the second turn.

Upon completion of the second turn a point 734 is reached at which the flip flops of the turnaround left to right register 683 correspond to the positions of the switches in the second turn complete selection switches and logic 694. This resets the second turn initiate flip flop 730 and sets the second turn complete flip flop 720. The disengage conventional control signal from the output of the second turn initiate flip flop 730 disappears, and the switches 500 and 506 shown in FIG. 19 are closed to restore conventional control, whereby the value stored in the ΔY register 484 is maintained at zero or driven to zero as appropriate and the STEER LEFT and STEER RIGHT incremental biases are provided to cause oscillation about a null condition as a straightline path 736 is traversed by the vehicle. As the vehicle passes a point on the path 736 having the same X position as the point 714, the raise plow and decrease torque select switches and logic 682 respond to this and to the fact that a vehicle heading lies in QUADRANT 2 or 3 to reset all of the flip flops in the turnaround left to right register 683. When the vehicle reaches a point 738, the lower plow and increase torque select switches and logic 700 respond to rest the plow and torque control flip flop 718, thereby lowering the plow and increasing the engine torque.

The ΔY step selection switches and logic 670 and the ΔY step register 672 function in cooperation with the turnaround right to left circuit (not shown) as the vehicle reaches the end of the straightline path 736 to execute a right turn and then a left turn as previously described. At a point 740 the plow is raised and the engine torque decreased. At a point 742 conventional control is disengaged, the first turn is begun and the appropriate values from the ΔY step selection switches and logic 670 are entered in the ΔY step register 672. At a point 744 the first turn is terminated, the second turn is begun, and the ΔY step register 672 is counted down to zero with the new ΔY being added to the ΔY register 484. At a point 746 the second turn is completed and conventional control is restored. At a point 748 the plow is lowered and the engine torque is increased.

The vehicle continues to plow the field in operatorless fashion until a last straightline path 750 is reached, at which point the tractor's engine is turned off in the manner previously described to terminate the plowing operation.

Figure 25:
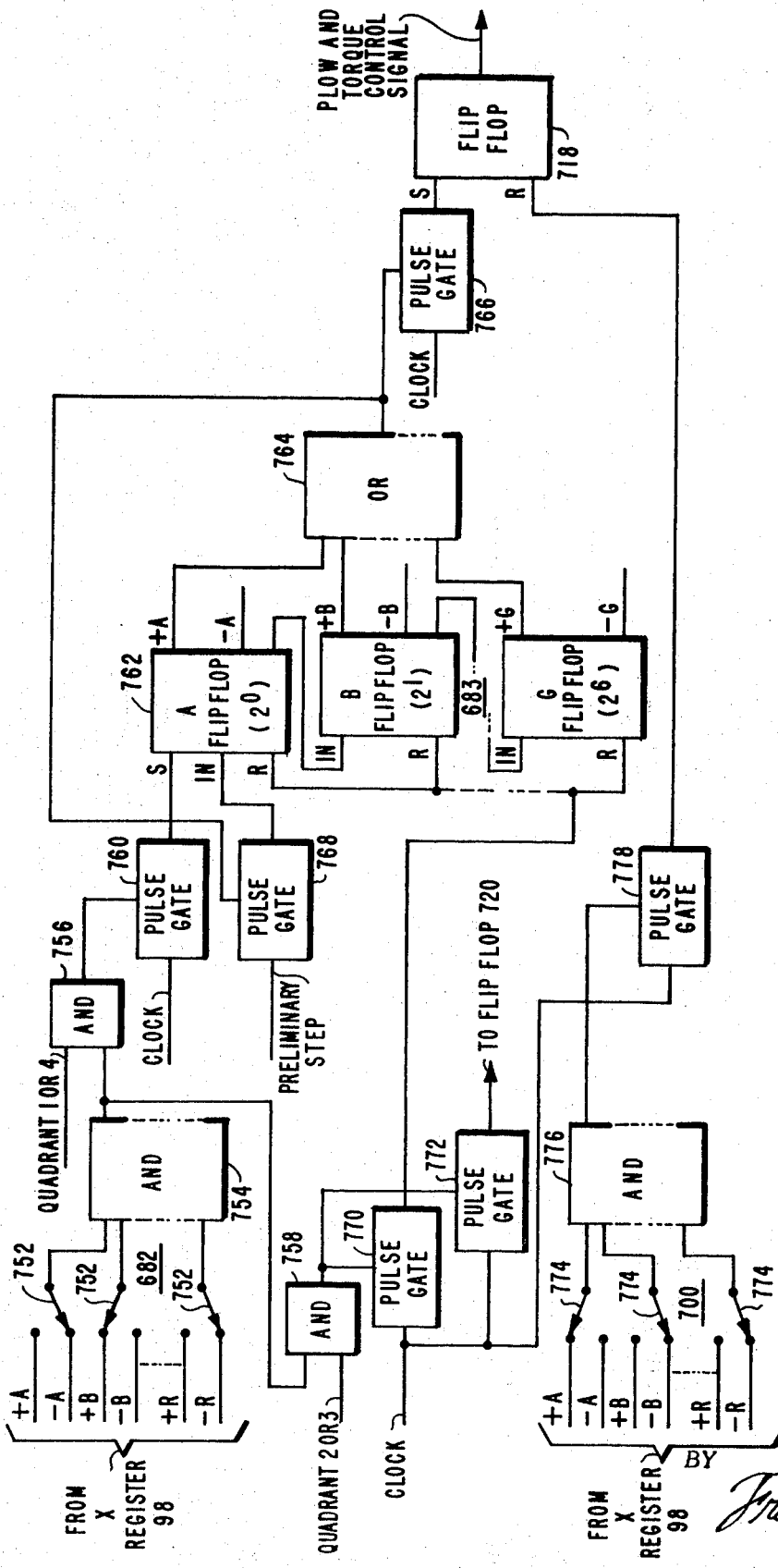
FIGS. 25 through 27 are detailed block diagrams of one preferred embodiment of the arrangement shown in FIG. 23.
Figure 26:
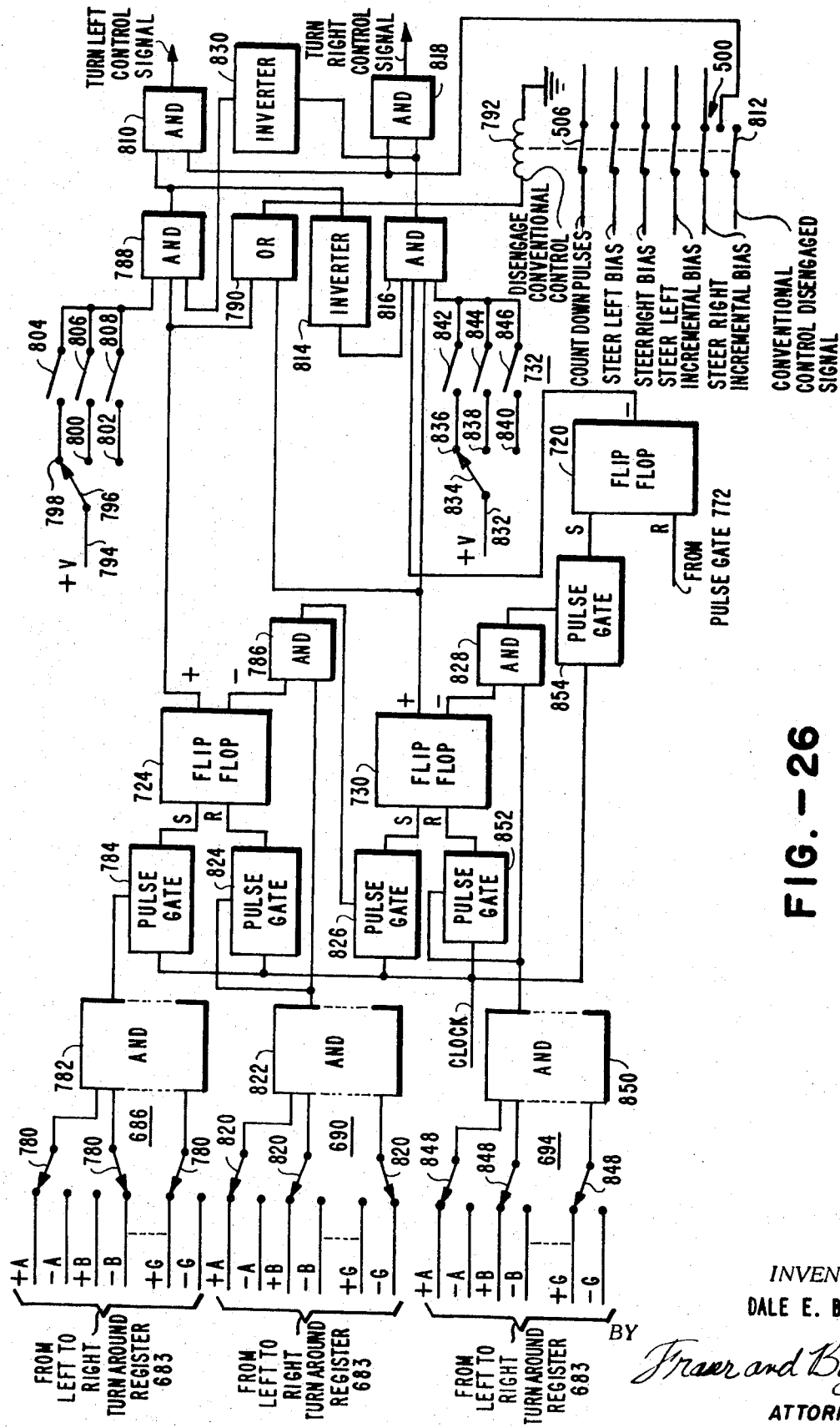
Figure 27:
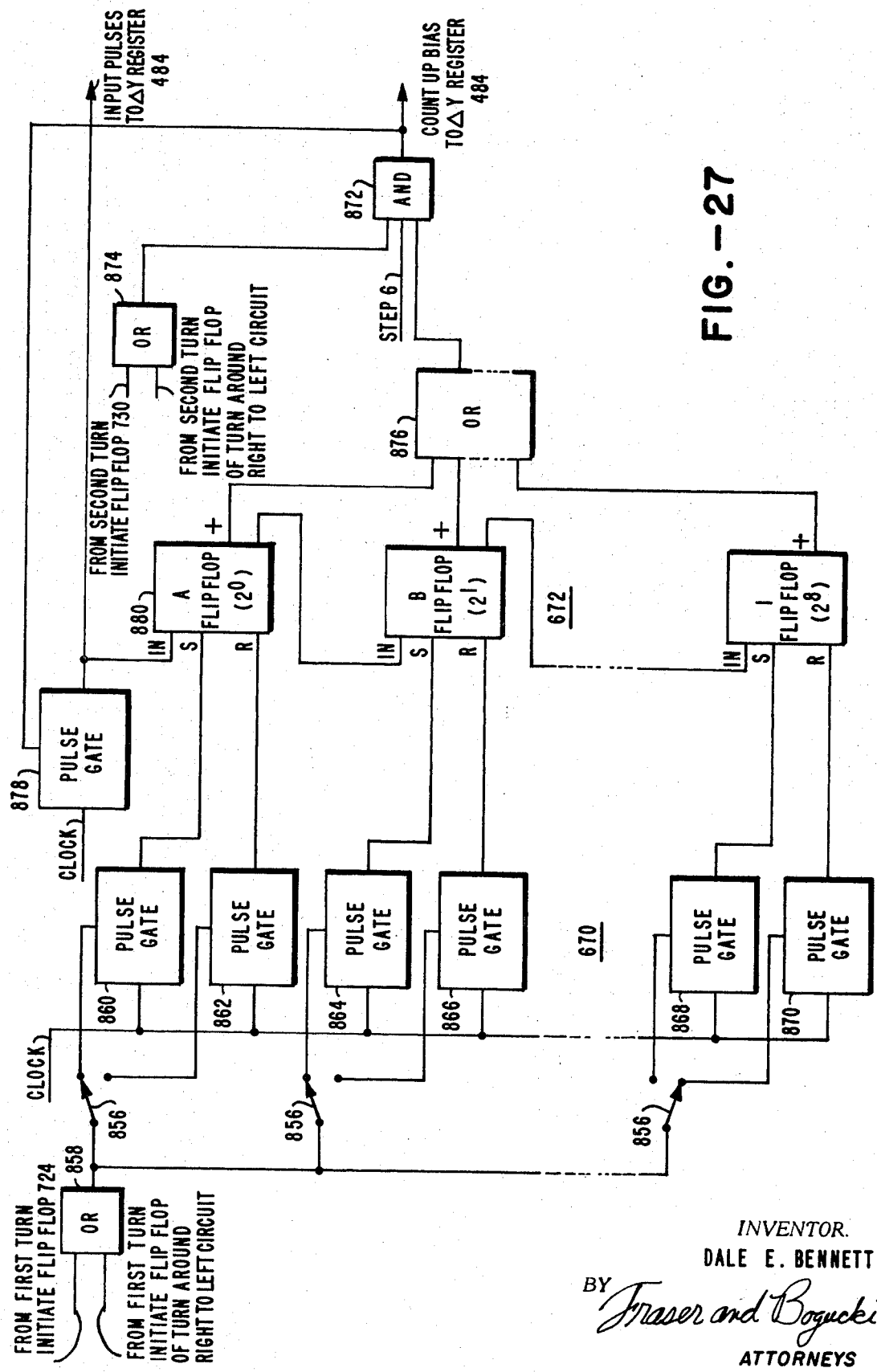

One preferred embodiment of the turnaround system 508 illustrated in FIG. 23 is shown in detail in FIGS. 25, 26 and 27. Referring to FIG. 25 the raise plow and decrease torque select switches and logic 682 includes select switches 752, each of which is coupled between a different input of an AND gate 754 and a different flip flop of the X register 98. When the vehicle reaches a point at which the plow is to be raised and the engine torque decreased, the positions of the various selection switches 752 correspond to the binary states of the X register flip flops, and all of the inputs of the AND gate 754 is enabled. The resulting output from the AND gate 754 enables one of the inputs of each of a pair of AND gates 756 and 758. A second input of the AND gate 756 is enabled if the vehicle is in QUADRANT 1 or 4. A second input of the AND gate 758 is enabled if the vehicle heading lies in QUADRANT 2 or 3. With the vehicle heading to the right as seen in FIG. 24 along a straightline path such as the path 676 or 712, the second input of the AND gate 756 is enabled and a pulse gate 760 is closed thereby setting the A flip flop 762 of the turnaround left to right register 683 in preparation for the counting up of this register. The positive or "one" state outputs of the various flip flops of the register 683 are coupled to different inputs of an OR gate 764. Assuming that the flip flops are not all "zero," the resulting output from the OR gate 764 closes a pulse gate 766 to set the plow and torque control flip flop 718, thereby providing an output signal which raises the plow and decreases the torque. At the same time, the output of the OR gate 764 closes a pulse gate 768 to couple the output of the preliminary step flip flop within the processing and computing step generator 40 shown in FIG. 9 to the input of the A flip flop 762. Immediately prior to each eight step processing and computing sequence, an output signal from the preliminary step flip flop comprises an input pulse to the turnaround left to right register 683.

The register 683 continues to count up until all of the flip flops thereof are RESET via a pulse gate 770. Accordingly, resetting of the flip flops of the register 683 occurs when the vehicle is traveling to the left as seen in FIG. 24 along a straightline path such as the path 696 or the path 736 and the same X position is reached at which the plow was raised and the vehicle torque decreased. When these conditions occur both inputs of the AND gate 758 are satisfied, and the pulse gate 770 is closed to reset the flip flops of the register 683. A pulse gate 772 is also closed to provide a signal which resets the second turn complete flip flop 720 as previously described.

The lower plow and increase torque select switches and logic 700, as shown in FIG. 24, include a plurality of select switches 774, each of which is coupled between a different input of an AND gate 776 and a different flip flop of the X register 98. When the vehicle reaches the appropriate X position at which the plow is to be lowered and the engine torque increased after turnaround, the positions of the various select switches 774 correspond with the states of the X register flip flops, and all of the inputs of the AND gate 776 are enabled. The resulting output of the AND gate 776 closes a pulse gate 778 to RESET the plow and torque control flip flop 718. This terminates the output signal from the flip flop 718 resulting in the lowering of the plow and the increasing of the engine torque.

As seen in FIG. 26 the first turn initiate select switches and logic 686 include a plurality of select switches 780, each of which is coupled between a different input of an AND gate 782 and a different flip flop of the turnaround left to right register 683. When the vehicle reaches the appropriate position at which the first turn is to be initiated, the positions of the select switches 780 correspond to the states of the flip flops in the turnaround left to right register 683, and all inputs of the AND gate 782 are enabled. The resulting output of the AND gate 782 closes a pulse gate 784 to pass a clock pulse which sets the first turn initiate flip flop 724. The resulting negative or "zero" output signal from the flip flop 724 enables one of the inputs of an AND gate 786 and the positive or "one" output signal enables one of the inputs of an AND gate 788. The "one" output signal also passes through an OR gate 790 to energize a coil 792 opening the switches 500 and 506, and thereby disengaging conventional control. As seen in FIG. 19 opening of the switch 506 prevents count down pulses from being passed from the pulse generator 496 to the steering register 492. The switch 500 is shown for reasons of simplicity as a single switch in FIG. 19. In reality, as shown in FIG. 26, the switch 500 comprises four separate switches coupled to receive the different steering biases and steering incremental biases.

The second input of the AND gate 788 is coupled to the turn rate select switches and logic 726 which, in this instance, comprise a source of positive voltage 794 and a turn rate selection switch 796 coupling the source 794 to one of three different terminals 798, 800 and 802. The terminals 798, 800 and 802 are coupled in parallel to the second input of the AND gate 788 via switches 804, 806 and 808 respectively. The switches 804, 806 and 808 which are initially closed at the beginning of the first turn are mechanically coupled to the steering mechanism so as to be opened when the steering mechanism is turned to a different extent from the normal position for straighahead travel. In the present example, three different switches are described, and it should be understood that any number can be used as appropriate. The first switch 804 is assumed to open when the steering mechanism is at a first angle or turn rate, say 10°, with respect to straightahead travel. The switch 806 is assumed to open at a second angle of, say 20° while the third switch 808 is assumed to open at a third angle of, say 30°.

With all three switches 804, 806 and 808 closed at the beginning of the first turn and enabling signals from flip flop 724 and AND gate 816 through an inverter, a signal from the source 794 is passed via the AND gate 788 and a second AND gate 810 to provide a turn left control signal to the left turn power source 502 shown in FIG. 19. The second input of the AND gate 810 has been enabled via a switch 812 which is mechanically coupled to the coil 792 so as to be closed whenever the coil 792 is energized. Closure of the switch 812 thereby indicates that conventional control has been disengaged. As the turn left control signal is applied to the steering mechanism, the steering mechanism turns left. When the mechanism reaches a position representing 10° from straightahead travel, the switch 804 opens. If the turn rate select switch 796 is positioned at the terminal 798 as shown in FIG. 26, the opening of the switch 804 terminates the turn left control signal and the steering mechanism remains at 10° to provide a relatively smooth and gradual first turn. If the switch 796 is positioned at the terminal 800 the turn left control signal continues to be applied until the switch 806 opens when the steering mechanism is at 20°. Similarly with the switch 796 at the terminal 802, the switch 808 opens to terminate the turn left control signal when the steering mechanism is at 30° relative to straightahead travel. The switches 804 and 806 provide increasingly sharper or higher turning rates.

So long as a signal appears at the output of the AND gate 788, such signal is inverted by an inverter 814 to disable one of the inputs of an AND gate 816 and thereby disable at least one of the inputs of an AND gate 818 coupled to provide the turn right control signal. In this manner the turn right control signal cannot be provided at the same time as the turn left control signal.

As shown in FIG. 26 the second turn initiate select switches and logic 690 includes select switches 820, each of which is coupled between a different input of an AND gate 822 and a different flip flop of the turnaround left to right register 683. When the vehicle reaches a point where the second turn is to be initiated, the positions of the select switches 820 correspond to the states of the flip flops in the register 683, and all inputs of the AND gate 822 are enabled. The resulting signal at the output of the AND gate 822 closes a pulse gate 824 to RESET the first turn initiate flip flop 724 and terminate the turn left control signal. Following the resetting of the flip flop 724, the first input of the AND gate 786 is enabled by the "zero" signal from flip flop 724 and the output from the AND gate 822 enables the second input of the AND gate 786 so as to close a pulse gate 826 and SET the second turn initiate flip flop 730. The resulting positive or "one" output from the flip flop 730 is passed via the OR gate 790 to energize the coil 792 and thereby disengage conventional control. The negative or "zero" output from the flip flop 730 enables one of the inputs of an AND gate 828. Finally, the positive or "one" output from the flip flop 730 is also applied to enable one of the inputs of the AND gate 816. With no signal appearing at the output of the AND gate 788, the inverter 814 enables its associated input to the AND gate 816. The inverter 830 coupling the output of AND gate 816 to AND gate 788 operates in the same way to enable turn left and turn right as desired. A third input of the AND gate 816 is from the negative or "zero" output of the second turn complete flip flop 720, and is enabled when the flip flop 720 is RESET. A fourth input of the AND gate 816 is coupled to the turn rate select switches and logic 732, which in this instance comprise a source 832 of positive voltage, a turn rate select switch 834 coupling the source 832 to one of three different terminals 836, 838 and 840, and three different switches 842, 844 and 846 respectively coupling the terminals 836, 838 and 840 to the associated input of the AND gate 816. The turn rate select switches and logic 732 operate in the same manner as the turn rate select switches and logic 726 to provide a turn right control signal via the AND gate 818, the control signal turning the steering mechanism as appropriate to effect a desired rate of turn to the right. The second input of the AND gate 818 is enabled by the switch 812 during the second turn.

As seen in FIG. 26 the second turn complete select switches and logic 694 include a plurality of select switches 848, each of which is coupled between a different input of an AND gate 850 and a different flip flop of the turnaround left to right register 683. As the vehicle reaches a point at which the second turn is to be terminated, the positions of the select switches 848 correspond to the states of the flip flops within the register 683, and all of the inputs of the AND gate 850 are thereby enabled. The resulting output signal from the AND gate 850 closes a pulse gate 852 to RESET the second turn initiate flip flop 730 and terminate the turn right control signal. Following the resetting of the flip flop 730 the output signal from the AND gate 850 enables the second input of the AND gate 828, and with the first input enabled by the negative or "zero" output signal from the RESET flip flop 730, the AND gate 828 closes a pulse gate 854 to SET the second turn complete flip flop 720. The resulting "zero" output from the flip flop 720 is coupled to disable the associated input of the AND gate 816, thereby insuring that the turn right control signal is terminated. With neither of the flip flops 724 and 730 having an output signal, the coil 792 is deenergized. This opens the switch 812 and closes the switches 500 and 506 to return the system to conventional control.

The $\Delta Y$ step selection switches and logic 670 and the $\Delta Y$ step register 672 are shown in detail in FIG. 27. The $\Delta Y$ step selection switches and logic 670 include select switches 856 arranged to couple the output of an OR gate 858 to one or the other of different pairs of pulse gates 860, 862, 864, 866, 868 and 870. The OR gate 858 has two inputs, one of which is coupled to the output of the first turn initiate flip flop 724, and the other input of which is coupled to the output of the first turn initiate flip flop associated with the turnaround right to left circuit. Accordingly, when a first turn is initiated at either end of the field being plowed, a signal is passed via the OR gate 858 and through the select switches 856 to close appropriate ones of the pulse gates 860, 862, 864, 866, 868 and 870, thereby passing clock pulses to SET or RESET the different flip flops in the $\Delta Y$ step register 672. It will be recalled that the switches 856 are positioned by the operator at the beginning of the plowing operation based on two different measurements taken, one measurement being of one-half the width of the plow and the other measurement being from the center of the plow to the next immediate furrow outside of the plow. These two measurements establish the value $\Delta Y$ which is to exist between the different adjacent straightline paths of the vehicle. Each time the vehicle begins a first turn a new $\Delta Y$ is entered in the $\Delta Y$ step register 672 as just described.

During STEP 6 of each processing and computing sequence, one of the inputs of an AND gate 872 is enabled. A second input of the AND gate 872 is enabled via an OR gate 874 whenever the second turn initiate flip flop 730 is SET or the second turn initiate flip flop of the turnaround right to left circuit is set. This input of the AND gate 872 is accordingly enabled during the second turn at either end of the field being plowed. A third input of the AND gate 872 is coupled through an OR gate 876 to the outputs of the different flip flops of the $\Delta Y$ step register 672. This input of the AND gate 872 is enabled so long as the binary value stored in the $\Delta Y$ step register 672 is not zero. Accordingly, upon initiation of the second turn and the occurrence of STEP 6, a signal appears at the output of the AND gate 872. This signal is applied to the $\Delta Y$ register 484 (shown in detail in FIG. 20) as count up bias. The signal is also applied to close a pulse gate 878. Clock pulses are accordingly passed to the input of the A flip flop 880 of the $\Delta Y$ step register 672 and to an input of the A flip flop of the $\Delta Y$ register 484. As the pulses are applied to the $\Delta Y$ step register 672 to count the register down to zero, the same pulses are thereby applied to the $\Delta Y$ register 484 to effectively transfer the new value $\Delta Y$ from the step register 672 into the $\Delta Y$ register 484.

The arrangement shown generally in FIG. 23 for driving the vehicle over a predetermined course without the need for an operator utilizes the wheel generated pulses to update the angle register 50, the quadrant register 60 and the Y register 88 as well as the X register 98. The arrangement is accordingly completely self-contained within the vehicle and does not require any sensors or other devices external to the vehicle. Such arrangement operates in highly accurate fashion for practically all applications. Occasionally, however, problems may be encountered due to wheel slippage or the presence of a highly irregular or bumpy surface over which the vehicle must travel. A further problem arises in the event that one or both of the opposite ends of the field where the vehicle turning movements are executed are not parallel to the Y axis, since the arrangement previously described responds to a fixed X position at both ends of the field.

Where wheel slippage alone is a problem, such problem can be substantially overcome for most vehicle applications by employing a separate set of wheels for generating pulses. The auxiliary wheels are preferably coaxial with and located adjacent the vehicle driving wheels, and have the added advantage of resisting slippage where the vehicle drive wheels may themselves slip due to the presence of a slippery road surface or rapid acceleration or deceleration. The outer peripheries of the auxiliary wheels may be provided with a roughened surface or other appropriate means to enhance traction, where desired.

Figure 28:
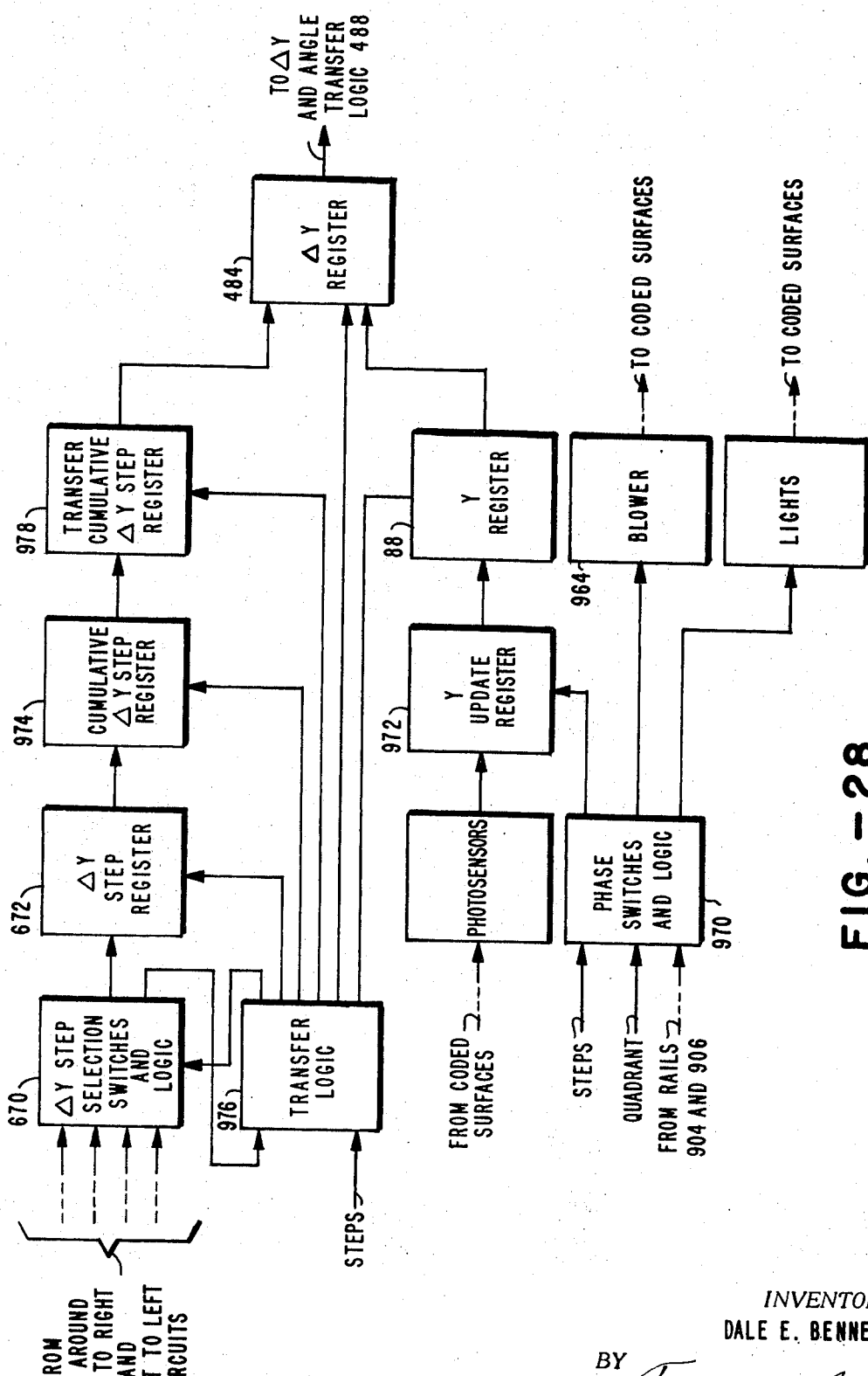
FIG. 28 is a block diagram of an arrangement used in conjunction with the arrangement of FIG. 19 to provide the actual Y position of the vehicle directly from field mounted sensor strips.
Figure 37:
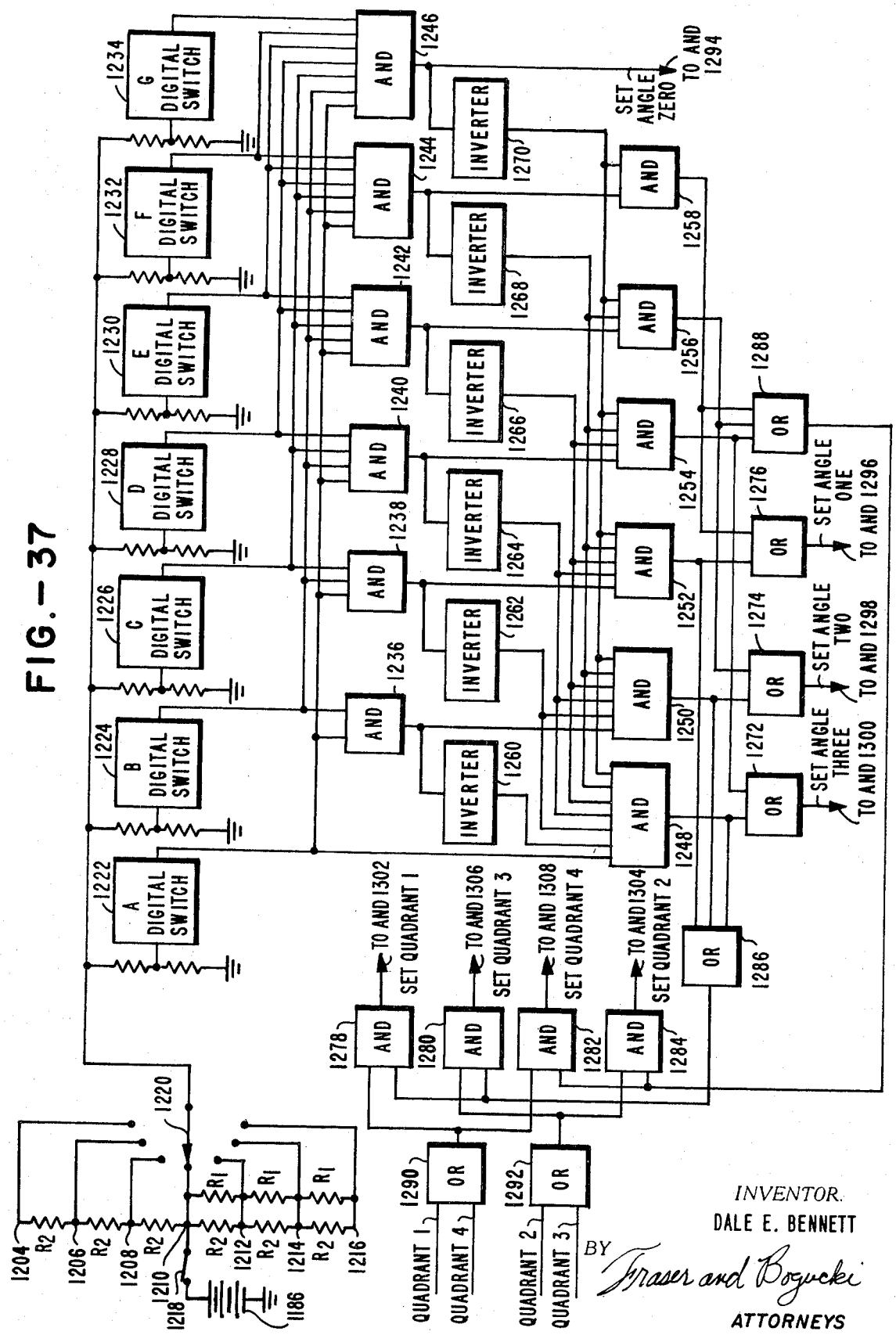
FIGS. 37 and 38 are detailed block diagrams of one preferred embodiment of the arrangement of FIG. 35.
Figure 38:
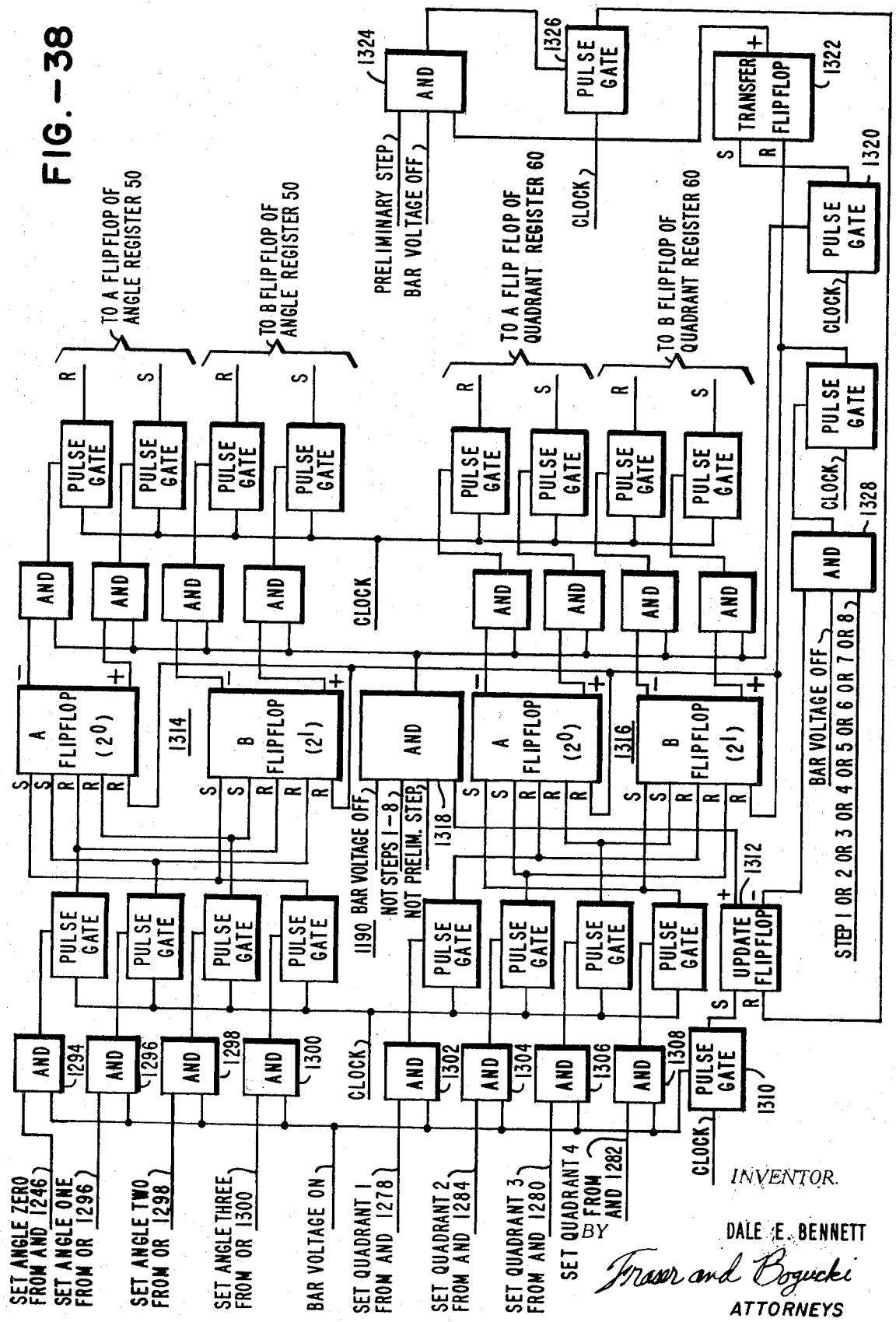

In situations where problems of the type noted above arise, it may be preferable to use a control arrangement in which the binary values of the angle, the quadrant and Y are updated directly from physical devices placed at the opposite ends of the field. One such arrangement for updating the binary value of Y directly from sensor strips placed at the opposite ends of the field is shown generally in FIG. 28. An example of a sensor strip for use in conjunction with the FIG. 28 arrangement is shown in FIGS. 29 and 30. One preferred embodiment of the arrangement shown in FIG. 28 is shown in FIGS. 31 through 34. A similar arrangement for updating the binary angle and quadrant values directly from sensor strips located at the opposite ends of the field is illustrated generally in FIG. 35. FIG. 36 illustrates one example of a sensor strip for use in conjunction with the FIG. 35 arrangement. The details of one preferred embodiment of the FIG. 35 arrangement are illustrated in FIGS. 37 and 38.

A portion of an elongated sensor strip 900 used in conjunction with the arrangement of FIG. 28 is illustrated in FIG. 29. The strip 900 is shown in section together with associated vehicle or tractor mounted apparatus in FIG. 30. As seen in FIG. 29 the strip 900 is placed on the ground at one end of the field such that its longitudinal axis 902 parallels the Y axis. The strip 900 resides approximately at the X position where turning movements of the tractor are initiated. An identical strip 900 is placed at the opposite end of the field, again with its longitudinal axis generally parallel to the Y axis at the approximate X position where turning movements of the tractor are initiated. The approximate locations of the two sensor strips 900 are illustrated in dotted outline in FIG. 24 for the particular example shown therein.

The strip 900 includes opposite upwardly extending rails 904 and 906 parallel to the longitudinal axis 902 and a plurality of upwardly extending separating elements 908, 910, 912, 914, 916, 918 and 920 disposed between the opposite rails 904 and 906 and also parallel to the longitudinal axis 902. The separating elements which are of lesser height than the opposite rails 904 and 906 as seen in FIG. 30 extend upwardly from a base 922 and are substantially equally spaced apart from one another so as to define a plurality of elongated, mutually parallel coded surfaces 924, 926, 928, 930 and 932. Each of the coded surfaces corresponds to a different bit in the Y register 88. As mentioned in connection with the discussion of the X register 98 shown in detail in FIG. 15, the Y register 88 has 18 different bit positions or register stages designated A through R. The coded surfaces 924, 926 and 928 correspond to the A, B and C bits or stages of the Y register respectively, while the surfaces 930 and 932 correspond to the Q and R bits or stages of the Y register respectively, the surfaces corresponding to the intervening stages or bits having been omitted from FIGS. 29 and 30 for simplicity of illustration. Each of the coded surfaces comprises a plurality of light reflective areas 934 interspersed between and approximately equal in size to a plurality of non-reflective areas 936, the non-reflective areas 936 being shown as shaded or darkened areas in FIG. 29. The widths of the areas 934 and 936 in the Y direction are chosen in accordance with the distance in the Y direction over which the corresponding flip flop in the Y register will assume one state before changing to the opposite state. Thus, as seen in FIG. 29 the areas 934 and 936 have the smallest widths along the coded surface 924 corresponding to the least significant bit and the largest widths along the coded surface 932 representing the most significant bit.

As described in detail hereafter the tractor responds to the coded surfaces each time it passes over the sensor strip 900 to enter the actual value of Y into the Y register. As seen in FIG. 30 the underside 938 of the vehicle 940 is equipped with a plurality of lights 942, 944, 946, 948 and 950 disposed along an axis parallel to the vehicle longitudinal axis and corresponding to the coded surfaces 924, 926, 928, 930 and 932 respectively. Associated with the lights 942, 944, 946, 948 and 950 are a plurality of light sensitive devices or photosensors 952, 954, 956, 958 and 960 respectively. Each of the photosensors is arranged to be activated by reflected light from the associated light if the coded surface directly below presents a light reflective area 934. Non-reflective areas 936, on the other hand, do not reflect a sufficient amount of light from the associated light to activate the photosensors.

If the lights and photosensors are assumed to reside along an axis 962 shown in FIG. 29 as the vehicle passes over the sensor strip 900, then the photosensors 952, 956 and 958 will not be activated due to the presence of non-reflective areas 936 directly below them. The light reflective areas 934 on the coded surfaces 926 and 932, however, will reflect light from the lights 944 and 950 to activate the photosensors 954 and 960.

Also mounted on the underside 938 of the vehicle 940 are a blower 964, a leading switch 966 and a trailing switch 968. The vehicle is assumed to be traveling in a direction toward the right as seen in FIG. 30 as it passes over the sensor strip 900. As described hereafter the switches 966 and 968 which are normally open momentarily close each time they contact the rail 904 and the rail 906 to initiate a sequence of operations resulting in the updating of the Y register 88. As the tractor passes over the sensor strip 900 the blower 964 is turned on to direct a blast of air onto the coded surfaces and clean dirt or other debris therefrom in preparation for the sensing of the correct Y value.

The sensing of the coded surfaces of the strip 900 is described in connection with the use of light sources and photosensors for purposes of illustration only. Thus, it will be apparent to those skilled in the art that other appropriate schemes such as the use of electric contacts or inductive pickup devices in conjunction with selectively energized and de-energized areas on the coded surfaces may alternatively be used.

Referring to FIG. 28 the leading and trailing switches 966 and 968 shown in FIG. 30 comprise the phase switches in phase switches and logic 970. As the vehicle approaches the sensor strip 900 the leading switch 966 momentarily closes upon contact with the first rail 904 to turn on the blower 964 and initiate PHASE ONE of a two phase operation. The subsequent momentary closure of the trailing switch 968 upon contact with the rail 904 resets a Y update register 972 in preparation for the sensing of the new Y value and initiates PHASE TWO of the two phase operation. As the vehicle continues across the strip 900 the blast of air from the blower 964 cleans the individual coded surfaces. When the leading switch 966 momentarily closes upon contact with the second rail 906 the blower 964 is turned off and the lights are turned on. The various photo switches respond to the presence or absence of reflected light as previously described, and the resulting binary values are entered in the Y update register 972. As the trailing switch 968 contacts the rail 906 and momentarily closes, the lights are turned off, thereby terminating PHASE TWO. Upon the occurrence of STEP ONE of the first eight step processing and computing sequence to occur thereafter, the binary Y value temporarily stored in the Y update register 972 is destructively transferred into the Y register 88.

Thereafter as the vehicle reaches the approximate X position, the plow is raised and the torque decreased in the same manner as described in connection with FIG. 23. Similarly, the first turn is initiated and $\Delta Y$ is transferred from the $\Delta Y$ step selection switches and logic 670 into the $\Delta Y$ step register 672 as previously described.

Upon occurrence of STEP ONE of the first eight step processing and computing sequence thereafter, the binary value of $\Delta Y$ is destructively transferred from the $\Delta Y$ step register 672 into a cumulative $\Delta Y$ step register 974 under the control of transfer logic 976 as seen in FIG. 28. During the following STEP TWO, the binary value of Y stored in the Y register 88 is non-destructively transferred into the $\Delta Y$ register 484. The cumulative $\Delta Y$ step register 974 provides the sum of all of the $\Delta Y$'s generated during a given vehicle operation, and the binary value of such sum is also non-destructively transferred during STEP TWO into a transfer cumulative $\Delta Y$ step register 978. During the following STEP THREE the value temporarily stored in the transfer cumulative $\Delta Y$ step register 978 is destructively transferred into the $\Delta Y$ register 484.

A number of significant differences will be noted between the arrangements of FIGS. 28 and 23. As already pointed out the arrangement of FIG. 28 provides to the $\Delta Y$ register 484 a binary value of Y which is obtained directly from the sensor strip 900 rather than from the wheel generated pulses as in the case of FIG. 23. A further difference, however, resides in the fact that in the FIG. 23 arrangement $\Delta Y$ is transferred directly from the $\Delta Y$ step register 672 into the $\Delta Y$ register 484, whereas in the FIG. 28 arrangement the value $\Delta Y$ from the step register 672 is entered in the cumulative $\Delta Y$ step register 974 and the cumulative total value of $\Delta Y$ is entered in the $\Delta Y$ register 484 via the transfer cumulative $\Delta Y$ step register 978. The $\Delta Y$ register 484 itself functions in a slightly different manner in the arrangement of FIG. 28. Instead of storing each position error value $\Delta Y$ and thereafter using the change in Y as a feedback signal to attempt to reduce the stored $\Delta Y$ value to zero, the $\Delta Y$ register 484 in the FIG. 28 arrangement algebraically combines the actual Y value from the Y register 88 with the cumulative total of $\Delta Y$. In the FIG. 28 arrangement operation of the vehicle is begun at a position where Y is arbitrarily made equal to zero. Thereafter as Y increases, the total of the $\Delta Y$ values also increases desirably at a substantially equal rate. Any difference between the actual Y value and the cumulative total of $\Delta Y$ as determined by the $\Delta Y$ register 484 is accordingly provided to the $\Delta Y$ and angle transfer logic 488 as an error signal to change the Y position of the vehicle accordingly.

Figure 31:
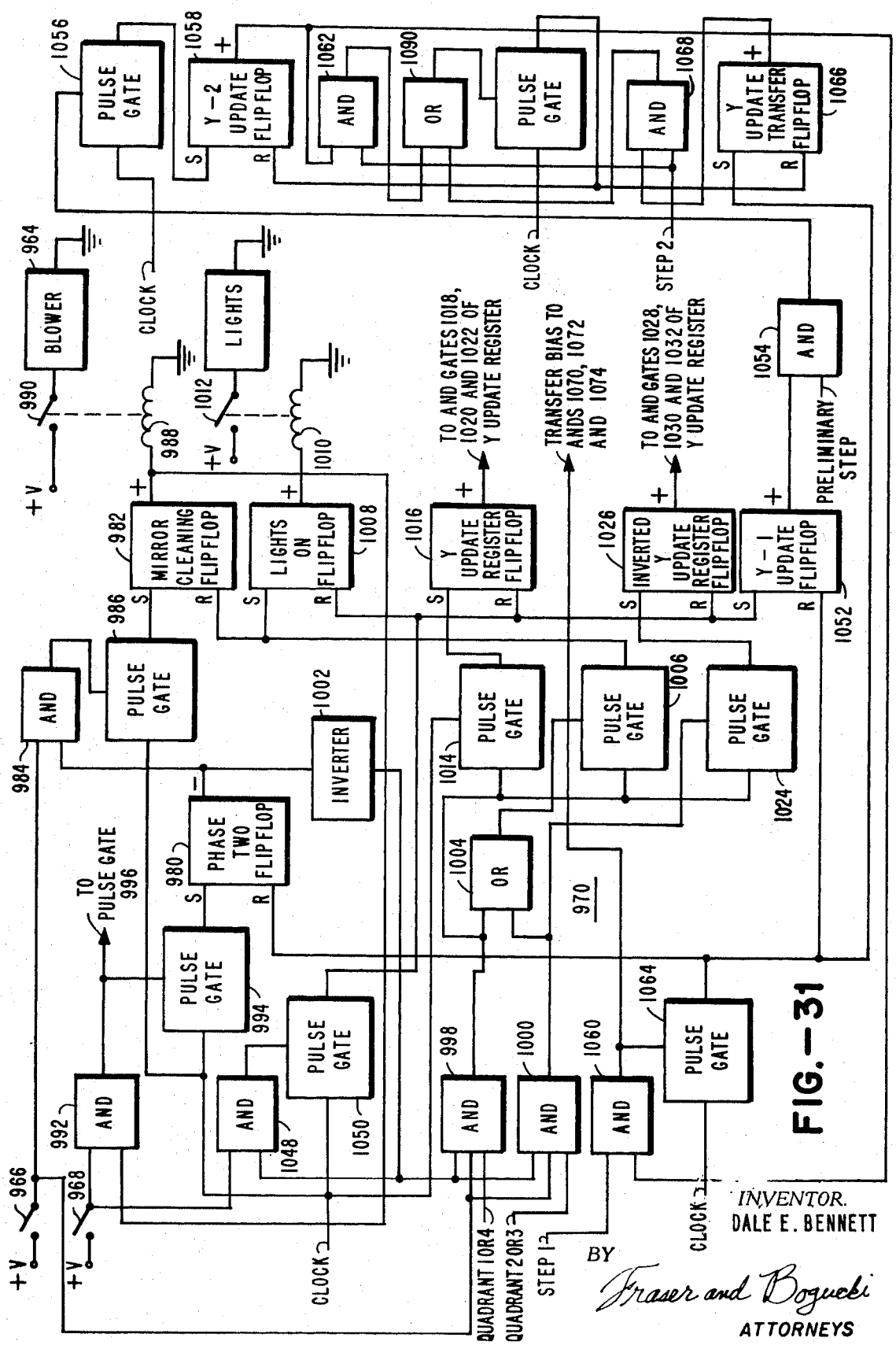
FIGS. 31 through 34 are detailed block diagrams of one preferred embodiment of the arrangement of FIG. 28.
Figure 32:
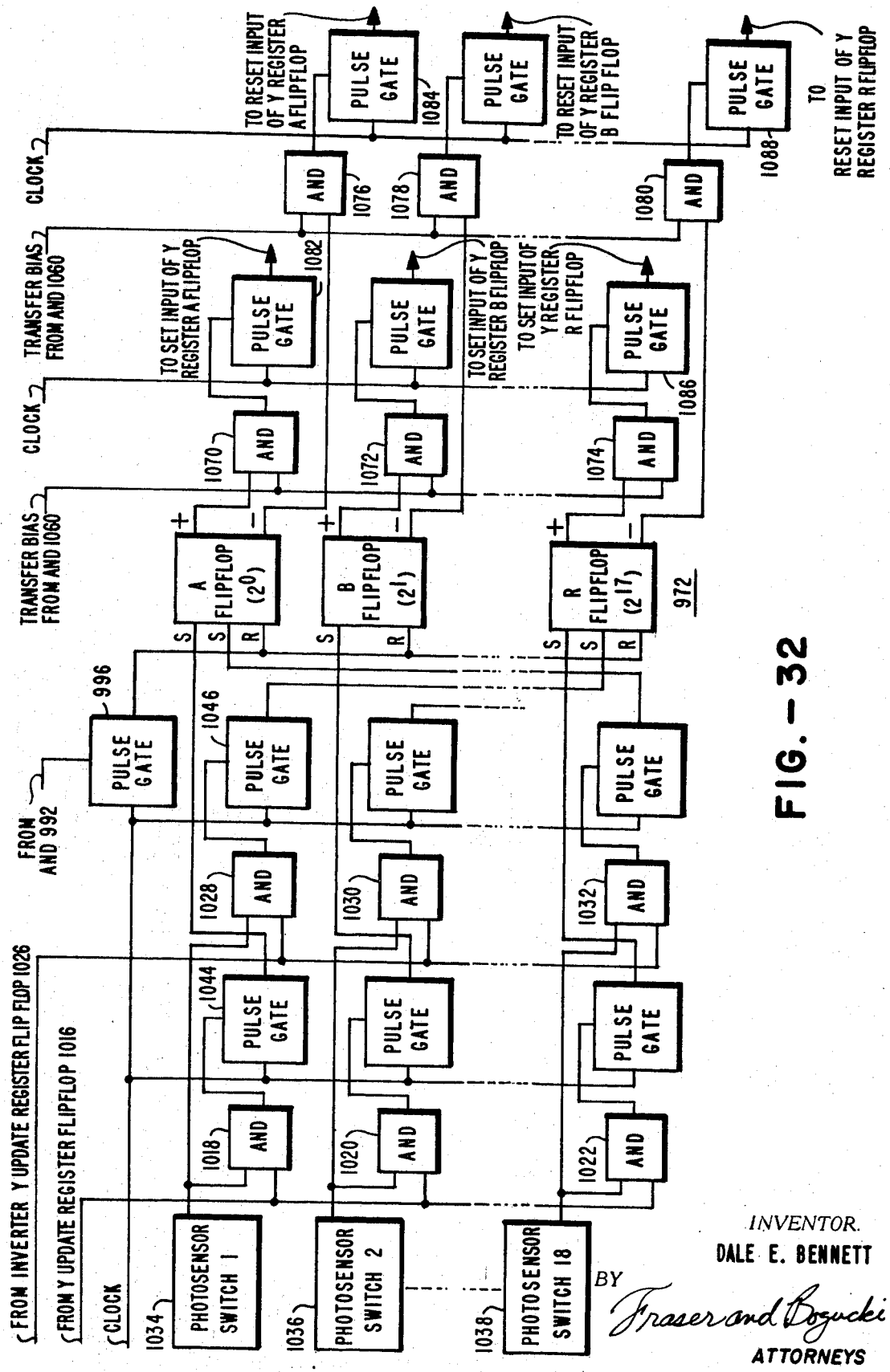
Figure 33:
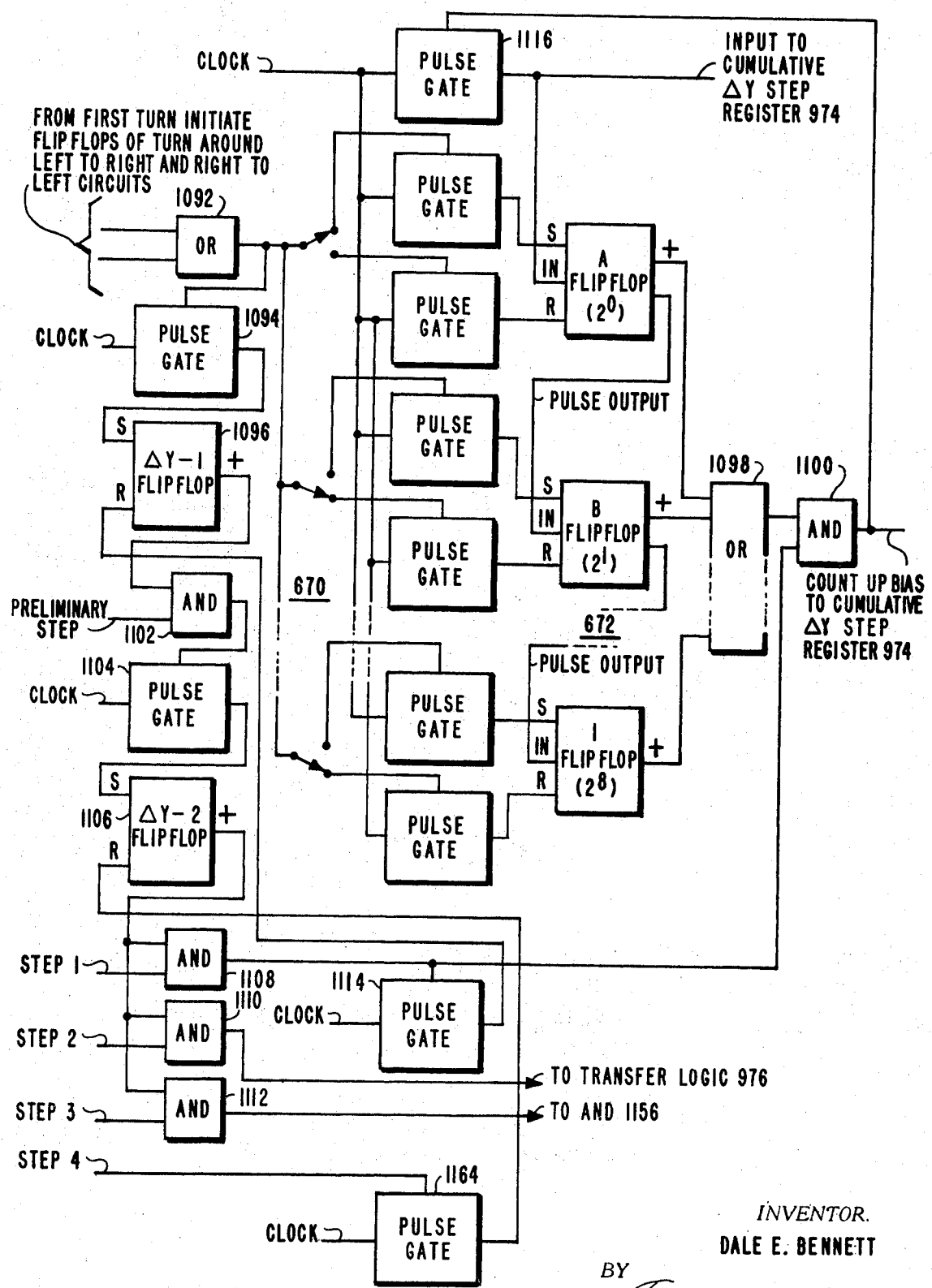
Figure 34:
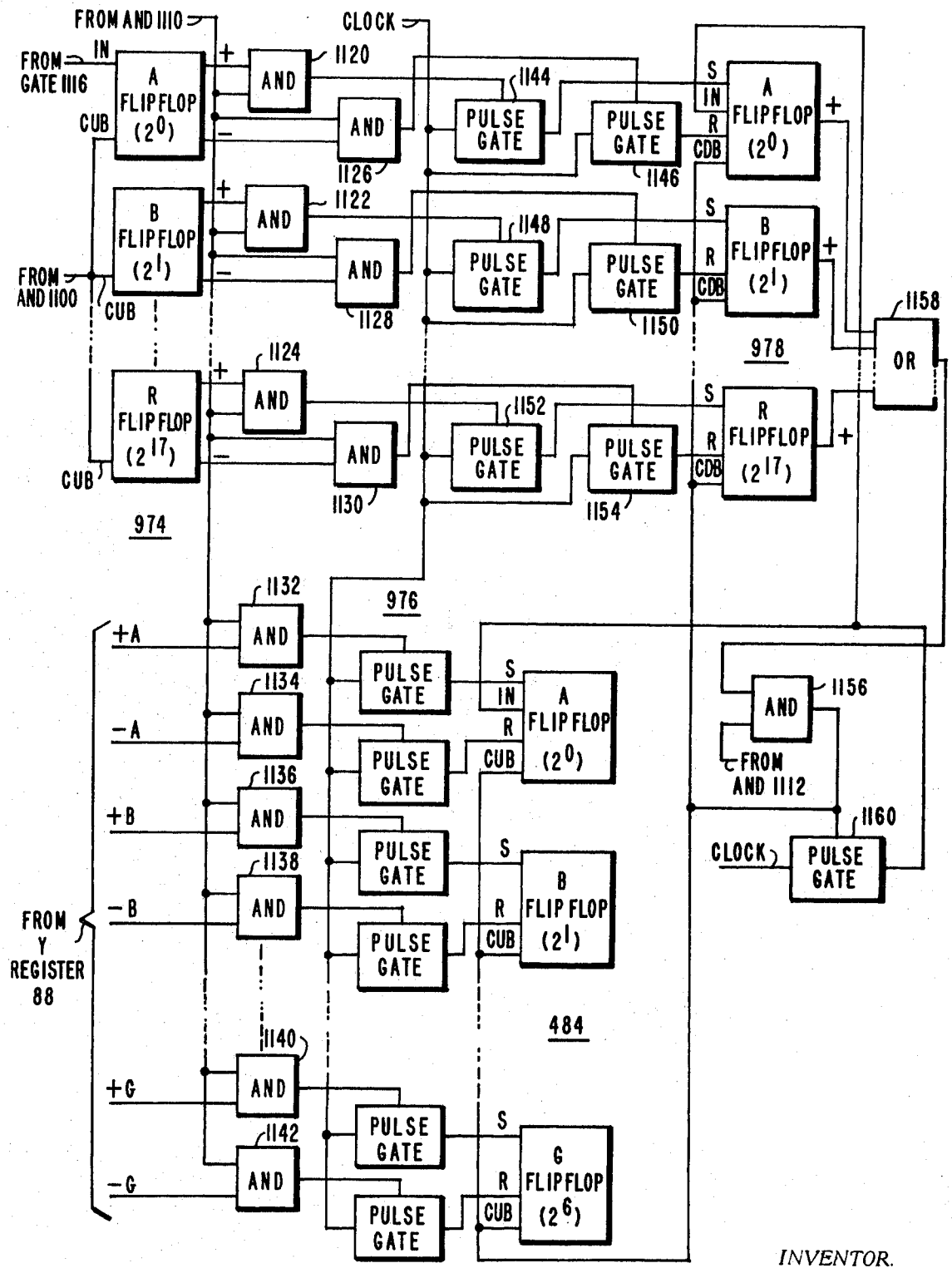

One preferred embodiment of the arrangement of FIG. 28 is shown in detail in FIGS. 31, 32, 33 and 34. FIG. 31 illustrates the phase switches and logic 970 including the leading and trailing switches 966 and 968, the blower 964 and the lights. FIG. 32 illustrates the Y update register 972 and associated logic circuitry which is responsive to the photosensors. FIG. 33 illustrates the $\Delta Y$ step selection switches and logic 670, the $\Delta Y$ step register 672, and part of the transfer logic 976. FIG. 34 illustrates the cumulative $\Delta Y$ step register 974, the transfer cumulative $\Delta Y$ step register 978, the $\Delta Y$ register 484 and a part of the transfer logic 976.

Referring to FIG. 31 a phase two flip flop 980 and a mirror cleaning flip flop 982 are initially assumed to be RESET or "off." The resulting output of the phase two flip flop 980 enables one of the two different inputs of an AND gate 984. As the vehicle approaches the sensor strip 900 and the leading switch 966 engages the rail 904 so as to momentarily close, the second input of the AND gate 984 is enabled and a pulse gate 986 is closed passing a clock pulse to SET the mirror cleaning flip flop 982 and thereby energize a relay coil 988 to close a switch 990. The blower 964 is thereby turned on directing a blast of air onto the coded surfaces of the strip. The setting of the mirror cleaning flip flop 982 initiates PHASE ONE and also enables one of the two inputs of an AND gate 992. As the trailing switch 968 engages the rail 904 so as to momentarily close, the second input of the AND gate 992 is enabled, and the resulting output signal is applied to close a pulse gate 994 and pass a clock pulse to SET the phase two flip flop 980 and thereby initiate PHASE TWO. The output signal from the AND gate 992 is also passed to close a pulse gate 996 shown in FIG. 32 and thereby pass a clock pulse to the RESET inputs of the flip flops comprising the Y update register 972 in preparation for the sensing of the coded surfaces of the sensor strip.

As the vehicle advances over the strip 900 the blower 964 cleans the coded surfaces. When the leading switch 966 engages the rail 906 and momentarily closes, a signal is passed to momentarily enable one input of each of a pair of AND gates 998 and 1000. An inverter 1002 responds to the absence of an output signal at the phase two flip flop 980 to enable a second input of each of the AND gates 998 and 1000. A third input of the AND gate 998 is coupled to be enabled if the vehicle heading lies in QUADRANT 1 or 4, and a third input of the AND gate 1000 is coupled to be enabled if the vehicle heading lies in QUADRANT 2 or 3. The resulting output signal from one or the other of the AND gates 998 and 1000 is passed via an OR gate 1004 to close a pulse gate 1006. Closure of the pulse gate 1006 passes a clock pulse to SET a lights on flip flop 1008 and RESET the mirror cleaning flip flop 982. Resetting of the mirror cleaning flip flop 982 opens the switch 990 to turn off the blower 964. The setting of the lights on flip flop 1008 energizes a relay coil 1010 to close a switch 1012 and turn on the various lights 942, 944, 946, 948 and 950 shown in FIG. 30. If the vehicle heading lies in QUADRANT 1 or 4, the resulting output signal from the AND gate 998 also closes a pulse gate 1014 to SET a Y update register flip flop 1016. The resulting output signal from the flip flop 1016 enables one input of a plurality of AND gates 1018, 1020 and 1022 shown in FIG. 32. If the vehicle heading lies in QUADRANT 2 or 3 the resulting output signal from the AND gate 1000 also closes a pulse gate 1024 passing a clock pulse to SET an inverted Y update register flip flop 1026. The resulting output signal from the flip flop 1026 enables one input of a plurality of AND gates 1028, 1030 and 1032 shown in FIG. 32.

The photosensors 952, 954 and 960 shown in FIG. 30 are respectively coupled to switches 1034, 1036 and 1038 as shown in FIG. 32 with the intervening photosensors being coupled to a plurality of intervening photosensor switches eliminated from FIG. 32 for simplicity of illustration. Whenever the associated photosensor is activated by reflected light from a coded surface the associated one of the switches 1034, 1036 and 1038 is closed to pass a signal which enables a second input of the AND gates 1018, 1020, 1022, 1028, 1030 and 1032. It will be noted from FIG. 32 that the AND gates 1018, 1020 and 1022 appropriately close pulse gates to set the respective flip flops of the Y update register 972. By this means reflected light on switch 1034 will cause the A flip flop of the Y update register 972 to be set. This corresponds to the direction of travel to the right as shown in FIG. 30. If the vehicle is crossing the sensor strip 900 in one direction the least significant bit of the binary Y value is provided the photosensor switch 1034 and the most significant bit is provided to the photosensor switch 1038. Conversely, if the vehicle is crossing the sensor strip 900 in the opposite direction the least significant bit is provided to the photosensor switch 1038 and the most significant bit is provided to the photosensor switch 1034. The direction in which the vehicle is traveling must accordingly be considered, and this is accomplished by the use of the two different sets of AND gates 1018, 1020, 1022 and 1028, 1030 and 1032. AND gates 1018, 1020 and 1022 are coupled to appropriately SET the A, B and R flip flops respectively of the Y update register 972. AND gates 1028, 1030 and 1032 are coupled to appropriately set the R, Q and A flip flops respectively.

When the vehicle is traveling in a first direction such that the heading thereof lies in QUADRANT 1 or 4 the Y update register flip flop 1016 is SET so as to prime the set of AND gates 1018, 1020 and 1022 shown in FIG. 32. Conversely, with the vehicle traveling in the opposite direction such that the heading lies in QUADRANT 2 or 3, the inverted Y update register flip flop 1026 is SET so as to prime the set of AND gates 1028, 1030 and 1032. If the photosensor associated with the first switch 1034 is positioned above a reflective area 934 as seen in FIG. 29 so as to be activated and close the switch 1034, the resulting output signal from the switch 1034 enables the associated inputs of the AND gates 1018 and 1028. If the vehicle heading lies in QUADRANT 1 or 4 so that the Y update register flip flop 1016 is SET, the other input of the AND gate 1018 is enabled to close a pulse gate 1044 and pass a clock pulse to SET the A flip flop of the Y update register 972. If however the vehicle heading lies in QUADRANT 2 or 3 so as to SET the inverted Y update register flip flop 1026, the second input of the AND gate 1028 is enabled to close a pulse gate 1046 and SET the R flip flop of the Y update register 972. If the photosensor associated with the first switch 1034 is located above a non-reflective area 936 as seen in FIG. 29 the switch 1034 remains open and neither of the AND gates 1018 and 1028 is primed. Accordingly, the A and R flip flops respectively remain RESET. The switch 1036 responds in similar fashion to the associated photosensors to SET one or the other of the flip flops B or Q of the Y update register 972 when reflected light is present and to allow the two different flip flops to remain RESET when reflected light is not present.

It will therefore be seen that the actual binary value of Y is entered into the Y update register 972 upon momentary closure of the leading switch 966 at the second rail 906. As the trailing switch 968 engages the rail 906 so as to momentarily close, one of the inputs of an AND gate 1048 as seen in FIG. 31 is enabled. The other input of the AND gate 1048 is also enabled via the inverter 1002 since the phase two flip flop 980 is still "on." The resulting output closes a pulse gate 1050 to RESET the lights on flip flop 1008 thereby turning off the lights, to RESET the Y update register flip flop 1016, to RESET the inverted Y update register flip flop 1026 and to SET a Y-1 update flip flop 1052. The resulting output signal from the Y-1 update flip flop 1052 enables one input of an AND gate 1054 and the second input of the AND gate 1054 is enabled by the preliminary step flip flop of the processing and computation step generator 40 shown in detail in FIG. 9 at the beginning of the next eight step sequence. This closes a pulse gate 1056 to SET a Y-2 update flip flop 1058. The resulting output signal from the flip flop 1058 enables one input of each of a pair of AND gates 1060 and 1062. Upon the occurrence of STEP ONE the other input of the AND gate 1060 is enabled, and the resulting output signal comprising a transfer bias is applied to transfer the binary value stored in the Y update register 972 into the Y register 88. The output signal from the AND gate 1060 also closes a pulse gate 1064 to RESET the phase two flip flop 980 thereby terminating PHASE TWO, to RESET the Y-1 update flip flop 1052, and to SET a Y update transfer flip flop 1066 and thereby enable one input of an AND gate 1068.

As seen in FIG. 32 the transfer bias enables one input of each of a plurality of AND gates 1070, 1072, 1074, 1076, 1078 and 1080. If the A flip flop of the Y update register 972 is in the SET Or "one" state, the second input of the AND gate 1070 is enabled and the resulting output signal closes a pulse gate 1082. Closure of the pulse gate 1082 passes a clock pulse to SET the A flip flop of the Y register 88. If the A flip flop of the Y update register 972 is in the RESET or "zero" state, the second input of the AND gate 1076 is enabled. The resulting closure of a pulse gate 1084 passes a clock pulse to RESET the A flip flop of the Y register 88. The AND gates 1072, 1074, 1078 and 1080 respond in similar fashion to the B and R flip flops of the Y update register to SET or RESET the B and R flip flops of the Y register 88 as appropriate.

As described above the binary value stored in the Y update register 972 is transferred into the Y register 88 during STEP ONE. During the following STEP TWO as shown in FIG. 31 the second inputs of each of the AND gates 1062 and 1068 are enabled. The resulting output signals are passed via an OR gate 1090 and pulse gate to RESET the Y-2 update flip flop 1058 and the Y update transfer flip flop 1066 in preparation for the next pass of the vehicle over the sensor strip 900.

As the travel of the vehicle continues the appropriate X position is reached and the plow is raised and the torque decreased in the manner previously described in connection with FIG. 23. The turnaround left to right register 683 shown in FIG. 23 begins counting, and when the appropriate point is reached the first turn initiate flip flop 724 is SET. The resulting output signal from the flip flop 724 or from the corresponding first turn initiate flip flop associated with the turnaround right to left circuit in cases where the vehicle is at the opposite end of the field is passed via an OR gate 1092 as seen in FIG. 33 to close a pulse gate 1094 and SET a Δ Y-1 flip flop 1096. The output signal from the OR gate 1092 is also passed via the Δ Y step selection switches and logic 670 to enter the binary Δ Y value into the Δ Y step register 672 as previously described in connection with FIG. 27. An OR gate 1098 enables one of the inputs of an AND gate 1100 so long as all of the flip flops of the Δ Y step register 672 are not "zero."

The Δ Y-1 flip flop 1096 when SET enables one of the inputs of an AND gate 1102, the other input of which is enabled by the preliminary step flip flop of the processing and computation step generator 40 at the beginning of the next eight step processing and computing sequence. The resulting output signal from the AND gate 1102 closes a pulse gate 1104 to SET a Δ Y-2 flip flop 1106 and thereby enable an input of each of three different AND gates 1108, 1110 and 1112. Upon the occurrence of STEP ONE thereafter, the second input of the AND gate 1108 is enabled and the resulting output signal closes a pulse gate 1114 to RESET the Δ Y-1 flip flop 1096. The output signal from the AND gate 1108 also enables the second input of the AND gate 1100, the resulting output signal of which closes a pulse gate 1116 and is passed to provide COUNTUP BIAS to the cumulative Δ Y step register 974 shown in FIG. 34. Closure of the pulse gate 1116 applies clock pulses to the input of the A flip flop of the Δ Y step register 672. At the same time as the output pulses from the pulse gate 1116 are counting down the Δ Y step register 672 to zero, the pulses are also applied as input pulses to the A flip flop of the cumulative Δ Y step register 974 shown in FIG. 34. In this manner the binary value of Δ Y stored in the Δ Y step register 672 is destructively transferred into the cumulative Δ Y step register 974. When all of the flip flops of the Δ Y step register 672 reach "zero," the output from the OR gate 1098 disappears and the count down process is terminated.

Upon commencement of STEP TWO the second input of the AND gate 1110 shown in FIG. 33 is enabled and the resulting output signal therefrom is passed to enable one input of each of a plurality of AND gates 1120, 1122, 1124, 1126, 1128, 1130, 1132, 1134, 1136, 1138, 1140 and 1142 in the transfer logic 976 shown in FIG. 34. The various outputs of the flip flops in the cumulative Δ Y step register 974 are coupled as second inputs to different ones of the AND gates 1120, 1122, 1124, 1126, 1128 and 1130. The outputs of these AND gates control different ones of a plurality of pulse gates 1144, 1146, 1148, 1150, 1152 and 1154 coupled to the RESET and SET inputs of the different flip flops comprising the transfer cumulative Δ Y step register 978. Depending upon the state of each flip flop within the cumulative Δ Y step register 974, both inputs of one or the other of the AND gates associated with the output thereof are enabled, and the resulting output signal therefrom is passed to close the associated pulse gate and RESET or SET the associated flip flop within the transfer cumulative Δ Y step register 978 as appropriate. The binary value stored in the cumulative Δ Y step register 974 is thereby non-destructively transferred into the transfer cumulative Δ Y step register 978 during STEP TWO.

Also during STEP TWO the binary value stored in the Y register 88 is non-destructively transferred into the Δ Y register 484 shown in FIG. 34. Each of the AND gates 1132, 1134, 1136, 1138, 1140 and 1142 which has one input enabled by the output signal from the AND gate 1110 shown in FIG. 33 has a second input coupled to be enabled by an output signal from a different one of the flip flops in the Y register 88. Both inputs of one or the other of each pair of AND gates 1132, 1134, 1136, 1138, 1140 and 1142 are thereby enabled, and the resulting output signal closes a pulse gate to RESET or SET an associated flip flop of the Δ Y register 484.

Upon commencement of STEP THREE both inputs of the AND gate 1112 shown in FIG. 33 are enabled, and the resulting output signal is passed to enable one input of an AND gate 1156 shown in FIG. 34. The other input of the AND gate 1156 is coupled to be enabled by an OR gate 1158 so long as the various flip flops comprising the transfer cumulative Δ Y step register 978 are not all "zero." The resulting output signal from the AND gate 1156 closes a pulse gate 1160 to pass clock pulses to the input of the A flip flop of the transfer cumulative Δ Y step register 978 and to the A flip flop of the Δ Y step register 484. The output signal from the AND gate 1156 is also coupled to provide count down bias to the transfer cumulative Δ Y step register 978 and to the Δ Y register 484. The output pulses from the pulse gate 1160 are applied as input pulses to the A flip flops of the registers 978 and 484. Thus the same pulses 71 used to count down the transfer cumulative Δ Y step register 978 to zero are also applied to count down the ΔY register 484. In this manner the binary value stored in the transfer cumulative Δ Y step register 978 is destructively transferred into the Δ Y register 484 where it is combined with the binary value of Y previously transferred from the Y register 88. The combined binary value which remains in the Δ Y register 484 is thereafter applied to the Δ Y and angle transfer logic 488 shown in FIG. 19 to effect the steering of the vehicle accordingly.

As the vehicle completes the second turn of its turnaround movement, it commences to travel a straightline path in the opposite direction. As it crosses the sensor strip 900 headed in the opposite direction the Y register 88 is again updated in the manner previously described.

Upon commencement of the following STEP FOUR a pulse gate 1164 shown in FIG. 33 is closed to pass a clock pulse to RESET the Δ Y-2 flip flop and ready the circuit for the next turnaround of the vehicle.

The arrangement described in connection with FIGS. 28 through 34 updates the Y register 88 directly from coded sensor strips located on the field at the opposite ends adjacent the locations where the vehicle turns around. FIGS. 35 through 38 illustrate a similar scheme for updating the angle register 50 and the quadrant register 60 directly from sensor strips which may be placed adjacent the Y updating sensor strips 900 at the opposite ends of the field.

Figure 35:
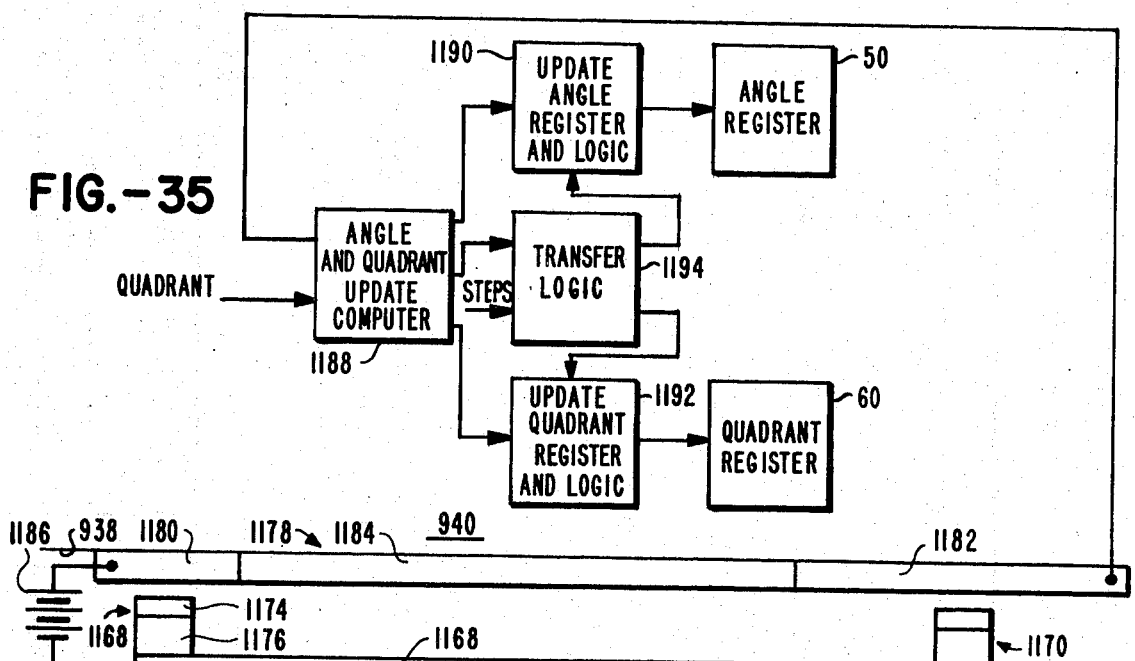
FIG. 35 is a plan view and block diagram of an arrangement for providing the heading angle and quadrant values directly from a field mounted sensor strip.
Figure 36:
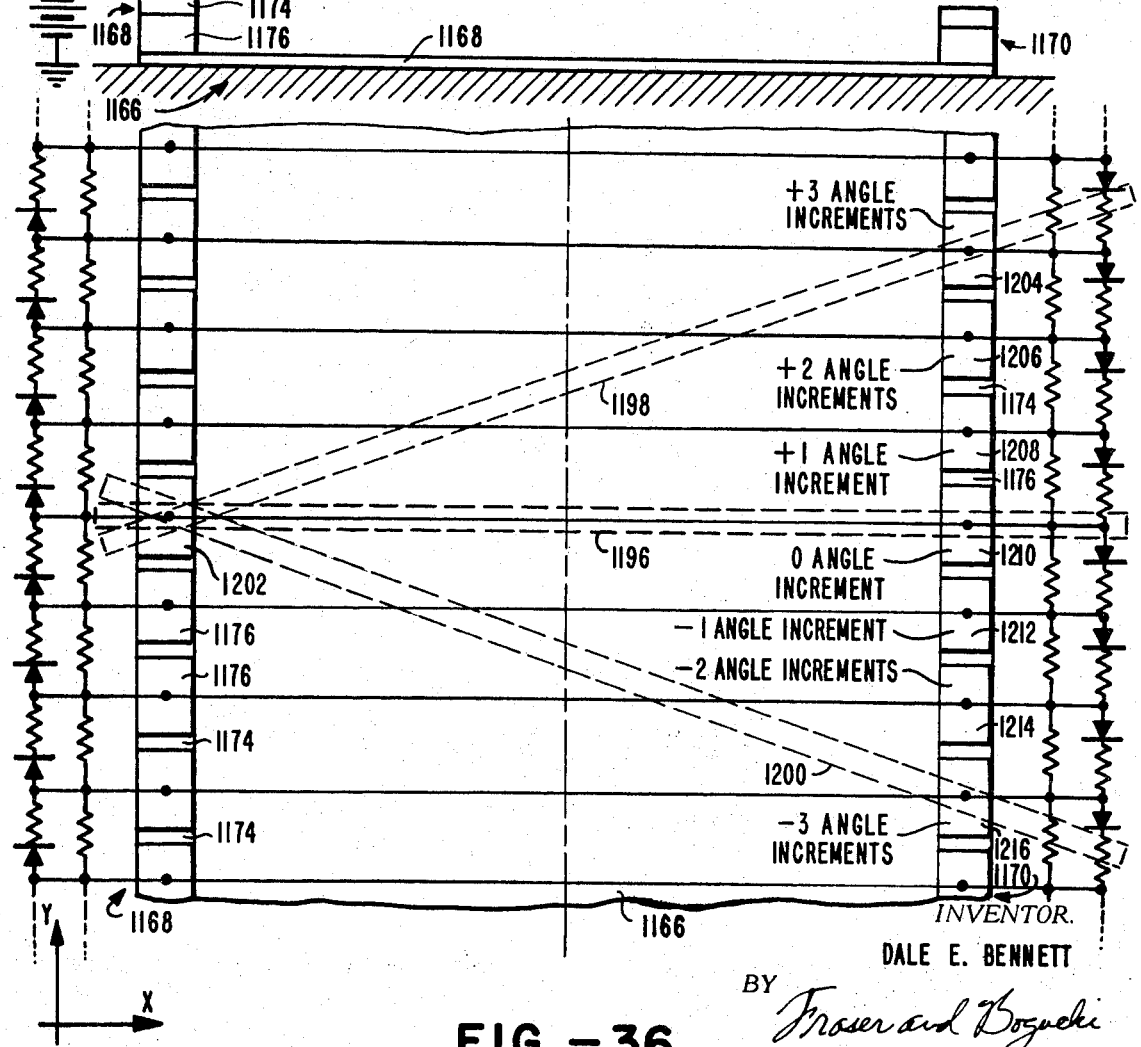
FIG. 36 is a plan view of a field mounted sensor strip used in the arrangement of FIG. 35 and a schematic diagram of the electrical circuitry associated therewith.

As seen in FIGS. 35 and 36 the angle and quadrant are updated using a sensor strip 1166. The strip 1166 includes a pair of rails 1168 and 1170 extending upwardly from the opposite edges of a base so as to parallel the longitudinal axis 1172 of the strip 1166. Each of the rails 1168 and 1170 includes a plurality of insulating elements 1174 of greater height than and disposed between a plurality of electrically conductive elements 1176. Each of the conductive elements 1176 in the rail 1168 is electrically coupled to a different one of the conductive elements 1176 in the rail 1170 as shown in FIG. 36. In addition, the parallel combination of a resistor and a resistor with serially coupled diode is coupled between adjacent ones of the conductive elements 1176 in each rail. The diodes associated with the two different rails 1168 and 1170 are poled to pass current in opposite directions.

As previously mentioned the sensor strips 1166 are preferably located at the opposite ends of the field in positions similar to those assumed by the sensor strips 900 used to update Y. Typical locations of the strips 1166 in the example of FIG. 24 are shown in dashed outline therein.

As seen in FIG. 35 the underside 938 of the vehicle 940 is provided with a sensing bar 1178, the bar 1178 being mounted parallel to the vehicle longitudinal axis. The bar 1178 comprises conductive segments 1180 and 1182 on the opposite sides of an insulating segment 1184. The conductive segment 1180 is coupled to ground through a source of potential 1186 so as to inductively couple and induce a current into a particular one of the electrically conductive elements 1176 of the rail 1168 as the vehicle passes over the strip 1166. The circuit for the current so induced is completed by the conductive segment 1182 which inductively couples a particular adjacent one of the electrically conductive elements 1176 in the rail 1170 to an angle and quadrant update computer 1188. The current provided the angle and quadrant update computer 1188 varies in accordance with the angular position of the bar 1178 relative to the sensor strip 1166, and the computer 1188 responds by determining the quadrant and the approximate angle of the vehicle heading. The computed angle and quadrant values are temporarily stored in an update angle register and logic 1190 and an update quadrant register and logic 1192 respectively, and are thereafter transferred into the angle register 50 and the quadrant register 60 under the control of transfer logic 1194. As described in detail hereafter the angle register 50 and the quadrant register 60 are updated by the arrangement shown in FIG. 35 each time the vehicle crosses one of the sensor strips 1166.

As shown in FIG. 36 the sensing bar 1178 may assume a number of different angular positions relative to the sensor strip 1166 depending upon the orientation of the vehicle as it crosses the strip. If the vehicle heading is parallel to the X axis the bar 1178 assumes a position 1196 shown in dashed outline in FIG. 36. At one extreme the bar 1178 may assume a position 1198 shown in dashed outline, in which case the vehicle heading lies in QUADRANT 1 if it is assumed that the vehicle is traveling to the right as seen in FIG. 36 relative to the sensor strip 1166. At the other extreme the sensing bar 1178 may assume a position 1200 shown in dashed outline, in which event the vehicle heading lies in QUADRANT 4. The bar 1178 may assume other positions in between the extremes 1198 and 1200. If it is assumed that the conductive segment 1180 of the sensing bar 1178 resides over a particular electrically conductive element 1202 within the rail 1168 so as to assume an electrically inductive relationship therewith, then the conductive segment 1182 of the sensing bar may assume an electrically inductive relationship with any one of seven different conductive elements 1204, 1206, 1208, 1210, 1212, 1214 and 1216 within the rail 1170 depending upon the heading of the vehicle. If the conductive segment 1182 resides over the element 1210, the heading angle is assumed to be at or close to zero degrees. If the conductive segment 1182 resides over the conductive element 1208, 1206 1204 the heading angle is assumed to be respectively +1, +2 or +3 angle increments away from zero degrees. Likewise if the conductive segment 1182 resides over the conductive element 1212, 1214 or 1216 then the heading is assumed to be respectively −1, −2 or −3 angle increments away from zero degrees.

The arrangement shown in FIG. 37 operates in conjunction with the sensor strip shown in FIG. 36 to determine the true heading angle in terms of the number of angle increments which the heading is removed from a value of zero degrees. The arrangement of FIG. 37 accordingly approximates the actual heading angle by determining which of the electrically conductive elements in the rail 1170 the sensing bar resides over for a given conductive element within the rail 1168. As will be seen in the description of FIG. 37 hereafter this determination is made based on the magnitude of current which is induced into the resistor and diode combinations associated with the righthand rail 1170.

If it is assumed that the conductive segment 1180 of the sensing bar 1178 resides over the electrically conductive element 1202 of the left-hand rail 1168 as seen in FIG. 36, then the circuitry associated with the sensor strip 1166 may be simplified as shown in the upper lefthand portion of FIG. 37. As the sensor bar 1178 is passed over the sensor strip 1166, the bar 1178 functions as a closed switch 1218 shown in FIG. 37 to pass a current of predetermined magnitude from the source 1186 to the electrically conductive element 1210 shown in FIG. 36. The terminal corresponding to the conductive element 1210 as well as the other terminals corresponding to the electrically conductive elements 1204, 1206, 1208, 1212, 1214 and 1216 are conveniently illustrated in FIG. 37. When the sensing bar 1178 is not being passed over the sensor element 1166, the switch 1218 shown in FIG. 37 is effectively opened.

The conductive segment 1182 of the sensing bar 1178 functions as a selection switch 1220 shown in FIG. 37. Thus if the segment 1182 is positioned over the conductive element 1216 with the bar 1178 assuming the position 1200 shown in FIG. 36, the switch 1220 is effectively coupled to the terminal representing the element 1216. Likewise if the segment 1182 is positioned over the conductive element 1204 with the bar 1178 assuming the position 1198 shown in FIG. 36, the switch 1220 is effectively coupled to the terminal representing the element 1204. The switch 1220 as shown in FIG. 37 is coupled to the terminal representing the conductive element 1210, in which event the bar 1178 is close to or at the position 1196 illustrated in FIG. 36. Because of the presence of the diodes in circuit with the right-hand rail 1170 the resistors serially coupled to the diodes between the various elements 1204, 1206, 1208 and 1210 are effectively eliminated as seen in FIG. 37. The resistors serially coupled with the diodes between the conductive elements 1210, 1212, 1214 and 1216 are present, however, since the diodes are poled to pass current in a direction from the element 1210 toward the elements 1212, 1214 and 1216. The diodes have been eliminated from the circuitry shown in FIG. 37 for simplicity of illustration. The resistors serially coupled with the diodes are of approximately equal value and may be conveniently labeled $R_1$ as shown in FIG. 37. The remaining resistors are also of substantially equal value and are conveniently labeled $R_2$.

If the switch 1220 is coupled to the terminal representing the element 1210, current from the source 1186 flows directly through the switch and encounters only the inductive resistance present at the opposite ends of the sensing bar 1178 and the natural wire resistance within the sensor strip circuitry. If the switch 1220 is coupled to the terminal representing the element 1208, the current is reduced by the resistance $R_2$. Likewise if the switch 1220 is coupled to the terminals representing the elements 1206 and 1204, the current is reduced by resistances equal to $2R_2$ and $3R_2$ respectively. If the switch 1220 is coupled to the terminal representing the element 1212 then the current is reduced by a resistance equal to $(R_1R_2)/(R_1+R_2)$. Similarly if the switch 1220 is coupled to the terminals representing the elements 1214 and 1216 the current is reduced by resistances equal to twice and three times this value respectively. It will therefore be seen that the positioning of the conductive segment 1182 of the sensing bar 1178 over the electrically conductive element 1210 provides the greatest amount of current to the switch 1220 and that the current decreases as the conductive segment 1182 is positioned over other electrically conductive elements at increasing distances from the element 1210.

The switch 1220 is coupled to the inputs of seven different digital switches 1222, 1224, 1226, 1228, 1230, 1232 and 1234 conveniently labeled A through G. The digital switches are arranged to provide an output signal in response to an input current at least equal to a predetermined value with the predetermined values being different for different ones of the switches. The A digital switch 1222 is the least sensitive switch and is activated to the exclusion of all other digital switches when the switch 1220 is coupled to the terminal corresponding to the element 1204. Likewise, the A and B switches 1222 and 1224 are both activated when the switch 1220 is coupled to the terminal corresponding to the element 1206, and the A, B and C switches 1222, 1224 and 1226 are all activated when the switch 1220 is coupled to the terminal corresponding to the element 1208. If the switch 1220 is coupled to the terminal corresponding to the element 1216 the A through D switches are all activated. If the switch 1220 is coupled to the terminal corresponding to the element 1214 and the A through E switches are all activated. If the switch 1220 is coupled to the terminal corresponding to the element 1212 the switches A through F are all activated. Finally, if the switch 1220 is coupled to the terminal corresponding to the element 1210 all seven switches are activated.

A plurality of AND gates 1236, 1238, 1240, 1242, 1244 and 1246 have inputs coupled to a different one of the B through G digital switches as well as to all digital switches preceding the particular digital switch with which the AND gate is associated. Thus, the AND gate 1238 has inputs coupled to the C digital switch 1226 and to the preceding A and B switches. The AND gate 1246 has inputs coupled to the G digital switch 1234 and to the preceding A through F digital switches. If the selection switch 1220 is coupled to the terminal corresponding to the element 1208 the A through C digital switches are all activated and outputs appear at the AND gates 1236 and 1238. If the switch 1220 is coupled to the terminal corresponding to the element 1210 all seven digital switches A through G are activated and all six AND gates have outputs thereat.

Each one of a second plurality of AND gates 1248, 1250, 1252, 1254, 1256 and 1258 has one input enabled when a different one of the digital switches is activated and other inputs coupled through appropriate ones of a plurality of inverters 1260, 1262, 1264, 1266, 1268 and 1270 to be enabled whenever the following digital switches are not activated. Thus if the A, B and C switches are activated while the D through G switches are not, output signals appear at both AND gates 1236 and 1238. The output signal from the AND gate 1238 enables one of the inputs of the AND gate 1252, the remaining inputs of which are also enabled by the inverters 1264, 1266, 1268 and 1270 in the absence of output signals at the AND gates 1240, 1242, 1244 and 1246. An output signal accordingly appears at the AND gate 1252. The output signal from the AND gate 1236 enables the associates input of the AND gate 1250. The input of the AND gate 1250 coupled to the inverter 1262 is not enabled due to the presence of an output signal at the AND gate 1238, and no signal appears at the output of the AND gate 1250. The input of the AND gate 1248 coupled directly to the output of the A digital switch 1222 is enabled. The two inputs coupled through the inverters 1260 and 1262 to the outputs of the AND gates 1236 and 1238 are not enabled, however, and a signal does not appear at the output of the AND gate 1248. The output signal from the AND gate 1252 is passed through an associated one of three different OR gates 1272, 1274 and 1276 to provide a SET ANGLE ONE signal to the update angle register logic 1190 indicating that the actual vehicle heading is one angle increment removed from zero degrees.

A SET ANGLE ONE signal will again appear at the output of the OR gate 1276 if the switch 1220 is coupled to the terminal corresponding to the element 1212. In that event switches A through F are activated while switch G is not. A signal appears at the output of the AND gate 1258, but signals at the outputs of the AND gates 1248, 1250, 1252, 1254 and 1256 are prevented by the inverters 1260, 1262, 1264, 1266 and 1268. The signals at the outputs of the OR gates 1272, 1274 and 1276 accordingly indicate only the approximate size of the heading angle and do not take into account the sign of the heading angle deviation so as to determine the quadrant. The quadrant is determined by fur different AND gates 1278, 1280, 1282 and 1284 together with four different OR gates 1286, 1288, 1290 and 1292. The inputs of the OR gate 1286 are coupled to the outputs of the AND gates 1248, 1250 and 1252 associated with the positive heading angle digital switches 1222, 1224 and 1226. Thus, if an output signal appears from the AND gate 1252 indicating that the heading angle is + 1 angle increment removed from zero degrees, the signal is passed via the OR gate 1286 to enable one input of each of the AND gates 1278 and 1280. If the vehicle is traveling to the right as viewed in FIG. 24 so that the heading must lie in QUADRANT 1 or 4, then the OR gate 1290 responds to the quadrant register 60 by enabling one input of the AND gate 1282 and the other input of the AND gate 1278. The AND gate 1278 accordingly provides a SET QUADRANT 1 signal to the update quadrant register and logic 1192. The accuracy of this decision is verified by the fact that if the vehicle is traveling to the right, the heading must lie in QUADRANT 1 for a positive angle deviation. In the event the angle deviation is negative and is removed by one increment so as to provide an output signal at the AND gate 1258, such signal is passed via the OR gate 1288 to enable one input of each of the AND gates 1282 and 1284. With the vehicle traveling to the right the second input of the AND gate 1282 is enabled by the OR gate 1290 and a SET QUADRANT 4 signal is provided to the update quadrant register and logic 1192. The inputs of the OR gate 1288 are coupled to the AND gates 1254, 1256 and 1258 associated with the negative angle deviation switches 1228, 1230 and 1232. In the event the selection switch 1220 is coupled to the terminal corresponding to the element 1210, the resulting output signal from the AND gate 1246 provides a SET ANGLE ZERO signal to the update angle register and logic 1190 and the quadrant value as stored in the quadrant register 60 remains unchanged.

Whenever the vehicle crosses the sensor strip 1166 the voltage of the sensing bar 1178 is "on" so as to enable one input of each of a plurality of AND gates 1294, 1296, 1298, 1300, 1302, 1304, 1306 and 1308 shown in FIG. 38 and to close a pulse gate 1310 and SET an update flip flop 1312. The second inputs of the AND gates 1294, 1296, 1298 and 1300 are coupled to the output of the AND gate 1246 and the outputs of the OR gates 1276, 1274 and 1272 respectively. The second inputs of the AND gates 1302, 1304, 1306 and 1308 are respectively coupled to the outputs of the AND gates 1278, 1284, 1280 and 1282. The AND gates 1294, 1296, 1298 and 1300 are coupled through associated pulse gates to SET or RESET an A or B flip flop of an update angle register 1314 within the update angle register and logic 1190. Thus, as the vehicle crosses the sensor strip 116 the heading angle as determined by the arrangement of FIG. 37 is entered in the update angle register 1314. The AND gates 1302, 1304, 1306 and 1308 are coupled through associated pulse gates to SET or RESET the A and B flip flops of an update quadrant register 1316 as the vehicle passes over the sensor strip 1166.

The SET update flip flop 1312 enables one input of an AND gate 1318. When the vehicle has cleared the sensor strip 1166 the sensing bar voltage is turned off enabling another one of the inputs of the AND gate 1318. The third and fourth inputs of the AND gate 1318 are enabled so long as a signal does not exist at the output of the preliminary step flip flop of the processing and computation step generator 40 and an eight step sequence is not in progress. The resulting output signal from the AND gate 1318 enables one input of each of a plurality of AND gates having other inputs coupled to the outputs of the A and B flip flops of the update angle register 1314 and the update quadrant register 1316. The output signal also closes a pulse gate 1320 to SET a transfer flip flop 1322 and enable one of the inputs of an AND gate 1324. A second input of the AND gate 1324 is enabled with the bar voltage "off" and a third input is enabled during the preliminary step of the next eight step processing and computing sequence. The resulting output signal closes a pulse gate 1326 to RESET the update flip flop 1312 in preparation for updating the angle and quadrant registers 50 and 60 the next time the vehicle crosses one of the sensor strips 1166. The AND gates associated with the outputs of the A and B flip flops of the update angle register 1314 are coupled through associated pulse gates to the RESET and SET inputs of the A and B flip flops of the angle register 50 to transfer the approximated angle value thereto. Similarly, the AND gates associated with the outputs of the A and B flip flops of the update quadrant register 1316 are coupled through associated pulse gates to the RESET and SET inputs of the A and B flip flops comprising the quadrant register 60 to SET the appropriate quadrant value into the quadrant register. Upon the occurrence of any one of the eight steps of a processing and computing sequence one of the inputs of an AND gate 1328 is enabled. A second input is enabled with the bar voltage "off," and a third input is enabled with the update flip flop 1312 RESET. The resulting output signal from the AND gate 1328 resets the transfer flip flop 1322, the update angle register 1314 and the update quadrant register 1316.

The accuracy of the vehicle heading angle and position values computed by the angle, quadrant and X, Y coordinate computer 10 is largely dependent upon the surface smoothness of the terrain over which the vehicle travels. Where the surface is relatively smooth, the pulses generated in response to rotation of the vehicle wheels provide accurate representations of the behavior of the vehicle. However, in cases where the surface is rough or irregular, the wheel generated pulses reflect the surface irregularities such that the total number of pulses generated by each wheel for a given distance of travel includes a certain number of pulses reflecting surface roughness rather than actual travel of the wheel over a generally planar surface. Accordingly, where the surface over which the vehicle is traveling is sufficiently rough so as to impair the accuracy of the heading and location computer system, it may be necessary or desirable to employ a terrain roughness correction system for measuring the surface roughness and providing appropriate compensation therefor.

Figure 39:
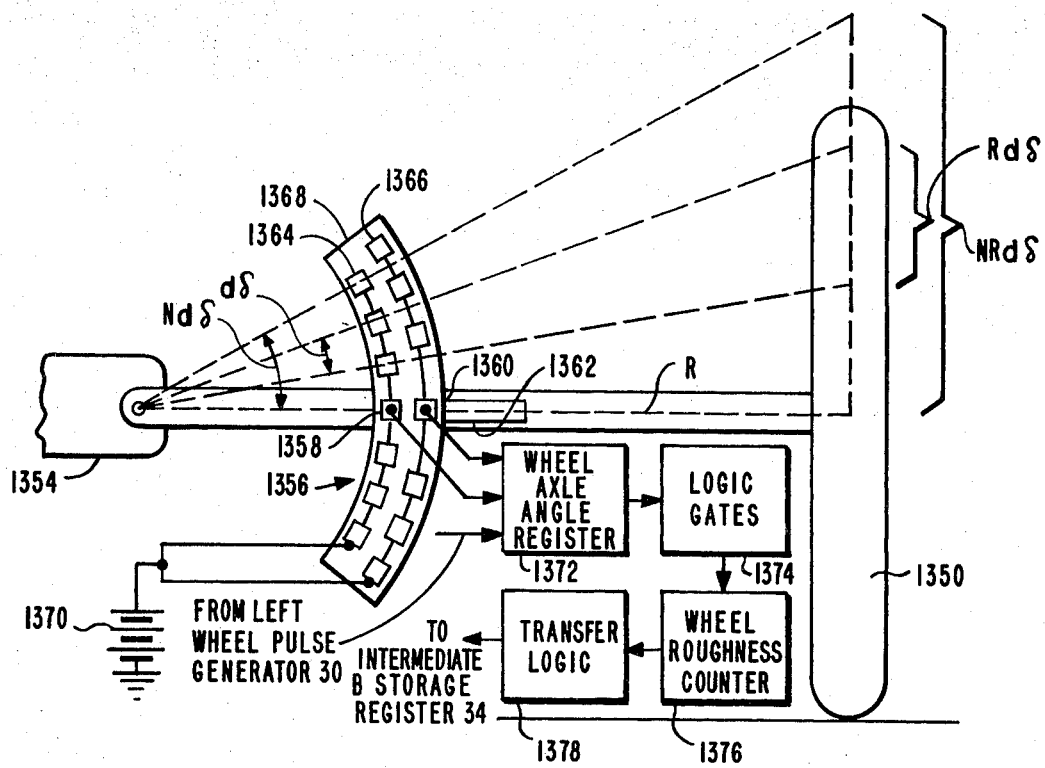
FIG. 39 is a combined plan view and block diagram with diagrammatic illustrations of one preferred arrangement of a terrain roughness correction system according to the invention.

One preferred arrangement of a terrain roughness correction system in accordance with the invention is illustrated in FIG. 39. The particular correction system shown in FIG. 39 and discussed hereafter relates to a single pulse generating wheel of the vehicle, and it should be understood that two such systems are normally employed separately and independently with each of the two pulse generating wheels of the vehicle. As seen in FIG. 39, a pulse generating wheel 1350 is supported by an axle 1352 which is greatly exaggerated in size for clarity of illustration and which is pivotably mounted to a frame member 1354 for the vehicle. The pivotal mounting of the axle 1352 to the frame member 1354 is such as to permit vertical or up-down motion of the wheel 1350 relative to the vehicle frame in response to rough or irregular terrain.

The terrain roughness correction system includes an armature assembly 1356, having a pair of brushes 1358 and 1360 fixedly mounted relative to the axle 1352 by a brush support member 1362 mounted on and extending outwardly from the axle 1352, and two different sets of contacts 1364 and 1366 mounted on a contact support member 1368 so as to define arcs of two different concentric circles having centers at the pivot point of the axle 1352. The contact support member 1368 is mounted on the vehicle frame by an appropriate member or arrangement (not shown), and the sets of contacts 1364 and 1366 are coupled to ground through a source of potential 1370. The contacts in each set 1364 and 1366 are serially coupled as shown in FIG. 39. As the wheel 1350 and associated axle 1352 undergo vertical motion relative to the pivot point of the axle, the brushes 1358 and 1360 respectively make and break contact with different contacts in the sets 1364 and 1366. Each of the brushes 1358 and 1360 thereby provides a signal to a wheel axle angle register 1372 each time it comes into contact with one of the contacts in the associated set. As described in detail hereafter, the signals derived at the brushes 1358 and 1360 are utilized to SET and RESET a flip flop within the wheel axle angle register 1372 so as to generate a series of pulses representing the extent of vertical movement of the wheel 1350 during a given time interval.

Figure 41:
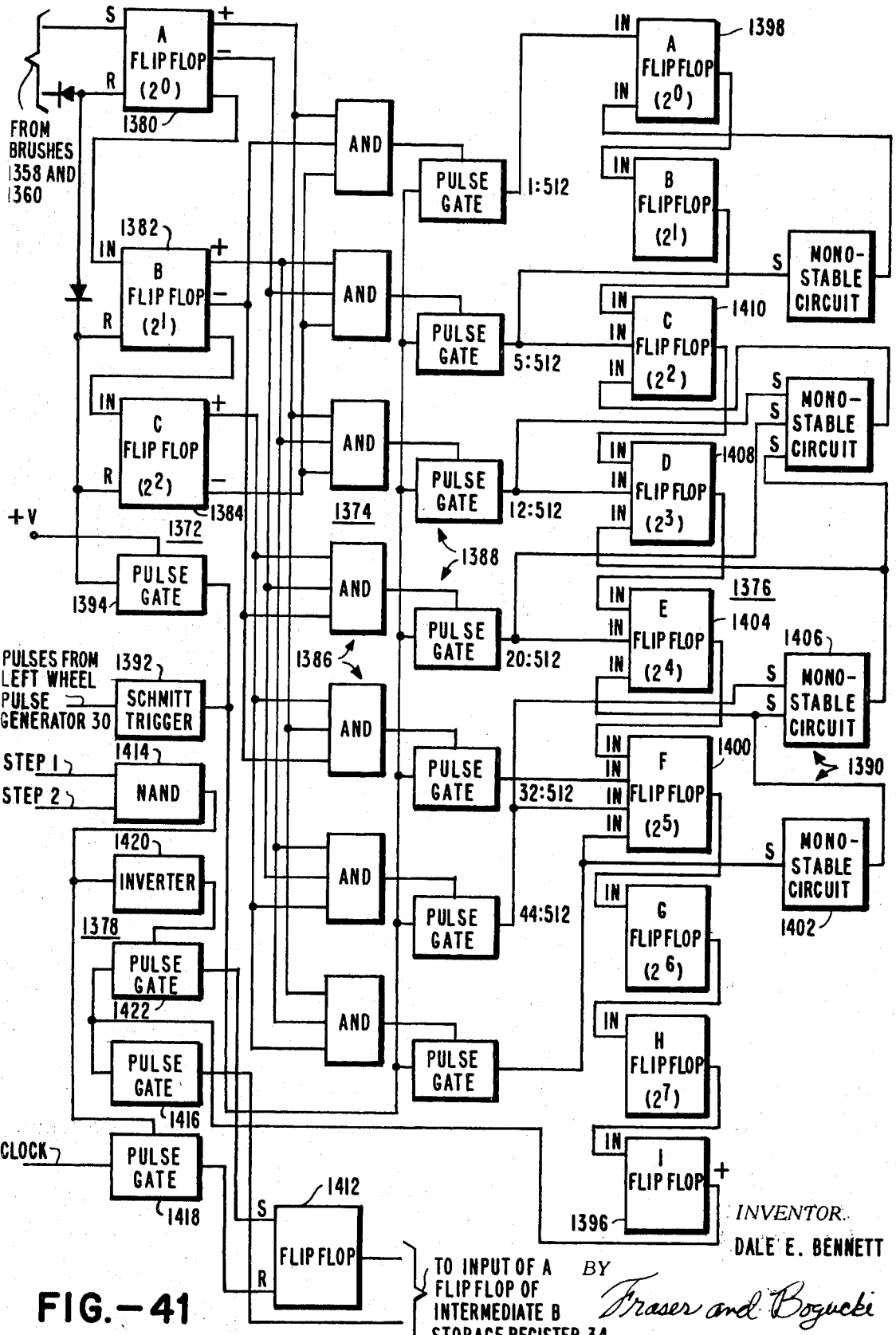
FIG. 41 is a detailed block diagram of the block diagram portion of the arrangement of FIG. 39.

As discussed in detail hereafter in connection with FIG. 41, the wheel axle angle register 1372 comprises a 3-bit storage register which counts the pulses derived from the brushes 1358 and 1360 and which provides output signals used in setting a plurality of logic gates 1374. The logic gates 1374 and a wheel roughness counter 1376 in the form of a 9-bit counter respond to the pulses generated by the left wheel pulse generator 30 during a given interval to pass a selected portion of such pulses to transfer logic 1378 as determined by the number of pulses derived from the brushes 1358 and 1360. The pulses from the wheel roughness counter 1376 are applied to the intermediate B storage register 34 shown in FIG. 3 to count down the wheel pulses stored in the intermediate B storage register 34 and thereby compensate for the terrain roughness. The transfer logic 1378 transfers the pulses from the wheel roughness counter 1376 to the intermediate B storage register 34 except during the occurrence of STEPS 1 and 2 when the pulses are temporarily stored to be thereafter transferred to the register 34. The particular arrangement shown in FIG. 39 is described for use in connection with the left vehicle wheel and an identical arrangement (not shown) is employed with the right vehicle wheel to independently change the number of pulses generated by the right wheel to compensate for terrain roughness.

As previously mentioned, rough terrain causes the wheels 1350 and axle 1352 to move up and down in a vertical plane pivoting about the hinged joint defining the pivot point as the vehicle traverses the terrain. The terrain roughness correction system measures angular movement about the pivot point as the vehicle moves over the terrain. The correction system then computes the error between the distance traveled over the rought terrain and the distance of travel if the terrain had been smooth. This error as represented by pulses at the output of the wheel roughness counter 1376 is then subtracted from the measured wheel motion in the form of pulses stored in the intermediate B storage register 34 to arrive at the correct wheel motion for the subsequent computation of angle and location.

Figure 40:
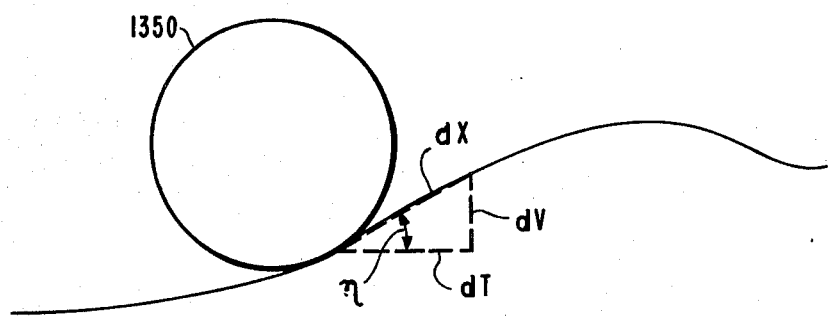
FIG. 40 is a diagrammatic illustration useful in explaining the theory of operation of the arrangement of FIG. 39.

FIG. 40 illustrates the wheel 1350 relative to terrain having surface irregularity which is shown in somewhat exaggerated form for clarity of subsequent discussion. The distance $dX$ forming the hypotenuse of a right triangle represents an increment of distance actually traveled by the wheel 1350 over the terrain with corresponding pulses from the left wheel pulse generator 30 shown in FIG. 3 having been applied to the intermediate B or A storage registers 34 or 32. The distance $dT$ represents the increment of distance which the wheel 1350 would have traveled over a smooth surface, and the distance $dV$ represents the increment of distance in a vertical direction resulting from the increment $dX$ lying at an angle $\eta$ relative to the horizontal. It will thus be seen that $dX$ is that increment of distance which is measured by the vehicle computer system independent of the terrain roughness correction system. $dT$ is the corrected increment of distance corresponding to smooth terrain. The angle $\eta$ is the angle between $dX$ and $dT$.

Referring again to FIG. 39, $d\delta$ represents the angular separation relative to the axle pivot point between any two adjacent contacts in the contact sets 1364 and 1368. $N$ represents the number of pulses generated by the brushes 1358 and 1360 contacting the different contacts during the time interval that the incremental distance $dX$ is traversed. $R$ represents the distance between the wheel 1350 and the pivot point of the axle 1352. If can be seen that the vertical incremental distance $dV$ may be represented by the expression:

$$dV = R \tan(Nd\delta)$$

But for small angles:

$$\tan Nd\delta \approx Nd\delta$$

Then:

$$dV = RNd\delta$$

The smallest measurable vertical distance $Rd$ is designed to be a fixed increment of or a fixed proportion of $dX$, the smallest measurable distance of ground travel. Accordingly, the equation can be written:

$$KdX = Rd\delta$$

in which $K$ is a constant that is selected as a part of the system design. The vertical distance traveled during any increment of travel $dX$ is therefore expressed by:

$$dV = NKdX = NRd\delta$$

Referring again to FIG. 40, the expression can be written:

$$\sin\eta = dV/dX$$

But:

$$dV = NKdX$$

Therefore:

$$\sin\eta = (NKdX)/(dX) = NK$$

For relatively small values of the angle $\eta$, $\sin\eta \approx \eta$. Then:

$$\eta = NK$$

This equation states that the vertical angle between travel over the rough terrain and the horizontal is equal to the number of pulses generated times a constant. Moreover:

$$dT = dX \cos\eta$$

The difference between $dX$ and $dT$ is the error which must be subtracted from $dX$ to correct for terrain roughness. In equation form where $E$ is the error:

$$E = dX - dT$$

$$E = dX - dX \cos\eta$$

$$E = dX(1 - \cos\eta)$$

But as previously shown:

$$\eta = NK$$

Then:

$$E = dX(1 - \cos NK)$$

This final equation is the one which the terrain roughness correction system is mechanized to solve.

The particular arrangement of FIG. 41 functions so as to determine the value of approximately 512 ($1 - \cos\eta$). FIG. 42 is a table depicting various different value for different selected values of the angle $\eta$. The column labeled "approximately 512 ($1 - \cos\eta$)" shows the number of output pulses for each 512 input pulses in order to approximately solve the expression 512 ($1 - \cos\eta$). This function is mechanized by injecting pulses into the 9-bit wheel roughness counter 1376 in the proper way so that after 512 $dX$ input pulses are received, the proper number of output error pulses are generated. An input pulse which can only be generated after each $dX$ interval of travel is injected into a particular stage of the wheel roughness counter 1376, depending only on the angle $\eta$ as stored in the wheel axle angle register 1372.

As seen in FIG. 41, the wheel axle angle register 1372 comprises a 3-bit counter including A, B and C flip flops 1380, 1382 and 1384. The SET input of the A flip flop 1380 is coupled to the brush 1360, and the RESET input of the A flip flop 1380 is coupled to the brush 1358. The pulse outputs of the A and B flip flops 1380 and 1382 are coupled to the inputs of the immediately following flip flops. Each time the brush 1360 contacts one of the contacts in the set 1366, the A flip flop 1380 is SET. On the other hand, each time the brush 1358 contacts one of the contacts in the set 1364, the A flip flop 1380 is RESET, generating a pulse which is transferred to the B flip flop 1382. In this way, the wheel axle angle register 1372 measures the angle $\eta$ during a given time interval. The time interval is terminated by the arrival of a left wheel pulse from the left wheel pulse generator 30. This pulse resets the count in the axle angle register 1372.

The positive and negative outputs of the flip flops 1380, 1382 and 1384 are coupled to condition the inputs of a plurality of AND gates 1386 within the logic gates 1374. The outputs of the various AND gates 1386 are coupled to control different ones of a plurality of pulse gates 1388 also included within the logic gates 1374. The various pulse gates 1388 are coupled to the inputs of different ones of nine different flip flops comprising the wheel roughness counter 1376. The outputs of some of the pulse gates 1388 are also coupled to different ones of a plurality of monostable circuits or multivibrators 1390 within the wheel roughness counter 1376.

The pulses generated by the left wheel pulse generator 30 as well as being applied to the intermediate A and B storage registers 32 and 34 of FIG. 3 are also applied via a Schmitt trigger 1392 to the inputs of the various pulse gates 1388 within the logic gates 1374 and to the RESET inputs of the flip flops 1380, 1382 and 1384 in the wheel axle angle register 1372 via a pulse gate 1394. The logic gates 1374 and the wheel roughness counter 1376 respond to the angle $\eta$ as determined by the wheel axle angle register 1372 to pass a selected portion of the pulses from the left wheel pulse generator 30 to the output of the I flip flop 1396 of the wheel roughness counter 1376 as the terrain roughness correction pulses in accordance with the value of the angle $\eta$.

Thus, if the angle $\eta$ is determined to be 4°, a pulse is generated at the end of each small $dX$ interval and injected into the A flip flop 1398 of the wheel roughness counter 1376. The wheel roughness counter 1376 responds by generating an output pulse at the output of the I flip flop 1396 for each 512 input pulses from the left wheel pulse generator 30.

Taking another and somewhat more complex example, assume that the angle $\eta$ is 28°. As shown by the table of FIG. 42, an angle of this magnitude dictates that 60 pulses be generated for 512 $dX$ input pulses. In arriving at this particular output condition, an input pulse is generated at the completion of a $dX$ interval. This $dX$ input pulse is injected into the F stage or flip flop 1400 of the wheel roughness counter 1376, which produces 32 output error pulses for each 512 $dX$ input pulses. The input $dX$ pulse is also used for setting a monostable circuit 1402 which generates a second pulse a short time later. The second pulse is injected into the E stage or flip flop 1404 which produces 16 output error pulses for each 512 input pulses. This second pulse is also applied to a monostable circuit 1406 to generate a third pulse a short time later. The third pulse is injected into the D stage or flip flop 1408 which produces 8 output error pulses for each 512 input pulses. In like manner, a fourth pulse is generated and injected into the C stage or flip flop 1410 which produces 4 output error pulses for each 512 input pulses. Adding the various pulses together:

$$32 + 16 + 8 + 4 = 60$$

is the correct result for the angle $\eta = 28°$.

The transfer logic 1378 responds to the output error pulses at the output of the I flip flop 1396 to pass such pulses directly to the A flip flop of the intermediate B storage register 34 except during STEPS 1 and 2 when the output error pulses are temporarily stored in a flip flop 1412 for subsequent transfer to the register 34. At all times other than STEPS 1 or 2, the output signal from a NAND gate 1414 closes a pulse gate 1416 to pass the output error pulses from the I flip flop 1396 directly to the intermediate B storage register 34 and closes a pulse gate 1418 so as to RESET the flip flop 1412. During STEP 1 or 2 an inverter 1420 responds to the output of the NAND gate 1414 to close a pulse gate 1422 and thereby enable the flip flop 1412 to act as a buffer by temporarily storing output error pulses from the I flip flop 1396.

The intermediate B storage register 34 shown in detail in FIG. 10 is biased to count down in response to the output error pulses from the terrain roughness correction system at all times except during STEPS 1 and 2 when such pulses are temporarily stored and not applied. The output error pulses are always subtracted since the distance of travel over rough terrain is always greater than the distance over smooth terrain.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A heading and location computer system for use with a vehicle having a pair of rotatable means which undergo rotation in response to movement of the vehicle over a surface comprising:

means associated with one of the pair of rotatable means for generating an electrical signal indication each time the one of the pair of rotatable means undergoes a predetermined increment of rotation;

means associated with the other one of the pair of rotatable means for generating an electrical signal indication each time the other one of the pair of rotatable means undergoes a predetermined increment of rotation;

means for storing a representation of the heading of the vehicle;

means associated with the means for storing a representation of the heading and responsive to the generated electrical signal indications for periodically applying the signal indications to the means for storing a representation of the heading to change the stored representation;

means for storing a representation of the location of the vehicle; and means associated with the means for storing a representation of the location and responsive to each change in the stored direction representation for changing the stored location representation in accordance with the value of the stored direction representation.

2. A heading and location computer system according to claim 1, wherein the means for periodically applying the signal indications includes means for applying the signal indications to the means for storing a representation of the heading to change the stored direction representation each time the vehicle travels a predetermined fixed distance over the surface, the stored direction representation represents the angle between the heading of the vehicle and one of a pair of mutually perpendicular references axes, and the means for changing the stored location representation includes means for computing the sine and cosine of the angle between the heading of the vehicle and the one of the pair of reference axes.

3. A heading and location computer system according to claim 1, further including means for steering the vehicle over a predetermined course on the surface comprising means for providing a representation of a desired change in the location of the vehicle, means responsive to each change of the stored location representation for reducing the desired change representation by an amount equal to each change in the stored location representation, and means responsive to the desired change representation as reduced by changes in the stored location representation for steering the vehicle in accordance with the value thereof.

4. A heading and location system according to claim 3, wherein the means for steering the vehicle in accordance with the value of the desired change representation is responsive to the vehicle heading representation to steer the vehicle in accordance with the value of the desired change representation is responsive to the vehicle heading representation to steer the vehicle in accordance with the value of the vehicle heading representation as well as the desired change representation.

5. A heading and location computer system according to claim 1, wherein the means for storing a representation of the heading of the vehicle comprises a first register coupled to the means for periodically applying the signal indications for storing a digital number representing the angle between the heading of the vehicle and a first reference axis along the surface, and the means for storing a representation of the location of the vehicle comprises second and third registers coupled to the means for changing the stored location representation, the second register storing a digital number representing the distance between the vehicle and the first reference axis and the third register storing a digital number representing the distance between the vehicle and a second reference axis along the surface and perpendicular to the first reference axis.

6. A heading and location computer system according to claim 5, further including means responsive to the second and third registers for providing a visual indication of the location of the vehicle relative to the first and second reference axes.

7. A computer system for use with a vehicle having first and second rotatable means which undergo rotation in response to movement of the vehicle over a surface comprising:
   first pulse generating means for generating a pulse each time the first rotatable means undergoes a predetermined increment of movement;
   second pulse generating means for generating a pulse each time the second rotatable means undergoes a predetermined increment of movement;
   first and second pulse storing means respectively associated with the first and second pulse generating means for temporarily storing the pulses generated by the first and second pulse generating means, respectively;
   counting means for storing a pulse count representing the angle between the direction of travel of the vehicle and a reference axis along the surface; and
   means coupled between the counting means and the first and second pulse storing means and responsive to the pulses stored by the first and second pulse storing means for changing the pulse count stored in the counting means by an amount equal to the difference between the numbers of pulses temporarily stored in the first and second pulse storing means whenever the total number of pulses temporarily stored in the first and second pulse storing means equals a predetermined number.

8. A computer system according to claim 7, further including means coupled between at least one of the first and second pulse generating means and the associated pulse storing means and responsive to the pulses generated by the pulse generating means coupled thereto for independently providing to the pulse storing means coupled thereto a selected portion of the generated pulses to provide wheel diameter error compensation.

9. A computer system according to claim 7, further including means coupled between at least one of the first and second pulse generating means and the associated pulse storing means and responsive to the pulses generated by the pulse generating means coupled thereto for independently providing to the pulse storing means coupled thereto a selected portion of the generated pulses for subtraction from the pulses stored in the pulse storing means to provide compensation for roughness of the surface.

10. A computer system according to claim 9, wherein the means for providing compensation for roughness of the surface includes means responsive to vertical motion of that one of the first and second rotatable means to which the at least one of the first and second pulse generating means is coupled for generating signals representing the extent of vertical motion for a given increment of movement of the vehicle over the surface, means responsive to the signals representing the extent of vertical motion for providing a representation of the angle between the surface at the given increment of movement and the overall general plane of the surface, and means responsive to the pulses generated by the pulse generating means coupled thereto for determining the selected portion of the generated pulses for subtraction from the pulses stored in the pulse storing means in accordance with the representation of the angle between the surface and the overall general plane.

11. A computer system according to claim 10, wherein that one of the first and second rotatable means to which the least one of the first and second pulse generating means is coupled comprises a wheel and included axle pivotably mounted on the vehicle such that the wheel and included axle are capable of undergoing vertical motion relative to the vehicle, and wherein the means for generating signals representing the extent of vertical motion comprises an armature assembly having at least one brush and a plurality of related contacts, the brush making and breaking contact with different ones of the contacts as the axle pivots to generate the signals representing the extent of vertical motion.

12. A computer system according to claim 7, wherein the first and second pulse storing means comprise first and second binary register means normally biased to count up in response to pulses generated by the first and second pulse generating means, respectively, the counting means comprises third binary register means, and the means for changing the pulse count includes third pulse generating means, means responsive to the first and second pulse generating means for providing a signal whenever the total number of generated pulses equals a predetermined number, means responsive to the signal for coupling the third pulse generating means to the first and second binary register means to count down the first and second binary register means, and means for coupling the third pulse generating means to the third binary register means to change the pulse count in the third binary register means in response to pulses generated thereby whenever the third pulse generating means is applied to count down the first and second binary register means.

13. A computer system according to claim 12, wherein the means responsive to the signal for coupling the third pulse generating means to the first and second binary register means to count down the first and second binary register means includes means for counting down first one and then the other of the first and second binary register means, and the means for coupling the third pulse generating means to the third binary register means to change the pulse count in the third binary register means includes means for causing the third binary register means to count in one direction as the first binary register means is being counted down and in the opposite direction as the second binary register means is being counted down.

14. A computer system according to claim 7, further including means responsive to the pulse count stored by the counting means for providing a visual display of the direction of travel of the vehicle in accordance with the value of the pulse count stored by the counting means.

15. A computer system according to claim 14, wherein the means for providing a visual display includes means for generating an analog signal having a value representative of the value of the pulse count stored by the counting means, and means having a rotatable pointing device and responsive to the analog signal to rotate the pointing device through an angle according to the value of the analog signal.

16. A system for computing and storing representations of the location and heading of a vehicle relative to mutually perpendicular X and Y reference axes, the vehicle having first and second rotatable means which undergo rotation in response to movement of the vehicle over a surface, comprising:

means for storing a representation of the angle between the vehicle heading and the X axis;

means associated with the means for storing a representation of the angle between the vehicle heading and the X axis and responsive to the movement of the vehicle over the surface by a given amount for changing the stored representation of the angle between the vehicle heading and the X axis by an amount dependent upon the difference between incremental rotations of the first and second rotatable means during movement of the vehicle by the given amount;

means for storing a representation of the location of the vehicle relative to the X and Y axes; and means associated with the means for storing a representation of the location of the vehicle relative to the X and Y axes and responsive to each change in the stored representation of the angle between the vehicle heading and the X axis for changing the stored representation of the location of the vehicle relative to the X and the Y axes by an amount dependent on the value of the stored representation of the angle between the vehicle heading and the X axis.

17. A system according to claim 16, wherein the first and second rotatable means comprise wheels having axes of rotation which are fixed relative to the longitudinal axis of the vehicle.

18. A system according to claim 16, wherein the first and second rotatable means comprise wheels having endless tracks disposed thereabout, said wheels having axes of rotation which are fixed relative to the longitudinal axis of the vehicle.

19. A system according to claim 16, wherein the means for storing a representation of the angle between the vehicle heading and the X axis includes an angle register for storing a digital number representing the angle, the angle register being coupled to the means for changing the stored representation of the angle between the vehicle heading and the X axis, the means for storing a representation of the location of the vehicle includes X and Y registers for storing digital numbers representing the distance between vehicle location and the X and Y axes respectively, the X and Y registers being coupled to the means for changing the stored representation of the location of the vehicle relative to the X and Y axes, and the means for changing the stored representation of the location of the vehicle relative to the X and Y axes includes means responsive to each change in the digital number stored in the angle register for changing the digital number stored in the Y register by an amount which bears a first proportional relationship to the digital number stored in the angle register and means responsive to each change in the digital number stored in the angle register for changing the digital number stored in the X register by an amount which bears a second proportional relationship to the digital number stored in the angle register.

20. A system according to claim 19, further including means for entering in the Y register a digital number representing the actual distance between the vehicle and the X axis whenever the vehicle crosses an elongated sensor strip disposed on the surface with its axis of elongation generally parallel to the Y axis, the sensor strip having a plurality of coded surfaces parallel to the axis of elongation, each of the coded surfaces varying in digital fashion with the distance from the X axis and each coded surface corresponding to a different digit of the digital number in the Y register so as to present different binary numbers at different distances from the X axis.

21. A system according to claim 19, further including means for entering in the angle register a digital number representing the actual angle between the heading of the vehicle and the X axis whenever the vehicle crosses an elongated sensor strip disposed on the surface with its axis of elongation generally parallel to the Y axis, the sensor strip presenting electrical current paths of different resistance between different points along one longitudinal side of the strip and each of a plurality of different points along the opposite longitudinal side of the strip, and the means for entering includes an elongated element mounted on the vehicle for inducing a signal at a point along the one longitudinal side over which the elongated element lies as the vehicle crosses over the sensor strip and for sensing the resulting signal at a point along the other longitudinal side over which the elongated element lies.

22. A system according to claim 19, wherein the means for changing the digital number stored in the Y register and the digital number stored in the X register include means for changing the number stored in the Y register by the sine of the angle represented by the digital number in the angle register and means for changing the number stored in the X register by the cosine of the angle represented by the digital number in the angle register.

23. A system according to claim 19, wherein the angle register comprises a plurality of stages, all of which assume binary "zero" to represent 0° and binary "one" to represent 90°, and the X and Y axes define four different quadrants of a coordinate system, and further including a quadrant register coupled to the angle register for storing a digital number representing the quadrant in which the vehicle heading is located.

24. A system according to claim 19, further including means for driving the vehicle over a predetermined course without the need for an operator, the means for driving including a Δ Y register having a pair of inputs and operative to provide at an output thereof a position error signal in the form of a digital number representing the combination of digital numbers applied to the pair of inputs, means for providing at one of the pair of inputs of the Δ Y register a digital number representing the distance in the direction of the Y axis between actual vehicle location and a desired vehicle location, means responsive to the means for changing the digital number stored in the Y register for applying each change in the Y register digital number to the other one of the pair of inputs of the Δ Y register as a position feedback signal, and means responsive to the position error signal at the output of the Δ Y register for steering the vehicle in a direction to tend to reduce the position error signal to zero.

25. A system according to claim 24, further including means for providing to the means for steering the vehicle a succession of error signals of alternating sense and relatively small size to cause oscillation of the means for driving about a null balance condition whenever the position error signal is substantially zero.

26. A system according to claim 24, further including means for providing at an output thereof a combined error signal in the form of a digital number representing the combination of digital numbers applied to a pair of inputs thereof, the output of the Δ Y register being coupled to one of the pair of inputs to provide the position error signal thereto and the angle register being coupled to the other one of the pair of inputs to provide an angle error signal thereto, and the means for steering the vehicle is responsive to the combined error signal to steer the vehicle in a direction to tend to reduce the combined error signal to zero.

27. A system according to claim 24, further including separate means for providing a turn around of the vehicle at opposite selected positions relative to the X axis, each of the means for providing a turn around including means for generating a sequence of turn around commands whenever the vehicle reaches a selected position relative to the X axis, means responsive to the sequence of turn around commands for steering the vehicle through a first turn, means responsive to the sequence of turn around commands for steering the vehicle through a second turn in a direction opposite to that of the first turn upon completion of the first turn, means responsive to the sequence of turn around commands for disabling the means for steering the vehicle in a direction to tend to reduce the position error signal to zero when the vehicle is being steered through the first and second turns, and wherein the means for providing a digital number representing the distance in the direction of the Y axis between actual vehicle location and a desired vehicle location comprises means responsive to the completion of the first turn for providing at the one of the pair of inputs of the Δ Y register a digital number representing the desired change in the location of the vehicle in a direction parallel to the Y axis after the vehicle is steered through the first and second turns.

28. A system for computing and storing representations of the location and heading of a vehicle relative to a coordinate system defined by two intersecting axes, the vehicle including left and right rotatable means in contact with a surface over which the vehicle travels and having axes of rotation which are affixed relative to the vehicle longitudinal axis, comprising the combination of:

left and right pulse generators respectively associated with the left and right rotatable means, each of the generators producing a pulse each time the rotatable means associated therewith undergoes a fixed increment of motion;

left and right binary register means respectively associated with the left and right pulse generators, each of the register means being operative to count pulses generated by the pulse generator associated therewith;

binary angle register means for storing a pulse count representative of the angle between the vehicle heading and one of the axes of the coordinate system;

binary quadrant register means for storing a binary value representative of the particular quadrant of the coordinate system in which the vehicle heading lies;

means coupled between the left and right binary register means and the binary angle register means and binary quadrant register means for changing the pulse count in the angle register means by an amount equal to the pulse count in the left register means in one sense and by an amount equal to the pulse count in the right register means in the opposite sense from the one sense whenever the total of the pulse counts in the left and right register means reaches a predetermined value, the one sense and opposite sense being determined by the binary value in the quadrant register means, and the binary value in the quadrant register means being changed to represent a new quadrant whenever the pulse count in the angle register means reaches a maximum or minimum value;

first binary coordinate register means for storing a pulse count representative of the vehicle location relative to one of the axes of the coordinate system;

means coupled between the binary angle register means and the first binary coordinate register means for changing the pulse count stored in the first coordinate register means by an amount corresponding to the sine of the angle represented by the pulse count in the angle register means each time the pulse count in the angle register means is changed, the sense of the change in the pulse count of the first coordinate register means being determined by the binary value in the quadrant register means;

second binary coordinate register means for storing a pulse count representative of the vehicle location relative to the other one of the axes of the coordinate system; and means coupled between the binary angle register means and the second binary coordinate register means for changing the pulse count in the second coordinate register means by an amount corresponding to the cosine of the angle represented by the pulse count in the angle register means each time the pulse count in the angle register means is changed, the sense of the change in the pulse count of the second coordinate register means being determined by the binary value in the quadrant register means.

29. A system as defined in claim 28, wherein the means for changing the binary count in the angle register means includes second left and right pulse generators respectively associated with the left and right binary register means and coupled to change the pulse count in the angle register means when actuated, and each of the left and right binary register means includes first and second binary registers and first and second zero logic means respectively associated therewith, the first register being coupled to count up from zero value in response to the generation of pulses by the first-mentioned pulse generator associated therewith except when the second pulse generator associated therewith is actuated, the first register being coupled to count down to zero value in response to actuation of the second pulse generator associated therewith and the first zero logic means terminating the count down of the first register whenever the first register reaches zero value, the second register being coupled to count up from zero value in response to the generation of pulses by the first-mentioned pulse generator associated therewith whenever the first register is counting down and thereafter being coupled to count down to zero value, the second zero logic means terminating the count down of the second register whenever the second register reaches zero value.

30. A system as defined in claim 29, wherein the means for changing the pulse counts stored in the first and second coordinate register means together comprise binary sine-cosine register means, means responsive to a change in the pulse count of the angle register means for temporarily storing in the sine-cosine register means a first pulse count equal to the new pulse count of the angle register means and for subsequently temporarily storing in the sine-cosine register means a second pulse count equal to the difference between the new pulse count of the angle register means and a predetermined maximum pulse count value, means responsive to the first pulse count in the sine-cosine register means for changing the pulse count in the first coordinate register means by a selected portion of the first pulse count, and means responsive to the second pulse count in the sine-cosine register means for changing the pulse count in the second coordinate register means by a selected portion of the second pulse count.

31. A system as defined in claim 30, further including timing means for initiating an eight-step sequence each time the total of the pulse counts in the left and right register means reaches the predetermined value, the first register of the left register means being coupled to count down during the first step of the sequence and up at all other times, the second register of the left register means being coupled to count up during the first step and down during the second step of the sequence, the first register of the right register means being coupled to count down during the third step of the sequence and up at all other times, the second register of the right register means being coupled to count up during the third step and down during the fourth step of the sequence, the first pulse count being temporarily stored in the sine-cosine register means during the fifth step of the sequence, the pulse count in the first coordinate register means being changed by a selected portion of the first pulse count during the sixth step of the sequence, the second pulse count being temporarily stored in the sine-cosine register means during the seventh step of the sequence, and the pulse count in the second coordinate register means being changed by a selected portion of the second pulse count during the eighth step of the sequence.

32. A system as defined in claim 30, wherein the means for changing the pulse count in the first and second coordinate register means together comprise a pulse generator, means coupled between the pulse generator and the sine-cosine register means for counting the sine-cosine register means down to zero value in response to the generation of pulses by the pulse generator, means associated with the sine-cosine register means and responsive to the pulse count stored therein to provide a continuous indication of that one of a plurality of arbitrarily defined ranges of value into which the stored pulse count is determined to fall, and means responsive to the means for providing a continuous indication of range of value for passing a portion of the pulses generated by the pulse generator to the first and second coordinate register means, the portion being variable for the different ranges and being selected in accordance with the indication of range of value.

33. A system as defined in claim 32, wherein each of the ranges represents the corresponding sine for a different range of possible values of the angle between vehicle heading and one of the axes of the coordinate system.

34. An arrangement for providing a visual display of the location of a vehicle relative to mutually perpendicular X and Y axes, the vehicle having a pair of rotatable means which undergo rotation in response to movement of the vehicle over a surface, comprising:

means including X and Y registers and responsive to the pair of rotatable means for computing the distance between the location of the vehicle and each of the X and Y axes, the distances being represented by digital numbers stored in the X and Y registers;

X and Y digital-to-analog converter means associated with the X and Y registers respectively for converting the digital numbers stored in the associated registers to actual X and Y analog signals;

image projection tube means including an evacuated envelope having a face plate with a pair of mutually perpendicular X and Y axes superimposed thereon to correspond to the first-mentioned X and Y axes and means at least partially located within the envelope for scanning an electron beam across the face plate;

means associated with the tube means and responsive to the scanning of the electron beam for generating desired X and Y analog signals representing the distance between the electron beam and the X and Y axes superimposed on the face plate; and means associated with the means for scanning an electron beam and responsive to the actual and desired X and Y analog signals for intensity modulating the electron beam to produce a visible spot on the face plate whenever the actual and desired X analog signals are substantially equal and the actual and desired Y analog signals are substantially equal.

35. An arrangement for providing a visual display of the heading of a vehicle relative to mutually perpendicular X and Y axes, the vehicle having a pair of rotatable means which undergo rotation in response to movement of the vehicle over a surface, comprising:

means including an angle register and responsive to the pair of rotatable means for computing the angle between the vehicle heading and the X axis, the angle being represented by a digital number stored in the angle register;

digital-to-analog converter means associated with the angle register for converting the digital number stored therein into an analog angle signal; and means including a pointer rotatable relative to a scale having mutually perpendicular X and Y axes superimposed thereon to represent the first-mentioned X and Y axes and responsive to the analog angle signal to position the pointer at an angle relative to the superimposed X and Y axes corresponding to the value of the analog angle signal.

36. An arrangement according to claim 35, wherein the X and Y axes define four different quadrants, and the analog angle signal represents the actual value of the digital number when the vehicle heading lies in either of two of the four quadrants and the complementary value of the digital number when the vehicle heading lies in either of the other two of the four quadrants, and further including means for adding to the analog angle signal an analog signal representing the quadrant in which the vehicle lies.

37. An arrangement for driving a vehicle over a predetermined course without the need for an operator, the vehicle having a pair of rotatable means which undergo rotation in response to movement of the vehicle over a surface having a reference axis disposed therealong, comprising:
means including an angle register for periodically computing the angle between vehicle heading and the reference axis, the angle being represented by an angle digital number stored in the angle register and updated each time the angle is computed;
means including a coordinate register and responsive to the angle register to compute the change in the actual distance between vehicle location and the reference axis each time the angle is updated, the distance being represented by a digital number stored in the coordinate register;
means providing a digital number representing a desired distance between vehicle location and the reference axis; and
means responsive to the actual distance and desired distance digital numbers for steering the vehicle in a manner so as to tend to reduce the difference therebetween to zero.

38. An arrangement according to claim 37, further including at least one means responsive to the location of the vehicle at a particular point relative to the length of the reference axis for initiating a turn around movement of the vehicle, the means for steering the vehicle being non-responsive to the actual distance digital number during the turn around movement, means coupled to the means for steering and responsive to the initiation of the turn around movement to steer the vehicle through a first turn of predetermined duration, means coupled to the means for steering and responsive to the termination of the first turn to steer the vehicle through a second turn of predetermined duration.

39. An arrangement according to claim 37, wherein the means for steering is responsive to the angle digital number as well as the actual distance and desired distance digital numbers and is operative to steer the vehicle in a manner so as to tend to reduce both the angle digital number and difference between the actual distance and desired distance digital numbers to zero.

40. An arrangement according to claim 39, wherein the means for steering is responsive to the angle digital number as increased by a weighting factor.

41. An arrangement according to claim 37, wherein the means for steering includes a $\Delta Y$ register responsive to the desired distance digital number and to the changes in the actual distance digital number for providing a position error signal in the form of a digital number representing the algebraic combination of the desired distance digital number and the changes in the actual distance digital number, and a transfer register responsive to the position error digital number and the angle digital number for providing a combined error signal in the form of a digital number representing the algebraic combination of the position error digital number and the angle digital number.

42. An arrangement according to claim 41, wherein the angle register and the transfer register both comprise a plurality of stages arranged in binary fashion from a least significant bit stage to a most significant bit stage, and the 3 least significant bit stages of the angle register are coupled to the three stages of the transfer register which are 3 stages removed from the 3 least significant bit stages thereof to provide to the transfer register the 3 least significant bits of the angle digital number weighted by a factor of eight.

43. An arrangement according to claim 41, wherein the means for steering includes means for generating a succession of incremental biases of alternating polarity to cause oscillation of the means for steering about a null balance condition whenever the combined error signal is of substantially zero value.

44. An arrangement according to claim 41, wherein the means for steering includes a drivable steering mechanism for the vehicle, a steering register for temporarily storing the combined error signal digital number, and pulse generating means for substantially simultaneously providing pulses to drive the steering mechanism and to count down the steering register until the digital number in the steering register reaches zero value.

45. An arrangement according to claim 44, wherein the means for steering includes means for repetitively initiating the generation of successive groups of pulses by the pulse generating means whenever the digital number in the steering register is of zero value, the groups of pulses being applied to the steering register to cause the alternate driving of the steering mechanism in opposite directions.

46. An arrangement for turning around a vehicle traveling a first substantially straightline path so as to direct the vehicle onto a second substantially straightline path parallel to the first straightline path without the need for an operator, the vehicle having a mechanism for the steering thereof and a pair of rotatable means which undergo rotation in response to movement of the vehicle over a surface relative to mutually perpendicular X and Y axes, the first and second straightline paths being parallel to the X axis, comprising:
means including X and Y registers having stored digital numbers therein representing the distances between the vehicle and the X and Y axes respectively and responsive to the pair of rotatable means of the vehicle to update the digital numbers stored in the X and Y registers by appropriate changes thereof each time the vehicle travels a predetermined fixed distance;
counting means responsive to the location of the vehicle at a selected position relative to the X axis for thereafter providing a count of the number of times the X and Y registers are updated;

means responsive to a first count of predetermined value in the counting means for positioning the steering mechanism to initiate a first turning movement of the vehicle;

means responsive to a second count of predetermined value in the counting means for terminating the first turning movement of the vehicle by positioning the steering mechanism to initiate a second turning movement of the vehicle; and means responsive to a third count of predetermined value in the counting means for terminating the second turning movement of the vehicle by positioning the steering mechanism for straight ahead travel of the vehicle.

47. An arrangement according to claim 46, further including a Δ Y step register for storing a digital number representing the desired distance in the direction of the Y axis between the first and second straightline paths, a Δ Y register having a pair of inputs and operative to provide the algebraic combination of the inputs to an output thereof, means for providing the change in the Y register digital number upon each updating to one of the pair of inputs of the Δ Y register, means for providing the desired distance digital number to the other one of the pair of inputs of the Δ Y register upon initiation of the second turning movement, and means responsive to the completion of the second turning movement for positioning the steering mechanism so as to tend to drive a non-zero digital number at the output of the Δ Y register to zero.

48. An arrangement according to claim 46, wherein the vehicle comprises a tractor having an attached plow which may be lowered to perform plowing and raised to terminate the plowing and an engine of variable torque so as to control the speed of the tractor, and further including means responsive to the location of the vehicle at the selected position relative to the X axis for raising the plow and decreasing the engine torque, and means responsive to the location of the vehicle at a second selected position relative to the X axis upon completion of the second turning movement for lowering the plow and increasing the engine torque.

49. An arrangement for periodically entering in a register a binary number representing the actual distance between a vehicle and a reference axis along a surface over which the vehicle travels comprising:

at least one elongated sensor strip disposed on the surface with its axis of elongation generally normal to the reference axis, the sensor strip including a plurality of elongated coded surfaces parallel to the axis of elongation, the coded surfaces varying in binary fashion with distance from the reference axis to present different binary numbers at different distances from the reference axis;

sensing means mounted on the vehicle for sensing the binary number presented by the coded surfaces whenever the vehicle crosses the sensor strip; and means responsive to the sensing of a binary number by the sensing means for entering the sensed binary number in the register.

50. An arrangement according to claim 49, wherein each of the coded surfaces corresponds to a different bit position within the register and comprises a sequence of alternately light reflecting and non-reflecting surfaces, and the means for sensing comprises a different light source and reflected light detector combination associated with each of the coded surfaces.

51. An arrangement according to claim 49, further including means for effecting turn around of the vehicle after it crosses the sensor strip, means for generating a binary number representing the desired change in location of the vehicle relative to the reference axis prior to each turn around of the vehicle, means responsive to the desired change binary numbers for providing an updated sum thereof each time a new desired change binary number is generated, and Δ Y register means coupled to receive the updated sum of the desired change binary numbers and the sensed binary number in the first-mentioned register for steering the vehicle in accordance with the difference therebetween upon completion of the turn around.

52. An arrangement for periodically entering in a register a binary number representing the actual angle between the heading of a vehicle and a reference axis along a surface over which the vehicle travels comprising:

at least one elongated sensor strip disposed on the surface with its axis of elongation substantially normal to the reference axis, the sensor strip presenting electrical current paths of different resistance between different points along one longitudinal side of the strip and each of a plurality of different points along the opposite longitudinal side of the strip;

sensing means including an elongated element mounted on the vehicle for inducing a signal at a point along the one longitudinal side over which the elongated element lies as the vehicle crosses over the sensor strip and for sensing the resulting signal at a point along the other longitudinal side over which the elongated element lies; and means responsive to the sensed signal for entering in the register a binary number corresponding to the size of the sensed signal.

53. An arrangement according to claim 52, wherein the sensor strip includes a pair of rails disposed along the opposite longitudinal sides of the strip, each of the rails comprising a plurality of conductive segments alternated with a plurality of resistive segments, and a resistive network coupling the various conductive segments in one rail to the various conductive segments in the other rail such that inducing of a current in a conductive segment of one rail by the elongated element results in sensed currents of different magnitude at various conductive segments of the opposite rail, and the means for entering a binary number includes a plurality of switch means, each of which is operative to provide an output when a current of different threshold magnitude is applied thereto and all of which are coupled to receive a current as sensed by the elongated element, and logic means coupled to the switch means for determining that one of a plurality of different ranges into which the angle as represented by the sensed current falls based on the outputs provided by the switch means.

* * * * *